United States Patent
Li et al.

(10) Patent No.: US 12,520,095 B2
(45) Date of Patent: Jan. 6, 2026

(54) SOUND BOX POSITION ADJUSTMENT METHOD, AUDIO RENDERING METHOD, AND APPARATUS

(71) Applicant: Huawei Technologies Co., Ltd., Guangdong (CN)

(72) Inventors: Xiangyu Li, Shenzhen (CN); Xuhao Du, Shenzhen (CN); Jiawen Chua, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 272 days.

(21) Appl. No.: 18/177,652

(22) Filed: Mar. 2, 2023

(65) Prior Publication Data

US 2023/0209297 A1    Jun. 29, 2023

Related U.S. Application Data

(63) Continuation of application No. PCT/CN2021/116239, filed on Sep. 2, 2021.

(30) Foreign Application Priority Data

Sep. 4, 2020    (CN) .......................... 202010923763.9

(51) Int. Cl.
*H04S 7/00* (2006.01)
*G06F 3/04847* (2022.01)
(Continued)

(52) U.S. Cl.
CPC .......... *H04S 7/303* (2013.01); *G06F 3/04847* (2013.01); *G06F 3/165* (2013.01);
(Continued)

(58) Field of Classification Search
None
See application file for complete search history.

(56) References Cited

U.S. PATENT DOCUMENTS

2011/0069841 A1* 3/2011 Angeloff ................. H04S 7/303
348/47
2014/0334644 A1* 11/2014 Selig ...................... H04R 25/04
381/108
(Continued)

FOREIGN PATENT DOCUMENTS

CN       101296529 A    10/2008
CN       104604257 A    5/2015
(Continued)

*Primary Examiner* — Duc Nguyen
*Assistant Examiner* — Assad Mohammed
(74) *Attorney, Agent, or Firm* — WOMBLE BOND DICKINSON (US) LLP

(57) ABSTRACT

A method of sound box position adjustment is provided, including: An electronic device sends a first playing instruction to a sound box, where the first playing instruction is used to instruct the sound box to rotate from a first position to a second position in a preset direction and play positioning audio in a process of rotation, and a loudness of the positioning audio is unchanged when the positioning audio is being played; the electronic device receives the positioning audio; the electronic device determines indication information based on the positioning audio, where the indication information is used to determine a target position of the sound box, the target position is a position of the sound box when a loudness of the received audio is largest in a process of receiving the positioning audio; and the electronic device sends the indication information to the sound box.

19 Claims, 20 Drawing Sheets

(51) Int. Cl.
*G06F 3/16* (2006.01)
*H04R 1/32* (2006.01)
*H04R 5/02* (2006.01)
*H04R 5/04* (2006.01)

(52) U.S. Cl.
CPC .............. *H04R 1/323* (2013.01); *H04R 5/02* (2013.01); *H04R 5/04* (2013.01); *H04S 2400/13* (2013.01); *H04S 2420/01* (2013.01)

(56) References Cited

U.S. PATENT DOCUMENTS

| | | |
|---|---|---|
| 2015/0223002 A1 | 8/2015 | Mehta et al. |
| 2016/0330562 A1 | 11/2016 | Crockett |
| 2017/0156012 A1 | 6/2017 | Yu |
| 2018/0063664 A1* | 3/2018 | Horbach .............. G06F 3/0484 |
| 2020/0137508 A1 | 4/2020 | Lee et al. |
| 2020/0221217 A1* | 7/2020 | Kim ...................... H04R 1/026 |

FOREIGN PATENT DOCUMENTS

| | | |
|---|---|---|
| CN | 104954930 A | 9/2015 |
| CN | 106817657 A | 6/2017 |
| CN | 207269261 U | 4/2018 |
| CN | 108471561 A | 8/2018 |
| CN | 110072172 A | 7/2019 |
| CN | 110691304 A | 1/2020 |
| CN | 110798775 A | 2/2020 |
| CN | 111432362 A | 7/2020 |
| JP | 2009033416 A | 2/2009 |
| JP | 2016122876 A | 7/2016 |
| WO | 2020078237 A1 | 4/2020 |

* cited by examiner

SOUND BOX POSITION ADJUSTMENT METHOD, AUDIO RENDERING METHOD, AND APPARATUS

CROSS-REFERENCE TO RELATED APPLICATIONS

This application is a continuation of International Application No. PCT/CN2021/116239, filed on Sep. 2, 2021, which claims priority to Chinese Patent Application No. 202010923763.9, filed on Sep. 4, 2020. The disclosures of the aforementioned applications are hereby incorporated by reference in their entireties.

TECHNICAL FIELD

This application relates to the field of audio processing technologies, and in particular, to a sound box position adjustment method, an audio rendering method, and an apparatus.

BACKGROUND

In an indoor use scenario, people may deploy a 5.1 or 5.1.2 home theater system, or use a stereo playing system such as a soundbar, to obtain a sense of sound image space like a cinema.

To simulate a real sense of sound image space, at a first step, it is necessary to design a user's sweet spot (or sweet point). The sweet spot refers to an optimal hearing position. Generally, there are two sweet spot design methods. One is a method for performing crosstalk cancellation by virtualizing a surround sound box based on a head-related transfer function and a room response. The other is a method for performing beamforming by controlling a speaker array to constitute a directional sound wave, and then transmitting the sound wave from a fixed angle to human ears by using a reflector such as a wall, to achieve a surrounding sense.

However, neither of the two methods can achieve excellent sound effect in the indoor use scenario.

SUMMARY

This application provides a sound box position adjustment method, an audio rendering method, and an apparatus, to implement more accurate crosstalk cancellation, eliminate impact of different rooms, enhance sound image effect, and truly restore original sound effect.

According to a first aspect, this application provides a sound box position adjustment method, including: An electronic device sends a first playing instruction to a sound box, where the first playing instruction is used to instruct the sound box to rotate from a first position to a second position in a preset direction and play positioning audio in a process of rotation, and a loudness of the positioning audio is stable and unchanged when the positioning audio is being played; the electronic device receives the positioning audio; the electronic device determines indication information based on the positioning audio, where the indication information is used to determine a target position of the sound box, the target position is a position of the sound box corresponding to a case in which a loudness of the received audio is largest in a process of receiving the positioning audio by the electronic device, and the target position is a position in a process of rotating from the first position to the second position by the sound box; and the electronic device sends the indication information to the sound box.

In an embodiment, the sound box receives the first playing instruction from the electronic device; the sound box rotates from the first position to the second position in the preset direction based on the first playing instruction, and plays the positioning audio in the process of rotation, where the loudness of the positioning audio when being played is stable and unchanged; the sound box receives the indication information from the electronic device, where the indication information is used to determine the target position, the target position is the position of the sound box when the loudness of the received audio is largest in the process of receiving the positioning audio by the electronic device, and the target position is the position in the process of rotating from the first position to the second position by the sound box; and the sound box rotates from the second position to the target position based on the indication information.

In an embodiment, an angle difference between the first position and the second position is related to a binaural distance of a user; or an angle difference between the first position and the second position is related to a preset fine-tuning range.

In an embodiment, the indication information further indicates the sound box to rotate from the second position to the target position.

In an embodiment, the preset direction includes a horizontal clockwise direction or a horizontal counterclockwise direction.

In an embodiment, the rotation includes rotating at a uniform speed around a rotation shaft of the sound box in a vertical direction. The rotation shaft of the sound box in the vertical direction may be a vertical shaft that fixes the sound box, and the sound box rotates around the shaft in the horizontal clockwise or counterclockwise direction or the sound box may rotate in the horizontal clockwise or counterclockwise direction under driving of the shaft. In an embodiment, the rotation shaft of the sound box in the vertical direction may be a shaft that passes through the center of the sound box or whose extension line passes through the center of the sound box. For example, the center of the sound box refers to a geometric center of the sound box.

In an embodiment, a shape of the sound box includes a bar shape, a square shape, or a ring shape.

The sound box position adjustment method in this application may also be applicable to position adjustment of a device having a speaker, that is, the sound box in this application may be understood as a loudspeaker device having a speaker.

Before the sound box position adjustment method starts, the user may send a sweet spot positioning instruction by using an interaction interface provided by an application (APP) installed on the electronic device. Based on the instruction, the electronic device starts to perform the operations of the sound box position adjustment method, and first, sends the first playing instruction to the soundbar. The first playing instruction is used to instruct the soundbar to rotate at the uniform speed from the first position to the second position and play the positioning audio in the process of rotation.

The positioning audio is full-band audio that satisfies a specified condition. For example, the positioning audio may be full-band audio whose sound pressure level is not less than 65 dB and signal-to-noise ratio is not less than 20 dB, including white noise, pink noise, or a sweep signal. In an embodiment, energy of each frame of the positioning audio is the same. That the loudness of the positioning audio when being played is stable and unchanged may be understood as that when the positioning audio is played, energy of each audio frame remains unchanged, and playing parameters of the sound box also need to remain unchanged, so that playing energy remains unchanged when the sound box plays the audio. In an embodiment, the positioning audio may be audio pre-stored in the sound box, may be audio defined by the user, or may be audio sent by the electronic device to the sound box. A method for obtaining the positioning audio by the sound box is not specifically limited in this application.

In an embodiment, for ease of understanding, as shown in FIG. 12l, a position of a soundbar may be represented by an angle of a first included angle α between the soundbar and a vertical plane, where the vertical plane may refer to, for example, a wall that is near the soundbar or on which the soundbar is installed. When the soundbar is parallel to the vertical plane, the angle of the first included angle is 0°. The soundbar rotates counterclockwise from the angle 0°, and when the soundbar rotates to be perpendicular to the vertical plane, the angle of the first included angle is 90°, and the angle of the first included angle changes from 0° to 90° in the process of rotation. The soundbar rotates clockwise from the angle 0°, and when the soundbar rotates to be perpendicular to the vertical plane, the angle of the first included angle is −90°, and the angle of the first included angle changes from 0° to −90° in the process of rotation. It can be learned that when an opening of the first included angle faces leftward, the angle value of the first included angle is positive; and when the opening of the first included angle faces rightward, the angle value of the first included angle is negative.

In an embodiment, for ease of understanding, as shown in FIG. 12m, a position of the soundbar may alternatively be represented by an angle of a second included angle b between a vertical line of the center of the soundbar and a vertical line of a vertical plane. When the soundbar is parallel to the vertical plane, the vertical line of the center of the soundbar is parallel to or coincides with the vertical line of the vertical plane. In this case, the angle of the second included angle is 0°. The soundbar rotates counterclockwise from the angle 0°, and when the soundbar rotates to be perpendicular to the vertical plane, the vertical line of the center of the soundbar and the vertical line of the vertical plane are perpendicular to each other. In this case, the angle of the second included angle is 90°, and the angle of the second included angle changes from 0° to 90° in the process of rotation. The soundbar rotates clockwise from the angle 0°, and when the soundbar rotates to be perpendicular to the vertical plane, the vertical line of the center of the soundbar and the vertical line of the vertical plane are perpendicular to each other. In this case, the angle of the second included angle is −90°, and the angle of the second included angle changes from 0° to −90° in the process of rotation. It can be learned that when the vertical line of the center of the soundbar is located on the right of the vertical line of the vertical plane, the angle value of the second included angle is positive; and when the vertical line of the center of the soundbar is located on the left of the vertical line of the vertical plane, the angle value of the second included angle is negative.

Therefore, the first position and the second position may both be represented by the angle value of the first angle or the second angle, and that the soundbar rotates at the uniform speed from the first position to the second position may be described as that the soundbar rotates at the uniform speed from a first angle to a second angle, where the first angle and the second angle are respectively two angle values of the first included angle, or the first angle and the second angle are respectively two angle values of the second included angle.

In an embodiment, before sending the first playing instruction to the soundbar, the electronic device may first obtain an initial position of the center of the soundbar and a position of a user, calculate a theoretical sweet spot of the soundbar relative to the user based on the initial position and the position of the user, obtain a fine-tuning angle, and then obtain the first position and the second position based on the theoretical sweet spot and the fine-tuning angle.

When the soundbar is located at the theoretical sweet spot, a connection line between the position of the user and the center of the soundbar is perpendicular to a loudspeaker surface of the soundbar, and the loudspeaker surface faces the user. The loudspeaker surface of the soundbar is a surface of a face on which a loudspeaker of the soundbar is located. Generally, the loudspeaker is disposed on a face of the sound box. In this case, the loudspeaker surface is the face. Alternatively, the loudspeaker of the sound box is disposed on a plurality of faces of the sound box. In this case, the loudspeaker surface is a face of the sound box facing the user.

The first position is a position in which the soundbar rotates through the fine-tuning angle from the theoretical sweet spot to the preset direction; and the second position is a position in which the soundbar rotates through the fine-tuning angle from the theoretical sweet spot to a reverse direction of the preset direction.

In this application, an interaction interface (for example, a room configuration interface, which may be described in FIG. 11 below) provided by an APP may be used. A user enters a first virtual position in the interface, where the first virtual position is used to simulate a position of the center of a soundbar in a room, and an initial position of the center of the soundbar may be calculated based on the first virtual position. The initial position may be represented in a form of coordinates. Alternatively, the user may enter a second virtual position in the interaction interface. The second virtual position is used to simulate a position of the user in the room. The position of the user may be calculated based on the second virtual position, and the position of the user may also be represented in a form of coordinates.

The theoretical sweet spot of the soundbar may be obtained according to the following formulas (1) to (3):

$$d=\sqrt{(x_c-x_{s0})^2+(y_c-y_{s0})^2} \quad (1)$$

where d represents a straight-line distance between the position of the user and the center of the soundbar, $(x_c, y_c)$ represents the position of the user, and $(x_{s0}, y_{s0})$ represents the initial position of the center of the soundbar;

$$h=|y_c-y_{s0}| \quad (2)$$

where h represents a vertical distance between the position of the user and the center of the soundbar; and $$A = \pm\arccos\left(\frac{h}{d}\right) \quad (3)$$

where A represents an angle value corresponding to the theoretical sweet spot of the soundbar. For example, before the soundbar rotates, an angle corresponding to the foregoing second included angle is A. An objective of sweet spot positioning is to make the connection line between the center of the soundbar and the position of the user perpendicular to the loudspeaker surface of the soundbar, and the loudspeaker surface faces the user. Therefore, the soundbar needs to rotate horizontally and clockwise through an angle A to achieve the objective, and the angle A is the theoretical sweet spot corresponding to the soundbar.

However, because the position of the user is entered by the user in the interaction interface, an error may occur between the position and an actual position of the user. Therefore, the position of the soundbar needs to be fine-tuned based on the theoretical sweet spot, to determine an accurate target position.

One side of an included angle corresponding to the fine-tuning angle θ is a connection line between the position of the user and the center of the soundbar. The fine-tuning angle θ is calculated according to formula (4):

$$\theta = \pm \arctan\left(\frac{2w + \sqrt{d^2 - h^2}}{h}\right) - A \qquad (4)$$

where w represents a double binaural distance, and w may be a preset fixed value, or may be preset by the user.

In an embodiment, the fine-tuning angle θ may be directly entered by the user in the interaction interface (for example, a precise sweet spot positioning interface).

In an embodiment, the first angle corresponding to the first position may be A−θ, and the second angle corresponding to the second position may be A+θ; or the first angle corresponding to the first position may be A+θ, and the second angle corresponding to the second position may be A−θ.

In an embodiment, when the initial position of the center of the soundbar and the position of the user has satisfied the objective that the connection line between the center of the soundbar and the position of the user is perpendicular to the soundbar, it is unnecessary to perform sweet spot positioning. Therefore, before sweet spot positioning, whether sweet spot positioning is required may be determined based on the principle and the initial position of the center of the soundbar and the position of the user. If sweet spot positioning is required, a process of sweet spot positioning starts.

After receiving the first playing instruction, the soundbar obtains the first position and the second position from the first playing instruction, and plays the positioning audio, for example, a pre-recorded rain sound, while rotating in a preset rotation direction, for example, from A−θ to A+θ, or from A+θ to A−θ.

The soundbar rotates while playing positioning audio. Therefore, a loudness difference may exist between positioning audio received by a microphone of the electronic device. That is, when a position to which the soundbar rotates is far away from the electronic device, a loudness of positioning audio received by the electronic device decreases, while when a position to which the soundbar rotates is close to the electronic device, a loudness of positioning audio received by the electronic device increases. An objective of fine tuning is to find a position of the soundbar corresponding to a case in which a loudness of positioning audio received by the electronic device is largest. Because the loudness is detected by the electronic device of the user, when the soundbar is in the position, it may be considered that the sweet spot of the soundbar accurately falls in the position of the user.

In an embodiment, the electronic device may detect the received positioning audio at a specified frequency from a receiving start moment of the positioning audio to obtain a loudness. When a receiving end moment of the positioning audio arrives, the electronic device determines a difference between a moment corresponding to a largest loudness of a plurality of obtained loudnesses and the receiving start moment as a target time. The electronic device may synchronously receive the positioning audio and detect the loudness.

In an embodiment, the electronic device may detect the positioning audio to obtain a largest loudness, and then determine a difference between a moment corresponding to the largest loudness and a receiving start moment of the positioning audio as a target time. Alternatively, the electronic device may detect an entire segment of positioning audio after receiving all positioning audio.

In an embodiment, when the soundbar plays the positioning audio, if the loudness of the positioning audio changes, the electronic device may compare energy of the received positioning audio with energy of the pre-stored positioning audio, that is, compare energy of an $i^{th}$ frame of the received positioning audio with energy of an frame of the pre-stored positioning audio, where i=0, 1, . . . , m−1, and m represents a total frame quantity of the positioning audio, and then determine a moment corresponding to a frame with a largest energy difference as the target time.

The angle value corresponding to the target position of the soundbar may be calculated based on the following formula:

When the first angle is A−θ, and the second angle is A+θ, an angle value B corresponding to the target position is calculated according to formula (5):

$$B=(A-\theta)+vt \qquad (5)$$

When playing of the positioning audio ends, the soundbar rotates to the second position (the corresponding second angle is A+θ). Therefore, the soundbar needs to rotate to the target position (the corresponding angle is B) reversely from the second position, that is, rotate from the angle A+θ to the angle B. Based on the foregoing formula, the angle through which the soundbar needs to rotate may be calculated as β=2θ−vt.

When the first angle is A+θ, and the second angle is A−θ, an angle value B corresponding to the target position is calculated according to formula (6):

$$B=(A+\theta)-vt \qquad (6)$$

where v represents a rotation speed of the soundbar, the rotation speed may be preset, and t represents a target time.

When playing of the positioning audio ends, the soundbar rotates to the second position (the corresponding second angle is A−θ). Therefore, the soundbar needs to rotate to the target position (the corresponding angle is B) reversely from the second position, that is, rotate from the angle A−θ to the angle B. According to formula (6), the angle through which the soundbar needs to rotate may be calculated as β=2θ−vt.

It can be learned that, based on the target time obtained by using the foregoing method, the electronic device may determine indication information in the following several manners, and then the soundbar obtains, based on the indication information, an angle β=2θ−vt through which the soundbar needs to rotate.

(1) The electronic device determines the target time as the indication information.

The fine-tuning angle θ in the foregoing formula may be obtained from information exchanged with the electronic device previously, and details are not described herein again. The rotation speed may be preset. The target time may be obtained from the indication information. The rotation direction may also be preset. Therefore, the soundbar may calculate, based on the information, the angle β through which the soundbar needs to rotate.

(2) The electronic device determines the target time and a reverse direction of the preset direction as the indication information.

The fine-tuning angle θ in the foregoing formula may be obtained from information exchanged with the electronic device previously, and details are not described herein again. The rotation speed may be preset. The target time and the rotation direction (the reverse direction of the preset direction) may be obtained from the indication information. Therefore, the soundbar may calculate, based on the information, the angle β through which the soundbar needs to rotate.

(3) The electronic device determines the target time, a reverse direction of the preset direction, and the fine-tuning angle as the indication information.

The fine-tuning angle θ and the target time in the foregoing formula, and the rotation direction (the reverse direction of the preset direction) may be all obtained from the indication information. The rotation speed may be preset. Therefore, the soundbar may calculate, based on the information, the angle β through which the soundbar needs to rotate.

(4) The electronic device determines a reverse direction of the preset direction and a target rotation angle as the indication information.

The rotation direction (the reverse direction of the preset direction) may be obtained from the indication information. In this case, the soundbar does not need to calculate, according to the foregoing formula, the angle β through which the soundbar needs to rotate, and the angle may also be obtained from the indication information.

It should be noted that duration T of the positioning audio, a target time t, a fine-tuning angle θ, and a rotation speed v are mutually constrained, that is, an angle value B corresponding to the target position is obtained by using a fine tuning result, and the angle value B corresponding to the target position needs to fall within an angle range [A−θ, A+θ]. Therefore, −θ≤vt≤θ, and t≤T.

Therefore, the indication information determined by the electronic device may include the angle value B corresponding to the target position, or may include the target time t, and both of the two values may enable the soundbar to determine the target position of the soundbar.

The indication information further has a function of indicating the soundbar to rotate from the second position to the target position. Therefore, after receiving the indication information, the soundbar first determines the target position, and then rotates from the current position to the target position.

For example, in a process of fine tuning, the soundbar rotates from the position corresponding to A−θ to the position corresponding to A+θ. After receiving the indication information, the soundbar rotates reversely through an angle (2θ−vt) from the position corresponding to A+θ to the position corresponding to B.

In another example, in a process of fine tuning, the soundbar rotates from the position corresponding to A+θ to the position corresponding to A−θ. After receiving the indication information, the soundbar rotates reversely through an angle (2θ−vt) from the position corresponding to A−θ to the position corresponding to B.

In this application, the soundbar and the electronic device cooperate with each other. The soundbar rotates from the first position to the second position at a uniform speed while playing positioning audio. The electronic device finds a position of the soundbar corresponding to a case in which a loudness is largest based on the received positioning audio, and controls the soundbar to rotate to the position. In this way, for a position of a user, more accurate crosstalk cancellation can be implemented, impact of different rooms can be eliminated, sound image effect can be enhanced, and original sound effect can be truly restored.

In an embodiment, the electronic device sends a second playing instruction to the soundbar, where the second playing instruction is used to instruct the soundbar to play test audio; receiving, by the electronic device, collected audio, where the collected audio is audio received by a microphone of a headset worn by the user in a process of playing the test audio; calculating, by the electronic device, a binaural room impulse response BRIR based on the collected audio and the test audio; and the electronic device obtains a filter coefficient of the soundbar based on the BRIR.

The BRIR may be calculated according to formula (7):

$$H_{2p+i,k}(f) = \frac{Y_{i,p,k}(f)}{T(f)} \tag{7}$$

where 0≤p<P, and P represents a quantity of users; 0≤k<K, and K represents a quantity of speaker units; a case that i is 0 corresponds to a left ear, and a case that i is 1 corresponds to a right ear; f represents a frequency; $H_{2p+i,k}(f)$ represents a BRIR of a $p^{th}$ user corresponding to a $k^{th}$ speaker unit; $Y_{i,p,k}(f)$ represents recorded audio of a headset of the $p^{th}$ user corresponding to a $k^{th}$ soundbar; and T(f) represents the test audio.

Then, the filter coefficient is calculated according to formula (8):

$$C(f)=(H(f)^H H(f)+\beta I_k(f))^{-1} H(f)^H D(f) \tag{8}$$

where $H(f) \in C^{K \times K}$, H(f) represents a matrix constituted by using the BRIR calculated according to formula (7) as an element, and the matrix covers room transfer functions of all users respectively corresponding to all speaker units; $*^H$ represents a conjugate matrix; $I_k(f) \in C^{K \times K}$ and $I_k W$ represents an identity matrix; and $D(f) \in R^{2P \times R}$, D(f) represents an ideal transfer function, and R represents a quantity of sound channels, where if the audio is stereo, R=2 and $$D(f) = \begin{bmatrix} D_0(f) \\ \vdots \\ D_{P-1}(f) \end{bmatrix} = \begin{bmatrix} 1 & 0 \\ 0 & 1 \\ \vdots & \vdots \\ 1 & 0 \\ 0 & 1 \end{bmatrix}.$$

Finally, the soundbar processes, based on an updated filter coefficient and according to formula (9), the audio played by the soundbar:

$$X(f)=C(f)S(f) \tag{9}$$

where X(f) represents processed audio, S(f) represents the audio played by the soundbar, and C(f) represents the filter coefficient.

The filter coefficient is obtained after precise sweet spot positioning. Therefore, for a position of a user, more accurate crosstalk cancellation can be implemented, impact of different rooms can be eliminated, sound image effect can be enhanced, and original sound effect can be truly restored.

In an embodiment, before the electronic device obtains the filter coefficient of the sound box based on the BRIR, the method further includes: the electronic device receives a virtual space instruction, where the virtual space instruction includes a listening space; and the electronic device obtains a transfer function of the listening space; and that the electronic device obtains the filter coefficient of the soundbar based on the BRIR includes: the electronic device calculates the filter coefficient of the soundbar based on the BRIR and the transfer function of the listening space.

For example, the listening space is a "golden hall". The electronic device calculates the filter coefficient according to formula (10):

$$\hat{C}(f) = (H(f)^H H(f) + \beta I_k(f))^{-1} H(f)^H \hat{D}(f) \qquad (10)$$

where $H(f) \in C^{K \times K}$, H(f) represents a matrix constituted by using the BRIR calculated according to formula (7) as an element, and the matrix covers room transfer functions of all users respectively corresponding to all soundbars; $*^H$ represents a conjugate matrix; $I_k(f) \in C^{K \times K}$, and $I_k(f)$ represents an identity matrix; and $\hat{D}(f) \in C^{2P \times R}$, $\hat{D}(f)$ represents a transfer function of a listening space (for example, a golden hall), and R represents a quantity of sound channels, where if the audio is stereo $$R = 2, \hat{D}(f) = \begin{bmatrix} \hat{D}_0(f) \\ \vdots \\ \hat{D}_{P-1}(f) \end{bmatrix},$$

and $\hat{D}_p(f)$ represents a listening space selected by a $p^{th}$ user.

The soundbar processes, based on an updated filter coefficient and according to formula (11), the audio played by the soundbar:

$$\hat{X}(f) = \hat{C}(f) S(f) \qquad (11)$$

where $\hat{X}(f)$ represents processed audio, S(f) represents the audio played by the soundbar, and $\hat{C}(f)$ represents the filter coefficient.

The foregoing filter coefficient is obtained after exclusive private customization. Therefore, for a position of a user, more accurate crosstalk cancellation can be implemented, impact of different rooms can be eliminated, sound image effect can be enhanced, and original sound effect can be truly restored. In addition, a sound field can be rendered in the position of the user, thereby providing an immersive experience for the user.

According to a second aspect, this application provides a sound box position adjustment method, including: An electronic device sends a first playing instruction to an $i^{th}$ sound box, where the first playing instruction is used to instruct the $i^{th}$ sound box to rotate from a first position to a second position at a uniform speed in a preset direction and play positioning audio in a process of rotation, where a loudness of the positioning audio is stable and unchanged when the positioning audio is being played, the $i^{th}$ sound box is one of N sound boxes, $1 \leq i \leq N$, and N is a positive integer greater than 1; the electronic device receives a mixed signal, where the mixed signal is an audio signal obtained by mixing positioning audio played by the N sound boxes; the electronic device determines an $i^{th}$ piece of indication information based on the mixed signal, where the $i^{th}$ piece of indication information is used to determine a target position of the $i^{th}$ sound box, and the target position of the $i^{th}$ sound box is a corresponding position of the $i^{th}$ sound box corresponding to a case in which a loudness of received audio is largest in a process of receiving the mixed signal by the electronic device; and the electronic device sends the $i^{th}$ piece of indication information to the $i^{th}$ sound box.

In an embodiment, the preset direction includes a horizontal clockwise direction or a horizontal counterclockwise direction.

In an embodiment, before the electronic device sends the first playing instruction to the $i^{th}$ sound box, the method further includes: the electronic device obtains an initial position of the center of the $i^{th}$ sound box and a position of a user; the electronic device calculates a theoretical sweet spot of the $i^{th}$ sound box relative to the position of the user based on the initial position and the position of the user, where when the $i^{th}$ sound box is located at the theoretical sweet spot, a connection line between the position of the user and the center of the $i^{th}$ sound box is perpendicular to a loudspeaker surface of the $i^{th}$ sound box, and the loudspeaker surface faces the user; obtaining, by the electronic device, a fine-tuning angle; and the electronic device obtains the first position and the second position of the $i^{th}$ sound box based on the theoretical sweet spot and the fine-tuning angle.

In an embodiment, the first position of the $i^{th}$ sound box is a position in which the $i^{th}$ sound box rotates through the fine-tuning angle from the theoretical sweet spot to the preset direction; and the second position of the $i^{th}$ sound box is a position in which the $i^{th}$ sound box rotates through the fine-tuning angle from the theoretical sweet spot to a reverse direction of the preset direction.

A difference between this embodiment and the first aspect lies in that a quantity of soundbars in a room changes from one to a plurality, and the plurality of soundbars are arranged in a row and have loudspeaker surfaces all facing the user. In this case, the plurality of soundbars in the room play the positioning audio simultaneously, and a microphone of a user terminal receives the mixed signal of the positioning audio respectively played by the plurality of soundbars. Because positions of the soundbars relative to the user are different, positions of the soundbars corresponding to the largest loudness of the received positioning audio are also different. It is necessary to obtain a target position and indication information of each soundbar.

In this application, the plurality of soundbars and the electronic device cooperate with each other. The plurality of soundbars rotate from the first position to the second position at a uniform speed while playing positioning audio. The electronic device finds, based on the mixed signal of the received positioning audio, positions of the soundbars corresponding to a largest loudness, and controls the soundbars to rotate to the respective corresponding positions. In this way, for a position of a user, more accurate crosstalk cancellation can be implemented, impact of different rooms can be eliminated, sound image effect can be enhanced, and original sound effect can be truly restored.

In an embodiment, sending, by an electronic device, a first playing instruction to a sound box, where the first playing instruction is used to instruct the sound box to rotate from a first position to a second position in a preset direction and play positioning audio in a process of rotation, and a loudness of the positioning audio is stable and unchanged when the positioning audio is being played; receiving, by the electronic device, a plurality of pieces of collected audio, where the plurality of pieces of collected audio are audio respectively received by microphones of terminals of a plurality of users in a process of playing the positioning audio; determining, by the electronic device, indication information based on the plurality of pieces of collected audio, where the indication information is used to determine a target position of the sound box, the target position is a position of the sound box corresponding to a case in which a sum of loudnesses of the received audio is largest in a process of receiving the positioning audio by terminals of the plurality of users, and the target position is a position in a process of rotating from the first position to the second position; and sending, by the electronic device, the indication information to the sound box.

In an embodiment, before the electronic device sends the first playing instruction to the sound box, the method further includes: the electronic device obtains an initial position of the center of the sound box and positions of the plurality of users; the electronic device determines the central position of the plurality of users based on the positions of the plurality of users; the electronic device calculates a theoretical sweet spot of the sound box relative to the central position of the plurality of users based on the initial position and the central position of the plurality of users, where when the sound box is located at the theoretical sweet spot, a connection line between the central position of the plurality of users and the center of the sound box is perpendicular to a loudspeaker surface of the sound box, and the loudspeaker surface faces the plurality of users; the electronic device obtains a fine-tuning angle; and the electronic device obtains the first position and the second position based on the theoretical sweet spot and the fine-tuning angle.

A difference between this embodiment and the first aspect lies in that a quantity of users in a room changes from one to a plurality. In this case, microphones of a plurality of user terminals in the room respectively receive positioning audio. Because positions of the user terminals are different, positions of the soundbars corresponding to the largest loudness of the received positioning audio are also different. In this case, a target position of the soundbar is found with reference to a sum of loudnesses of the soundbar received by the user terminals at sampling moments. The theoretical sweet spot is obtained based on the central position of a plurality of users instead of a position of a user.

In this application, the soundbar and the electronic device cooperate with each other. The soundbar rotates from the first position to the second position at a uniform speed while playing positioning audio. The electronic device finds, based on the received plurality of pieces of sampled audio, a position of the soundbar corresponding to a case in which a sum of loudnesses is largest, and controls the soundbar to rotate to the position. In this way, for positions of a plurality of users, more accurate crosstalk cancellation can be implemented, impact of different rooms can be eliminated, sound image effect can be enhanced, and original sound effect can be truly restored.

In an embodiment, dividing, by an electronic device, a space into a plurality of subspaces based on a quantity of N sound boxes, where each subspace corresponds to one of the sound boxes, and N is a positive integer greater than 1; sending, by the electronic device, a first playing instruction to each of the N sound boxes, where the first playing instruction is used to instruct the corresponding sound boxes to rotate from a first position to a second position in a preset direction and play positioning audio in a process of rotation, and a loudness of the positioning audio is stable and unchanged when the positioning audio is being played; determining, by the electronic device, N pieces of indication information, where the N pieces of indication information correspond to the N sound boxes, and the indication information is used to determine target positions of the corresponding sound boxes; and sending, by the electronic device, the N pieces of indication information to the corresponding sound boxes respectively.

In an embodiment, the determining, by the electronic device, N pieces of indication information includes: receiving, by the electronic device, first positioning audio played by an $i^{th}$ sound box, where the $i^{th}$ sound box is one of the N sound boxes, $1 \le i \le N$, and only one first user is in a subspace corresponding to the first sound box; and determining, by the electronic device, first indication information based on the first positioning audio, where the first indication information is used to determine a first target position of the $i^{th}$ sound box, and the first target position is a position of the $i^{th}$ sound box corresponding to a case in which a loudness of received audio is largest in a process of receiving the first positioning audio by the electronic device.

In an embodiment, before the electronic device sends the first playing instruction to each of the N sound boxes, the method further includes: the electronic device obtains a first initial position of the center of the $i^{th}$ sound box and a position of the first user; the electronic device calculates a first theoretical sweet spot of the $i^{th}$ sound box relative to the position of the user based on the first initial position and the position of the first user, where when the $i^{th}$ sound box is located at the first theoretical sweet spot, a connection line between the position of the first user and the center of the $i^{th}$ sound box is perpendicular to a loudspeaker surface of the $i^{th}$ sound box, and the loudspeaker surface faces the first user; the electronic device obtains a first fine-tuning angle; and the electronic device obtains the first position and the second position of the first sound box based on the first theoretical sweet spot and the first fine-tuning angle.

In an embodiment, the determining, by the electronic device, N pieces of indication information includes: receiving, by the electronic device, a plurality of pieces of collected audio, where the plurality of pieces of collected audio are audio respectively received by microphones of electronic devices of a plurality of second users in a process of playing second positioning audio by a $j^{th}$ sound box, the $j^{th}$ sound box is one of the N sound boxes, $1 \le j \le N$, and the plurality of second users are located in a subspace corresponding to the $j^{th}$ sound box; and determining, by the electronic device, second indication information based on the plurality of pieces of collected audio, where the second indication information is used to determine a second target position of the $j^{th}$ sound box, the second target position is a position of the $j^{th}$ sound box corresponding to a case in which a sum of loudnesses of the received audio is largest in a process of receiving the second positioning audio by the electronic devices of the plurality of second users, and the second target position is a position in a process of rotating from the first position to the second position.

In an embodiment, before the electronic device sends the first playing instruction to each of the N sound boxes, the method further includes: the electronic device obtains a second initial position of the center of the $j^{th}$ sound box and positions of the plurality of second users; the electronic device determines the central position of the plurality of second users based on the positions of the plurality of second users; the electronic device calculates a second theoretical sweet spot of the $j^{th}$ sound box relative to the central position of the plurality of second users based on the second initial position and the central position of the plurality of second users, where when the $j^{th}$ sound box is located at the second theoretical sweet spot, a connection line between the central position of the plurality of second users and the center of the $j^{th}$ sound box is perpendicular to a loudspeaker surface of the $j^{th}$ sound box, and the loudspeaker surface faces the plurality of second users; the electronic device obtains a second fine-tuning angle; and the electronic device obtains the first position and the second position of the $j^{th}$ sound box based on the second theoretical sweet spot and the second fine-tuning angle.

In an embodiment, the determining, by the electronic device, N pieces of indication information includes: receiving, by the electronic device, a plurality of pieces of collected audio, where the plurality of pieces of collected audio are audio respectively received by microphones of electronic devices of a plurality of third users in a process of playing third positioning audio by a $k^{th}$ sound box, the $k^{th}$ sound box is one of the N sound boxes, $1 \leq k \leq N$, no user is in a subspace corresponding to the $k^{th}$ sound box, and the plurality of third users are all users in the space; and determining, by the electronic device, third indication information based on the plurality of pieces of collected audio, where the third indication information is used to determine a third target position of the $k^{th}$ sound box, the third target position is a position of the $k^{th}$ sound box corresponding to a case in which a sum of loudnesses of the received audio is largest in a process of receiving the third positioning audio by the electronic devices of the plurality of third users, and the third target position is a position in a process of rotating from the first position to the second position.

In an embodiment, before the electronic device sends the first playing instruction to each of the N sound boxes, the method further includes: the electronic device obtains a third initial position of the $k^{th}$ sound box and positions of the plurality of third users; the electronic device determines the central position of the plurality of third users based on the positions of the plurality of third users; the electronic device calculates a third theoretical sweet spot of the $k^{th}$ sound box relative to the central position of the plurality of third users based on the third initial position and the central position of the plurality of third users, where when the $k^{th}$ sound box is located at the third theoretical sweet spot, a connection line between the central position of the plurality of third users and a center of the $k^{th}$ sound box is perpendicular to a loudspeaker surface of the $k^{th}$ sound box, and the loudspeaker surface faces the plurality of third users; the electronic device obtains a third fine-tuning angle; and the electronic device obtains the first position and the second position of the $k^{th}$ sound box based on the third theoretical sweet spot and the third fine-tuning angle.

The electronic device first divides the space in the room based on the quantity of soundbars, where each soundbar corresponds to a subspace. For example, as shown in FIG. 15, there are three soundbars, and the center of a middle soundbar is used as a vertex. A space in a horizontal direction in front of the soundbar may be divided into three subspaces in a manner of evenly dividing an angle of 180° in the horizontal direction. A left subspace corresponds to a soundbar 1 and has one user, a middle subspace corresponds to a soundbar 2 and has two users, and a right subspace corresponds to a soundbar 3 and has no user. That is, in a scenario shown in FIG. 15, the three soundbars respectively correspond to the three subspaces, and based on quantities of users in the subspaces, relationships between the three soundbars and the quantities of users are respectively a one-to-one relationship, a one-to-many relationship, and a one-to-null relationship.

The electronic device determines a target position of each soundbar based on a space division result and the quantities of users in the subspaces.

For example, for a subspace having only one user, a target position of a corresponding soundbar may be determined with reference to the method in the first aspect, and then indication information of the soundbar is determined. For a subspace having a plurality of users, a target position of a corresponding soundbar may be determined with reference to the method in the second aspect, and then indication information of the soundbar is determined, but a theoretical sweet spot is obtained based on the central position of all the users in the subspace instead of a position of a user. For a subspace having no user, a target position of a corresponding soundbar may also be determined with reference to the method in the second aspect, and then indication information of the soundbar is determined, but a theoretical sweet spot is obtained based on the central position of all users in a room instead of a position of a user.

In this application, the plurality of soundbars and the electronic device cooperate with each other. The plurality of soundbars rotate from the first position to the second position at a uniform speed while playing positioning audio. For each soundbar, the electronic device finds a position of the soundbar corresponding to a case in which a loudness or a sum of loudnesses is largest in sampled audio received by a terminal of a user in a corresponding subspace, and controls the soundbar to rotate to the position. In this way, for positions of a plurality of users, more accurate crosstalk cancellation can be implemented, impact of different rooms can be eliminated, sound image effect can be enhanced, and original sound effect can be truly restored.

According to a third aspect, this application provides a control apparatus, including: a sending module, configured to send a first playing instruction to a sound box, where the first playing instruction is used to instruct the sound box to rotate from a first position to a second position in a preset direction and play positioning audio in a process of rotation, and a loudness of the positioning audio is stable and unchanged when the positioning audio is being played; a receiving module, configured to receive the positioning audio; and a processing module, configured to determine indication information based on the positioning audio, where the indication information is used to determine a target position of the sound box, the target position is a position of the sound box corresponding to a case in which a loudness of the received audio is largest in a process of receiving the positioning audio by the electronic device, and the target position is a position in a process of rotating from the first position to the second position by the sound box; and the sending module is further configured to send the indication information to the sound box.

In an embodiment, an angle difference between the first position and the second position is related to a binaural distance of a user; or an angle difference between the first position and the second position is related to a preset fine-tuning range.

In an embodiment, the indication information further indicates the sound box to rotate from the second position to the target position.

In an embodiment, the preset direction includes a horizontal clockwise direction or a horizontal counterclockwise direction.

In an embodiment, the rotation includes rotating at a uniform speed around a rotation shaft of the sound box in a vertical direction.

In an embodiment, a shape of the sound box includes a bar shape, a square shape, or a ring shape.

In an embodiment, the processing module is further configured to: obtain an initial position of the center of the sound box and a position of the user; calculate a theoretical sweet spot of the sound box relative to the user based on the initial position and the position of the user, where when the sound box is located at the theoretical sweet spot, a connection line between the position of the user and the center of the sound box is perpendicular to a loudspeaker surface of the sound box, and the loudspeaker surface faces the user; obtain a fine-tuning angle; and obtain the first position and the second position based on the theoretical sweet spot and the fine-tuning angle.

In an embodiment, the first position is a position in which the sound box rotates through the fine-tuning angle from the theoretical sweet spot to the horizontal clockwise direction; and the second position is a position in which the sound box rotates through the fine-tuning angle from the theoretical sweet spot to the horizontal counterclockwise direction.

In an embodiment, the processing module is specifically configured to: display a room configuration interface, where the room configuration interface is used to simulate a space in which the user and the sound box are located; receive a first virtual position entered by the user on the room configuration interface, where the first virtual position is used to simulate the initial position; calculate the initial position based on the first virtual position; receive a second virtual position entered by the user on the room configuration interface, where the second virtual position is used to simulate the position of the user; and calculate the position of the user based on the second virtual position.

In an embodiment, the processing module is specifically configured to calculate the fine-tuning angle based on the initial position, the position of the user, and the binaural distance of the user.

In an embodiment, the processing module is specifically configured to: display a precise sweet spot positioning interface, where the precise sweet spot positioning interface includes a pop-up window for setting the fine-tuning angle; receive a preset empirical value entered by the user on the pop-up window; and set a value of the fine-tuning angle to the preset empirical value.

In an embodiment, the processing module is specifically configured to: detect the received positioning audio at a specified frequency from a receiving start moment of the positioning audio to obtain a loudness; when a receiving end moment of the positioning audio arrives, determine a difference between a moment corresponding to a largest loudness of a plurality of obtained loudnesses and the receiving start moment as a target time; and determine the target time as the indication information; determine the target time and a reverse direction of the preset direction as the indication information; determine the target time, a reverse direction of the preset direction, and the fine-tuning angle as the indication information; or determine a reverse direction of the preset direction and a target rotation angle as the indication information, where the target rotation angle indicates the sound box to rotate from the second position to the target position.

In an embodiment, the processing module is specifically configured to: detect the positioning audio to obtain a largest loudness; determine a difference between a moment corresponding to the largest loudness and a receiving start moment of the positioning audio as a target time; and determine the target time as the indication information; determine the target time and a reverse direction of the preset direction as the indication information; determine the target time, a reverse direction of the preset direction, and the fine-tuning angle as the indication information; or determine a reverse direction of the preset direction and a target rotation angle as the indication information, where the target rotation angle indicates the sound box to rotate from the second position to the target position.

In an embodiment, the sending module is further configured to send a second playing instruction to the sound box, where the second playing instruction is used to instruct the sound box to play test audio; the receiving module is further configured to receive collected audio, where the collected audio is audio received by a microphone of a headset worn by the user in a process of playing the test audio; and the processing module is further configured to: calculate a binaural room impulse response BRIR based on the collected audio and the test audio; and obtain a filter coefficient of the sound box based on the BRIR.

In an embodiment, the processing module is further configured to: receive a virtual space instruction, where the virtual space instruction includes a listening space; obtain a transfer function of the listening space; and calculate the filter coefficient of the sound box based on the BRIR and the transfer function of the listening space.

According to a fourth aspect, this application provides an audio playing apparatus, including: a receiving module, configured to receive a first playing instruction from an electronic device; and a processing module, configured to rotate from a first position to a second position in a preset direction based on the first playing instruction, and play positioning audio in a process of rotation, where a loudness of the positioning audio is stable and unchanged when the positioning audio is being played; the receiving module is further configured to receive indication information from the electronic device, where the indication information is used to determine a target position, the target position is a position of a sound box corresponding to a case in which a loudness of the received audio is largest in a process of receiving the positioning audio by the electronic device, and the target position is a position in a process of rotating from the first position to the second position by the sound box; and the processing module is further configured to rotate from the second position to the target position based on the indication information.

In an embodiment, an angle difference between the first position and the second position is related to a binaural distance of a user; or an angle difference between the first position and the second position is related to a preset fine-tuning range.

In an embodiment, the preset direction includes a horizontal clockwise direction or a horizontal counterclockwise direction.

In an embodiment, the rotating in a preset direction includes rotating at a uniform speed in the preset direction.

In an embodiment, a shape of the sound box includes a bar shape, a square shape, or a ring shape.

In an embodiment, the receiving module is further configured to receive a theoretical sweet spot and a fine-tuning angle from the electronic device, where when the sound box is located at the theoretical sweet spot, a connection line between a position of the user and a center of the sound box is perpendicular to a loudspeaker surface of the sound box, and the loudspeaker surface faces the user; and the processing module is further configured to: determine the first position based on the theoretical sweet spot and the fine-tuning angle; and rotate to the first position.

In an embodiment, the first position is a position in which the sound box rotates through the fine-tuning angle from the theoretical sweet spot to the horizontal clockwise direction; and the second position is a position in which the sound box rotates through the fine-tuning angle from the theoretical sweet spot to the horizontal counterclockwise direction.

According to a fifth aspect, this application provides a control apparatus, including: a sending module, configured to send a first playing instruction to an $i^{th}$ sound box, where the first playing instruction is used to instruct the $i^{th}$ sound box to rotate from a first position to a second position at a uniform speed in a preset direction and play positioning audio in a process of rotation, where a loudness of the positioning audio is stable and unchanged when the positioning audio is being played, the $i^{th}$ sound box is one of N sound boxes, $1 \leq i \leq N$, and N is a positive integer greater than 1; a receiving module, configured to receive a mixed signal, where the mixed signal is an audio signal obtained by mixing positioning audio played by the N sound boxes; and a processing module, configured to determine an $i^{th}$ piece of indication information based on the mixed signal, where the $i^{th}$ piece of indication information is used to determine a target position of the $i^{th}$ sound box, and the target position of the $i^{th}$ sound box is a corresponding position of the $i^{th}$ sound box corresponding to a case in which a loudness of received audio is largest in a process of receiving the mixed signal by the electronic device; and the sending module is further configured to send the $i^{th}$ piece of indication information to the $i^{th}$ sound box.

In an embodiment, the preset direction includes a horizontal clockwise direction or a horizontal counterclockwise direction.

In an embodiment, the processing module is further configured to: obtain an initial position of the center of the $i^{th}$ sound box and a position of a user; calculate a theoretical sweet spot of the $i^{th}$ sound box relative to the position of the user based on the initial position and the position of the user, where when the $i^{th}$ sound box is located at the theoretical sweet spot, a connection line between the position of the user and the center of the $i^{th}$ sound box is perpendicular to a loudspeaker surface of the $i^{th}$ sound box, and the loudspeaker surface faces the user; obtain a fine-tuning angle; and obtain the first position and the second position of the $i^{th}$ sound box based on the theoretical sweet spot and the fine-tuning angle.

In an embodiment, the first position of the $i^{th}$ sound box is a position in which the $i^{th}$ sound box rotates through the fine-tuning angle from the theoretical sweet spot to the preset direction; and the second position of the $i^{th}$ sound box is a position in which the $i^{th}$ sound box rotates through the fine-tuning angle from the theoretical sweet spot to a reverse direction of the preset direction.

In an embodiment, the sending module is further configured to send a first playing instruction to a sound box, where the first playing instruction is used to instruct the sound box to rotate from a first position to a second position in a preset direction and play positioning audio in a process of rotation, and a loudness of the positioning audio is stable and unchanged when the positioning audio is being played; the receiving module is further configured to receive a plurality of pieces of collected audio, where the plurality of pieces of collected audio are audio respectively received by microphones of terminals of a plurality of users in a process of playing the positioning audio; the processing module is further configured to determine indication information based on the plurality of pieces of collected audio, where the indication information is used to determine a target position of the sound box, the target position is a position of the sound box corresponding to a case in which a sum of loudnesses of the received audio is largest in a process of receiving the positioning audio by terminals of the plurality of users, and the target position is a position in a process of rotating from the first position to the second position; and the sending module is further configured to send the indication information to the sound box.

In an embodiment, the processing module is further configured to: obtain an initial position of the center of the sound box and positions of the plurality of users; determine the central position of the plurality of users based on the positions of the plurality of users; calculate a theoretical sweet spot of the sound box relative to the central position of the plurality of users based on the initial position and the central position of the plurality of users, where when the sound box is located at the theoretical sweet spot, a connection line between the central position of the plurality of users and the center of the sound box is perpendicular to a loudspeaker surface of the sound box, and the loudspeaker surface faces the users; obtain a fine-tuning angle; and obtain the first position and the second position based on the theoretical sweet spot and the fine-tuning angle.

In an embodiment, the processing module is further configured to divide a space into a plurality of subspaces based on a quantity of N sound boxes, where each subspace corresponds to one of the sound boxes, and N is a positive integer greater than 1; the sending module is further configured to send a first playing instruction to each of the N sound boxes, where the first playing instruction is used to instruct the corresponding sound boxes to rotate from a first position to a second position in a preset direction and play positioning audio in a process of rotation, and a loudness of the positioning audio is stable and unchanged when the positioning audio is being played; the processing module is further configured to determine N pieces of indication information, where the N pieces of indication information correspond to the N sound boxes, and the indication information is used to determine target positions of the corresponding sound boxes; and the sending module is further configured to send the N pieces of indication information to the corresponding sound boxes respectively.

According to a sixth aspect, this application provides an electronic device, including one or more processors and a memory. The memory is configured to store one or more programs. When the one or more programs are executed by the one or more processors, the one or more processors are enabled to implement the method according to any one of the first aspect to the second aspect.

According to a seventh aspect, this application provides an electronic device, including one or more processors and a memory. The memory is configured to store one or more programs. When the one or more programs are executed by the one or more processors, the one or more processors are enabled to implement the method according to any possible implementation of the first aspect.

According to an eighth aspect, this application provides a computer-readable storage medium, including a computer program. When the computer program is executed on a computer, the computer is enabled to perform the method according to any one of the first aspect to the second aspect.

According to a ninth aspect, this application further provides a computer program product. The computer program product includes computer program code. When the computer program code is run on a computer or a processor, the computer or the processor is enabled to perform the method according to any one of the first aspect to the second aspect.

DESCRIPTION OF EMBODIMENTS

To make the objectives, technical solutions, and advantages of this application clearer, the following clearly describes the technical solutions in this application with reference to the accompanying drawings in this application. It is clear that the described embodiments are merely some rather than all embodiments of this application. All other embodiments obtained by a person of ordinary skill in the art based on embodiments of this application without creative efforts shall fall within the protection scope of this application.

In embodiments, claims, and accompanying drawings of this application, terms "first", "second", and the like are merely intended for distinguishing and description, and shall not be understood as an indication or implication of relative importance or an indication or implication of an order. In addition, the terms "include", "have", and any variant thereof are intended to cover non-exclusive inclusion, for example, include a series of operations or units. Methods, systems, products, or devices are not necessarily limited to those operations or units that are literally listed, but may include other operations or units that are not literally listed or that are inherent to such processes, methods, products, or devices.

It should be understood that in this application, "at least one (item)" refers to one or more and "a plurality of" refers to two or more. The term "and/or" is used for describing an association relationship between associated objects, and represents that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following" or a similar expression thereof indicates any combination of the following, including any combination of one or more of the following. For example, at least one of a, b, or c may indicate a, b, c, a and b, a and c, b and c, or a, b, and c, where a, b, and c may be singular or plural.

Figure 1:
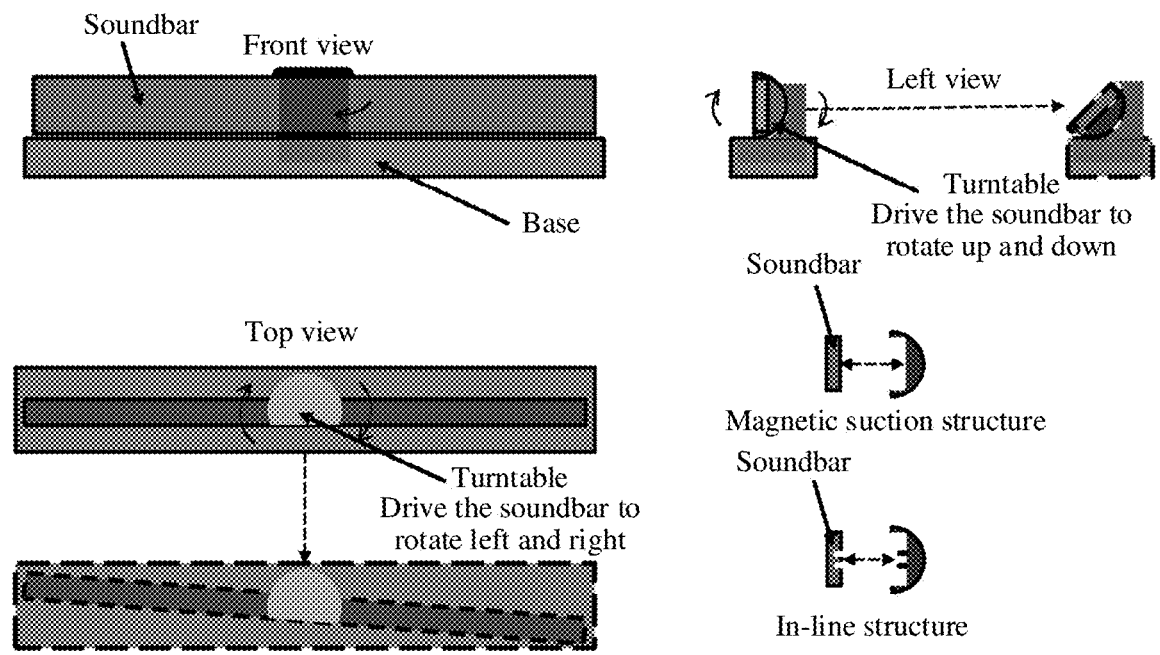
FIG. 1 is a diagram of an example structure of an audio playing apparatus according to an embodiment.

FIG. 1 is a diagram of an example structure of an audio playing apparatus according to an embodiment. As shown in FIG. 1, the audio playing apparatus includes a base, a turntable, and a soundbar. The soundbar is disposed on the turntable by using a magnetic suction structure or an in-line structure, and the turntable is embedded on the base. The turntable drives the soundbar to rotate, and the soundbar can rotate left and right in a horizontal direction and can also rotate up and down in a vertical direction. In addition, the turntable can provide signals and supply power.

The audio playing apparatus is an independent individual separated from a video playing apparatus (for example, a television or a computer), and the video playing apparatus does not move when the soundbar is rotated.

It should be noted that the audio playing apparatus shown in FIG. 1 is merely used as an example to describe an embodiment of the audio playing apparatus used in this application, but does not constitute any limitation on the audio playing apparatus.

For example, the soundbar may be disposed at the bottom of the television and mounted on the rotatable base. If the soundbar needs to be rotated, the base can be controlled to rotate, and then the soundbar is driven to rotate, but the television does not need to rotate. In another example, the soundbar may be disposed at the bottom of the television and mounted on the rotatable base together with the television. If the soundbar needs to be rotated, the base can be controlled to rotate, and then the soundbar and the television are driven to rotate together.

Based on the foregoing audio playing apparatus with the rotatable soundbar, this application provides a sound box position adjustment method and an audio rendering method, to accurately determine a position of a user through positioning, and then control a rotation direction of the soundbar, so that an optimal hearing position (a sweet spot) of audio played by the soundbar is exactly the position of the user.

The foregoing sound box position adjustment method and audio rendering method may be applied to a control apparatus. The control apparatus may be disposed on an electronic device that can be in communication with (for example, Bluetooth connection to) a soundbar, and the electronic device may be, for example, a mobile phone, a tablet computer, or a smart television.

Figure 2:
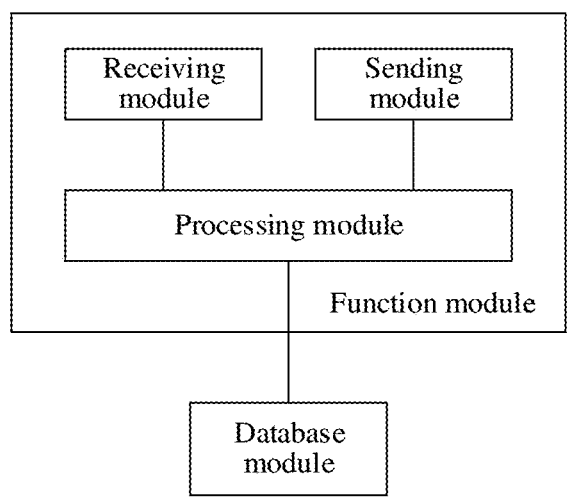
FIG. 2 is a diagram of an example structure of a control apparatus according to an embodiment.

FIG. 2 is a diagram of an example structure of a control apparatus according to an embodiment. As shown in FIG. 2, the control apparatus includes a function module and a database module.

The function module includes a receiving module, a processing module, and a sending module. The receiving module is configured to receive audio data and an instruction that are obtained by an electronic device. The processing module is configured to perform calculation and processing based on the instruction and the audio data to obtain a target position, and then calculate an audio filter coefficient to implement audio rendering. The sending module is configured to send the instruction to a soundbar to control the soundbar to rotate to the target position.

The database module is configured to store information about a historical sweet spot, where the information includes coordinates of the sweet spot, and a target horizontal angle and the audio filter coefficient that correspond to the sweet spot. When a position of a user is consistent with the calculated sweet spot, the information about the sweet spot may be directly obtained from the database module. In this way, a calculation amount can be reduced, and efficiency of sweet spot positioning and audio rendering can be improved.

It should be noted that a framework of the control apparatus shown in FIG. 2 is merely an example, and does not constitute any limitation on an execution body of the method in this application.

Figure 3:
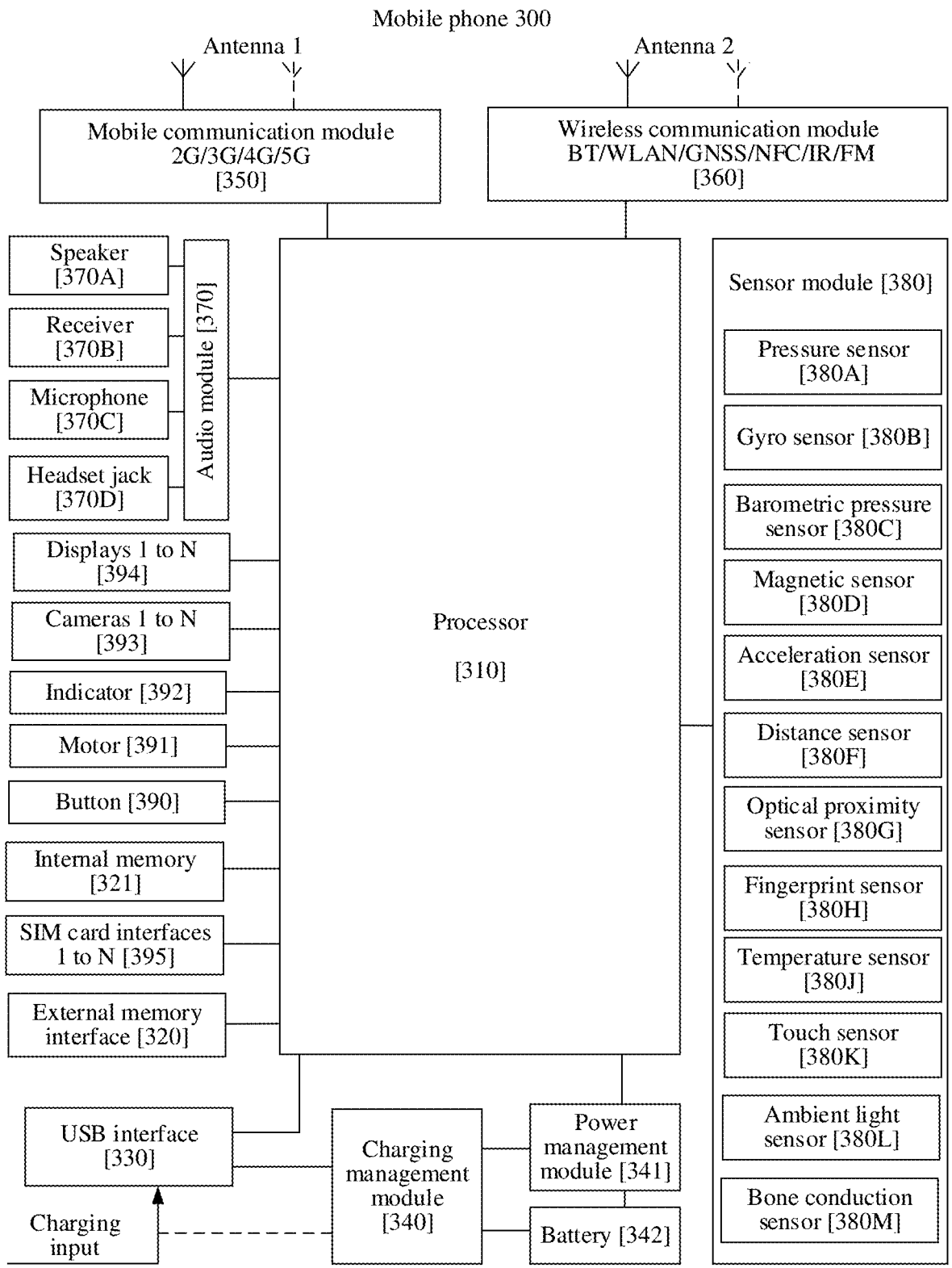
FIG. 3 is a schematic diagram of an example of an electronic device according to an embodiment.

FIG. 3 is a schematic diagram of an example of an electronic device according to an embodiment. FIG. 3 is a schematic diagram of a structure of the electronic device when being a mobile phone.

As shown in FIG. 3, the mobile phone 300 may include a processor 310, an external memory interface 320, an internal memory 321, a universal serial bus (USB) interface 330, a charging management module 340, a power management module 341, a battery 342, an antenna 1, an antenna 2, a mobile communication module 350, a wireless communication module 360, an audio module 370, a speaker 370A, a receiver 370B, a microphone 370C, a headset jack 370D, a sensor module 380, a button 390, a motor 391, an indicator 392, a camera 393, a display 394, a subscriber identity module (SIM) card interface 395, and the like. The sensor module 380 may include a pressure sensor 380A, a gyro sensor 380B, a barometric pressure sensor 380C, a magnetic sensor 380D, an acceleration sensor 380E, a distance sensor 380F, an optical proximity sensor 380G, a fingerprint sensor 380H, a temperature sensor 380J, a touch sensor 380K, an ambient light sensor 380L, a bone conduction sensor 380M, and the like.

It may be understood that the structure shown in this embodiment constitutes no specific limitation on the mobile phone 300. In some other embodiments of this application, the mobile phone 300 may include more or fewer components than components shown in the figure, some components may be combined, some components may be split, or there may be a different component arrangement. The components shown in the figure may be implemented by hardware, software, or a combination of software and hardware.

The processor 310 may include one or more processing units. For example, the processor 310 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The controller may generate an operation control signal based on an instruction operation code and a time sequence signal, to complete control of instruction reading and instruction execution.

A memory may be further disposed in the processor 310, and is configured to store instructions and data. In some embodiments, the memory in the processor 310 is a cache. The memory may store instructions or data just used or cyclically used by the processor 310. If the processor 310 needs to use the instructions or the data again, the processor may directly invoke the instructions or the data from the memory. This avoids repeated access and reduces waiting time of the processor 310. Therefore, system efficiency is improved.

In this application, the processor 310 may cooperate with the mobile communication module 350 or the wireless communication module 360 to implement a function of the foregoing control apparatus. In an embodiment, the processor 310 may further cooperate with the audio module 370 and the microphone 370C to receive audio played by a soundbar and then implement a function of the foregoing control apparatus.

In some embodiments, the processor 310 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes one serial data line (SDA) and one serial clock line (SCL). In some embodiments, the processor 310 may include a plurality of groups of I2C buses. The processor 310 may be coupled to the touch sensor 380K, a charger, a flash light, the camera 393, and the like through different I2C bus interfaces. For example, the processor 310 may be coupled to the touch sensor 380K through the I2C interface, so that the processor 310 communicates with the touch sensor 380K through the I2C bus interface to implement a touch function of the mobile phone 300.

The I2S interface may be configured to perform audio communication. In some embodiments, the processor 310 may include a plurality of groups of I2S buses. The processor 310 may be coupled to the audio module 370 through the I2S bus, to implement communication between the processor 310 and the audio module 370. In some embodiments, the audio module 370 may transmit an audio signal to the wireless communication module 360 through the I2S interface, to implement a function of answering a call through a Bluetooth headset.

The PCM interface may also be configured to perform audio communication, and sample, quantize, and code an analog signal. In some embodiments, the audio module 370 may be coupled to the wireless communication module 360 through the PCM bus interface. In some embodiments, the audio module 370 may also transmit an audio signal to the wireless communication module 360 through the PCM interface, to implement a function of answering a call through a Bluetooth headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 310 to the wireless communication module 360. For example, the processor 310 communicates with a Bluetooth module in the wireless communication module 360 through the UART interface, to implement a Bluetooth function. In some embodiments, the audio module 370 may transmit an audio signal to the wireless communication module 360 through the UART interface, to implement a function of playing music through a Bluetooth headset.

The MIPI interface may be configured to connect the processor 310 to a peripheral component such as the display 394 or the camera 393. The MIPI interface includes a camera serial interface (CSI), a display serial interface (DSI), and the like. In some embodiments, the processor 310 communicates with the camera 393 through the CSI interface, to implement a photographing function of the mobile phone 300. The processor 310 communicates with the display 394 through the DSI interface, to implement a display function of the mobile phone 300.

The GPIO interface may be configured by software. The GPIO interface may be configured as a control signal or a data signal. In some embodiments, the GPIO interface may be configured to connect the processor 310 to the camera 393, the display 394, the wireless communication module 360, the audio module 370, the sensor module 380, and the like. The GPIO interface may alternatively be configured as an I2C interface, an I2S interface, a UART interface, an MIPI interface, or the like.

The USB interface 330 is an interface that conforms to a USB standard specification, and may be specifically a mini USB interface, a micro USB interface, a USB Type-C interface, or the like. The USB interface 330 may be configured to connect to a charger to charge the mobile phone 300, and may also be configured to transmit data between the mobile phone 300 and a peripheral device, or may be configured to connect to a headset for playing audio through the headset. The interface may be alternatively configured to connect to another mobile phone, for example, an AR device.

It may be understood that an interface connection relationship between the modules shown in this embodiment is merely an example for description, and does not constitute any limitation on the structure of the mobile phone 300. In some other embodiments of this application, the mobile phone 300 may alternatively use an interface connection manner different from that in the foregoing embodiment, or use a combination of a plurality of interface connection manners.

The charging management module 340 is configured to receive a charging input from the charger. The charger may be a wireless charger or a wired charger. In some embodiments of wired charging, the charging management module 340 may receive a charging input from the wired charger through the USB interface 330. In some embodiments of wireless charging, the charging management module 340 may receive a wireless charging input by using a wireless charging coil of the mobile phone 300. The charging management module 340 supplies power to the mobile phone by using the power management module 341 while charging the battery 342.

The power management module 341 is configured to connect the battery 342, the charging management module 340, and the processor 310. The power management module 341 receives an input of the battery 342 and/or the charging management module 340, to supply power to the processor 310, the internal memory 321, the display 394, the camera 393, the wireless communication module 360, and the like. The power management module 341 may further be configured to monitor parameters such as a battery capacity, a battery cycle count, and a battery health status (electric leakage or impedance). In some other embodiments, the power management module 341 may alternatively be disposed in the processor 310. In some other embodiments, the power management module 341 and the charging management module 340 may alternatively be disposed in a same component.

A wireless communication function of the mobile phone 300 may be implemented by using the antenna 1, the antenna 2, the mobile communication module 350, the wireless communication module 360, the modem processor, the baseband processor, and the like.

The antenna 1 and the antenna 2 are configured to transmit and receive an electromagnetic wave signal. Each antenna in the mobile phone 300 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 350 may provide a solution, applied to the mobile phone 300, to wireless communication including 2G, 3G, 4G, 5G, and the like. The mobile communication module 350 may include at least one filter, a switch, a power amplifier, a low noise amplifier (LNA), and the like. The mobile communication module 350 may receive an electromagnetic wave through the antenna 1, perform processing such as filtering or amplification on the received electromagnetic wave, and transmit the electromagnetic wave to the modem processor for demodulation. The mobile communication module 350 may further amplify a signal modulated by the modem processor, and convert the signal into an electromagnetic wave for radiation through the antenna 1. In some embodiments, at least some function modules in the mobile communication module 350 may be disposed in the processor 310. In some embodiments, at least some function modules in the mobile communication module 350 and at least some modules in the processor 310 may be disposed in a same component.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (not limited to the speaker 370A, the receiver 370B, or the like), or displays an image or a video on the display 394. In some embodiments, the modem processor may be an independent component. In some other embodiments, the modem processor may be independent of the processor 310, and is disposed in a same device as the mobile communication module 350 or another function module.

The wireless communication module 360 may provide a wireless communication solution that is applied to the mobile phone 300 and that includes a wireless local area network (WLAN) (for example, a wireless fidelity (Wi-Fi) network), Bluetooth (BT), a global navigation satellite system (GNSS), frequency modulation (FM), a near field communication (NFC) technology, and an infrared (IR) technology. The wireless communication module 360 may be one or more components integrating at least one communication processing module. The wireless communication module 360 receives an electromagnetic wave through the antenna 2, performs frequency modulation and filtering processing on the electromagnetic wave signal, and sends a processed signal to the processor 310. The wireless communication module 360 may further receive a to-be-sent signal from the processor 310, perform frequency modulation and amplification on the signal, and convert the signal into an electromagnetic wave for radiation through the antenna 2.

In some embodiments, the antenna 1 of the mobile phone 300 is coupled to the mobile communication module 350, and the antenna 2 is coupled to the wireless communication module 360, so that the mobile phone 300 can communicate with a network and another device by using a wireless communication technology. The wireless communication technology may include a global system for mobile communication (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The mobile phone 300 implements a display function by using the GPU, the display 394, the application processor, and the like. The GPU is a microprocessor for image processing, and is connected to the display 394 and the application processor. The GPU is configured to: perform mathematical and geometric computation, and render an image. The processor 310 may include one or more GPUs that execute program instructions to generate or change display information.

The display 394 is configured to display an image, a video, and the like. The display 394 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the mobile phone 300 may include one or N displays 394, where N is a positive integer greater than 1.

The mobile phone 300 may implement a photographing function by using the ISP, the camera 393, the video codec, the GPU, the display 394, the application processor, and the like.

The ISP is configured to process data fed back by the camera 393. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 393.

The camera 393 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the mobile phone 300 may include one or N cameras 393, where N is a positive integer greater than 1.

The digital signal processor is configured to process a digital signal, and may process another digital signal in addition to the digital image signal. For example, when the mobile phone 300 selects a frequency, the digital signal processor is configured to perform Fourier transform on frequency energy, and the like.

The video codec is configured to compress or decompress a digital video. The mobile phone 300 may support one or more types of video codecs. In this way, the mobile phone 300 can play or record videos in a plurality of coding formats, for example, moving picture experts group (MPEG)-1, MPEG-2, MPEG-3, and MPEG-4.

The NPU is a neural-network (NN) computing processor, quickly processes input information by referring to a structure of a biological neural network, for example, by referring to a mode of transmission between human brain neurons, and may further continuously perform self-learning. Applications such as intelligent cognition of the mobile phone 300, such as image recognition, facial recognition, speech recognition, and text understanding, can be implemented by using the NPU.

The external memory interface 320 may be configured to connect to an external storage card such as a micro SD card, to extend a storage capability of the mobile phone 300. The external storage card communicates with the processor 310 through the external memory interface 320, to implement a data storage function. For example, files such as music and videos are stored in the external storage card.

The internal memory 321 may be configured to store computer-executable program code. The executable program code includes instructions. The internal memory 321 may include a program storage area and a data storage area. The program storage area may store an operating system, an application required by at least one function (for example, a sound playing function or an image playing function), and the like. The data storage area may store data (such as audio data and an address book) created during use of the mobile phone 300, and the like. In addition, the internal memory 321 may include a high-speed random access memory, and may further include a nonvolatile memory, for example, at least one magnetic disk storage device, a flash memory device, or a universal flash storage (UFS). The processor 310 runs the instructions stored in the internal memory 321 and/or the instructions stored in the memory disposed in the processor, to execute various function applications of the mobile phone 300 and data processing.

The mobile phone 300 may implement an audio function such as music playing or recording through the audio module 370, the speaker 370A, the receiver 370B, the microphone 370C, the headset jack 370D, the application processor, and the like.

The audio module 370 is configured to convert digital audio information into an analog audio signal for output, and is also configured to convert an analog audio input into a digital audio signal. The audio module 370 may be further configured to code and decode audio signals. In some embodiments, the audio module 370 may be disposed in the processor 310, or some function modules in the audio module 370 are disposed in the processor 310.

The speaker 370A, also referred to as a "loudspeaker", is configured to convert an audio electrical signal into a sound signal. Music may be listened to or a hands-free call may be answered by using the speaker 370A of the mobile phone 300.

The receiver 370B, also referred to as an "earpiece", is configured to convert an audio electrical signal into a sound signal. When a call is answered or voice information is received by using the mobile phone 300, the receiver 370B may be put close to a human ear to listen to a voice.

The microphone 370C, also referred to as a "mike" or a "mic", is configured to convert a sound signal into an electrical signal. When making a call or sending a voice message, a user may place the mouth of the user near the microphone 370C to make a sound, to input a sound signal to the microphone 370C. At least one microphone 370C may be disposed in the mobile phone 300. In some other embodiments, two microphones 370C may be disposed in the mobile phone 300, to collect a sound signal and further implement a noise reduction function. In some other embodiments, three, four, or more microphones 370C may alternatively be disposed in the mobile phone 300, to collect a sound signal, reduce noise, further identify a sound source, implement a directional recording function, and the like.

The headset jack 370D is configured to connect to a wired headset. The headset jack 370D may be the USB interface 330, a 3.5 mm open mobile terminal platform (OMTP) standard interface, or a cellular telecommunications industry association of the USA (CTIA) standard interface.

The pressure sensor 380A is configured to sense a pressure signal, and can convert the pressure signal into an electrical signal. In some embodiments, the pressure sensor 380A may be disposed in the display 394. There are many types of pressure sensors 380A, for example, a resistive pressure sensor, an inductive pressure sensor, and a capacitive pressure sensor. The capacitive pressure sensor may include at least two parallel plates made of conductive materials.

The gyro sensor 380B may be configured to determine a moving posture of the mobile phone 300.

The barometric pressure sensor 380C is configured to measure barometric pressure.

The magnetic sensor 380D includes a Hall sensor.

The acceleration sensor 380E may detect values of acceleration in various directions (usually on three axes) of the mobile phone 300.

The distance sensor 380F is configured to measure a distance.

The optical proximity sensor 380G may include, for example, a light-emitting diode (LED) and an optical detector such as a photodiode. The light emitting diode may be an infrared light emitting diode.

The ambient light sensor 380L is configured to sense ambient light brightness.

The fingerprint sensor 380H is configured to collect a fingerprint.

The temperature sensor 380J is configured to detect a temperature.

The touch sensor 380K is also referred to as a "touch component". The touch sensor 380K may be disposed in the display 394. The touch sensor 380K and the display 394 constitute a touchscreen, which is also referred to as a "touch screen". The touch sensor 380K is configured to detect a touch operation on or near the touch sensor 380K. The touch sensor may transfer the detected touch operation to the application processor to determine a type of the touch event. A visual output related to the touch operation may be provided through the display 394. In some other embodiments, the touch sensor 380K may alternatively be disposed on a surface of the mobile phone 300 in a position different from a position of the display 394.

The bone conduction sensor 380M may obtain a vibration signal.

The button 390 includes a power button, a volume button, and the like. The button 390 may be a mechanical button, or a touch button. The mobile phone 300 may receive a key input, and generate a key signal input related to a user setting and function control of the mobile phone 300.

The motor 391 may generate a vibration prompt. The motor 391 may be configured to produce an incoming call vibration prompt and a touch vibration feedback.

The indicator 392 may be an indicator light, and may be configured to indicate a charging status and a power change, or may be configured to indicate a message, a missed call, a notification, and the like.

The SIM card interface 395 is configured to connect to a SIM card. The SIM card may be inserted into the SIM card interface 395 or removed from the SIM card interface 395, to implement contact with or separation from the mobile phone 300. The mobile phone 300 may support one or N SIM card interfaces, where N is a positive integer greater than 1. The SIM card interface 395 may support a nano-SIM card, a micro-SIM card, a SIM card, and the like. The mobile phone 300 interacts with a network by using the SIM card, to implement functions such as calling and data communication. In some embodiments, the mobile phone 300 uses an eSIM, namely, an embedded SIM card. The eSIM card may be embedded in the mobile phone 300, and cannot be separated from the mobile phone 300.

It may be understood that the structure shown in this embodiment does not constitute a specific limitation on the electronic device. In some other embodiments of this application, the electronic device may include more or fewer components than those shown in the figure, some components may be combined, some components may be split, or there may be a different component arrangement. The components shown in the figure may be implemented by hardware, software, or a combination of software and hardware.

Figure 4:
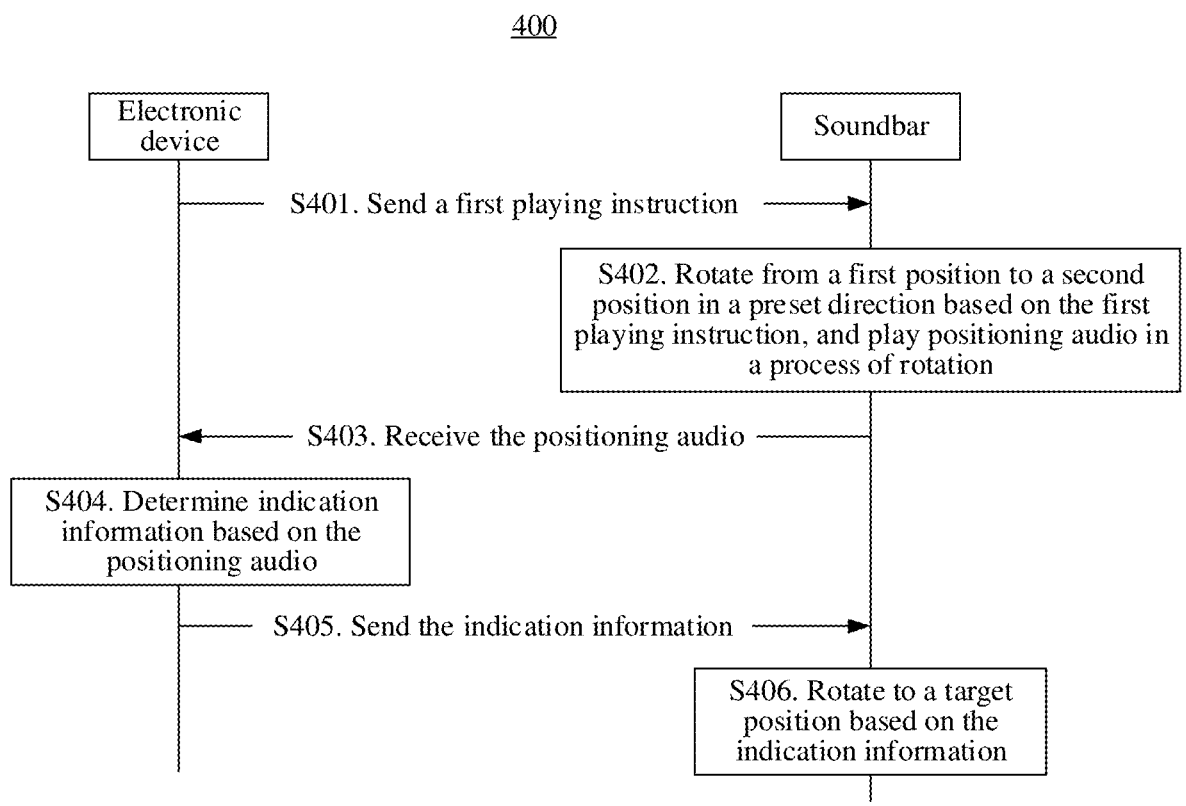
FIG. 4 is a flowchart of an example of a process 400 of a sound box position adjustment method according to an embodiment.

FIG. 4 is a flowchart of an example of a process 400 of a sound box position adjustment method according to an embodiment. The process 400 may be performed by the electronic device shown in FIG. 3 and a soundbar together. The process 400 is described as a series of steps or operations. It should be understood that the steps or operations of the process 400 may be performed in various sequences and/or simultaneously, not limited to an execution sequence shown in FIG. 4. The process 400 may include:

S401. An electronic device sends a first playing instruction to a soundbar.

Before the sound box position adjustment method starts, a user may send a sweet spot positioning instruction by using an interaction interface provided by an application (APP) installed on the electronic device. Based on the instruction, the electronic device starts to perform the operations of the sound box position adjustment method. First, the electronic device sends the first playing instruction to the soundbar. The first playing instruction is used to instruct the soundbar to rotate from a first position to a second position in a preset direction and play positioning audio in a process of rotation. In an embodiment, the preset direction includes a horizontal clockwise direction or a horizontal counterclockwise direction. In an embodiment, the rotating in a preset direction includes rotating at a uniform speed in the preset direction.

In an embodiment, a shape of the sound box includes a bar shape, a square shape, a ring shape, or the like. The shape of the sound box is not specifically limited in this application. The following uses a soundbar (soundbar) as an example for description. It should be understood that the sound box position adjustment method provided in this application may be further applied to position adjustment of a sound box such as a square-shaped sound box or a ring-shaped sound box.

The positioning audio is full-band audio that satisfies a specified condition. For example, the positioning audio may be full-band audio whose sound pressure level is not less than 65 dB and signal-to-noise ratio is not less than 20 dB, including white noise, pink noise, or a sweep signal. A loudness of the positioning audio is stable and unchanged when the positioning audio is being played.

In an embodiment, a position of the soundbar may be represented by an angle of a first included angle between the soundbar and a wall. When the soundbar is parallel to the wall, the angle of the first included angle is 0°. The soundbar rotates counterclockwise from the angle 0°, and when the soundbar rotates to be perpendicular to the wall, the angle of the first included angle is 90°, and the angle of the first included angle changes from 0° to 90° in the process of rotation. The soundbar rotates clockwise from the angle 0°, and when the soundbar rotates to be perpendicular to the wall, the angle of the first included angle is −90°, and the angle of the first included angle changes from 0° to −90° in the process of rotation. It can be learned that when an opening of the first included angle faces leftward, the angle value of the first included angle is positive; and when the opening of the first included angle faces rightward, the angle value of the first included angle is negative.

In an embodiment, a position of the soundbar may alternatively be represented by an angle of a second included angle between a vertical line of the center of the soundbar and a vertical line of a wall. When the soundbar is parallel to the wall, the vertical line of the center of the soundbar is parallel to or coincides with the vertical line of the wall. In this case, the angle of the second included angle is 0°. The soundbar rotates counterclockwise from the angle 0°, and when the soundbar rotates to be perpendicular to the wall, the vertical line of the center of the soundbar and the vertical line of the wall are perpendicular to each other. In this case, the angle of the second included angle is 90°, and the angle of the second included angle changes from 0° to 90° in the process of rotation. The soundbar rotates clockwise from the angle 0°, and when the soundbar rotates to be perpendicular to the wall, the vertical line of the center of the soundbar and the vertical line of the wall are perpendicular to each other. In this case, the angle of the second included angle is −90°, and the angle of the second included angle changes from 0° to −90° in the process of rotation. It can be learned that when the vertical line of the center of the soundbar is located on the right of the vertical line of the wall, the angle value of the second included angle is positive; and when the vertical line of the center of the soundbar is located on the left of the vertical line of the wall, the angle value of the second included angle is negative.

Therefore, the first position and the second position may both be represented by the angle value of the first angle or the second angle, and that the soundbar rotates at the uniform speed from the first position to the second position may be described as that the soundbar rotates at the uniform speed from a first angle to a second angle, where the first angle and the second angle are respectively two angle values of the first included angle, or the first angle and the second angle are respectively two angle values of the second included angle.

In an embodiment, before sending the first playing instruction to the soundbar, the electronic device may first obtain an initial position of the center of the soundbar and a position of the user, calculate a theoretical sweet spot of the soundbar relative to the position of the user based on the initial position and the position of the user, obtain a fine-tuning angle, and then obtain the first position and the second position based on the theoretical sweet spot and the fine-tuning angle.

When the soundbar is located at the theoretical sweet spot, a connection line between the position of the user and the center of the soundbar is perpendicular to a loudspeaker surface of the soundbar, and the loudspeaker surface faces the user. The loudspeaker surface of the soundbar is a surface of a face on which a loudspeaker of the soundbar is located. Generally, the loudspeaker is disposed on a face of the sound box. In this case, the loudspeaker surface is the face. Alternatively, the loudspeaker of the sound box is disposed on a plurality of faces of the sound box. In this case, the loudspeaker surface is a face of the sound box facing the user.

The first position is a position in which the soundbar rotates through the fine-tuning angle from the theoretical sweet spot to the preset direction; and the second position is a position in which the soundbar rotates through the fine-tuning angle from the theoretical sweet spot to a reverse direction of the preset direction.

In this application, an interaction interface (for example, a room configuration interface, which may be described in FIG. 11 below) provided by an APP may be used. The user enters a first virtual position in the interface, where the first virtual position is used to simulate a position of the center of a soundbar in a room, and an initial position of the center of the soundbar may be calculated based on the first virtual position. The initial position may be represented in a form of coordinates. Alternatively, the user may enter a second virtual position in the interaction interface. The second virtual position is used to simulate a position of the user in the room. The position of the user may be calculated based on the second virtual position, and the position of the user may also be represented in a form of coordinates.

Figure 13:
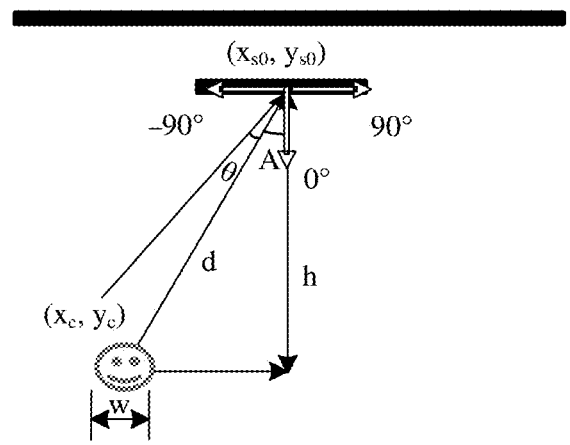
FIG. 13 is a schematic diagram of an example of an initial horizontal angle according to an embodiment.

For example, the theoretical sweet spot of the soundbar may be obtained according to formulas (1) to (3):

$$d = \sqrt{(x_c - x_{s0})^2 + (y_c - y_{s0})^2} \tag{1}$$

where d represents a straight-line distance between the position of the user and the center of the soundbar, $(x_c, y_c)$ represents the position of the user, and $(x_{s0}, y_{s0})$ represents the initial position of the center of the soundbar;

$$h = |y_c - y_{s0}| \tag{2}$$

where h represents a vertical distance between the position of the user and the center of the soundbar; and $$A = \pm \arccos\left(\frac{h}{d}\right) \tag{3}$$

where A represents an angle value corresponding to the theoretical sweet spot of the soundbar. For example, as shown in FIG. 13, before the soundbar rotates, an angle corresponding to the foregoing second included angle is A. An objective of sweet spot positioning is to make the connection line between the center of the soundbar and the position of the user perpendicular to the loudspeaker surface of the soundbar. Therefore, the soundbar needs to rotate clockwise through an angle A to achieve the objective, and the angle A is the theoretical sweet spot corresponding to the soundbar.

However, because the position of the user is entered by the user in the interaction interface, an error may occur between the position and an actual position of the user. Therefore, the position of the soundbar needs to be fine-tuned based on the theoretical sweet spot, to determine an accurate target position.

As shown in FIG. 13, one side of an included angle corresponding to the fine-tuning angle θ is a connection line between the position of the user and the center of the soundbar. The fine-tuning angle θ is calculated according to formula (4):

$$\theta = \pm \arctan\left(\frac{2w + \sqrt{d^2 - h^2}}{h}\right) - A \quad (4)$$

where w represents a double binaural distance, and w may be a preset fixed value, or may be preset by the user.

In an embodiment, the fine-tuning angle θ may be directly entered by the user in the interaction interface (for example, a precise sweet spot positioning interface, referring to FIG. 12k below).

In an embodiment, the first angle corresponding to the first position may be A−θ, and the second angle corresponding to the second position may be A+θ; or the first angle corresponding to the first position may be A+θ, and the second angle corresponding to the second position may be A−θ.

In an embodiment, when the initial position of the center of the soundbar and the position of the user has satisfied the objective that the connection line between the center of the soundbar and the position of the user is perpendicular to the loudspeaker surface of the soundbar, it is unnecessary to perform sweet spot positioning. Therefore, before sweet spot positioning, whether sweet spot positioning is required may be determined based on the principle and the initial position of the center of the soundbar and the position of the user. If sweet spot positioning is required, a process of sweet spot positioning starts.

S402. The soundbar rotates from a first position to a second position in a preset direction based on the first playing instruction, and plays positioning audio in a process of rotation.

After receiving the first playing instruction, the soundbar obtains the first position and the second position from the first playing instruction, and plays the positioning audio, for example, a pre-recorded rain sound, while rotating in a preset rotation direction, for example, from A−θ to A+θ, or from A+θ to A−θ.

S403. The electronic device receives the positioning audio.

A microphone on the electronic device receives the positioning audio.

S404. The electronic device determines indication information based on the positioning audio.

The soundbar rotates while playing positioning audio. Therefore, a loudness difference may exist between positioning audio received by the microphone of the electronic device. That is, when a position to which the soundbar rotates is far away from the electronic device, a loudness of positioning audio received by the electronic device decreases, while when a position to which the soundbar rotates is close to the electronic device, a loudness of positioning audio received by the electronic device increases. An objective of fine tuning is to find a position of the soundbar corresponding to a case in which a loudness of positioning audio received by the electronic device is largest. Because the loudness is detected by the electronic device of the user, when the soundbar is in the position, it may be considered that the sweet spot of the soundbar accurately falls in the position of the user.

In an embodiment, the electronic device may detect, at intervals of a specified time from a receiving start moment of the positioning audio, the positioning audio received within the specified time, to obtain a loudness. When a receiving end moment of the positioning audio arrives, the electronic device determines a difference between an end moment of the specified time corresponding to a largest loudness of a plurality of obtained loudnesses and the receiving start moment as a target time. The electronic device may synchronously receive the positioning audio and detect the loudness.

In an embodiment, the electronic device may detect the positioning audio to obtain a largest loudness, and then determine a difference between a moment corresponding to the largest loudness and a receiving start moment of the positioning audio as a target time. Alternatively, the electronic device may detect an entire segment of positioning audio after receiving all positioning audio.

The angle value corresponding to the target position of the soundbar may be calculated according to formula (5) or (6):

When the first angle is A−θ, and the second angle is A+θ, an angle value B corresponding to the target position is calculated according to formula (5):

$$B = (A - \theta) + vt \quad (5)$$

When playing of the positioning audio ends, the soundbar rotates to the second position (the corresponding second angle is A+θ). Therefore, the soundbar needs to rotate to the target position (the corresponding angle is B) reversely from the second position, that is, rotate from the angle A+θ to the angle B. According to formula (5), the angle through which the soundbar needs to rotate may be calculated as β=2θ−vt.

When the first angle is A+θ, and the second angle is A−θ, an angle value B corresponding to the target position is calculated according to formula (6):

$$B = (A + \theta) - vt \quad (6)$$

where v represents a rotation speed of the soundbar, the rotation speed may be preset, and t represents a target time.

When playing of the positioning audio ends, the soundbar rotates to the second position (the corresponding second angle is A−θ). Therefore, the soundbar needs to rotate to the target position (the corresponding angle is B) reversely from the second position, that is, rotate from the angle A−θ to the angle B. According to formula (6), the angle through which the soundbar needs to rotate may be calculated as β=2θ−vt.

It can be learned that, based on the target time obtained by using the foregoing method, the electronic device may determine indication information in the following several manners, and then the soundbar obtains, based on the indication information, an angle β=2θ−vt through which the soundbar needs to rotate.

(1) The electronic device determines the target time as the indication information.

In the soundbar, the fine-tuning angle θ in the foregoing formula may be obtained from information exchanged with the electronic device previously, and details are not described herein again. The rotation speed may be preset. The target time may be obtained from the indication information. The rotation direction may also be preset. Therefore, the soundbar may calculate, based on the information, the angle β through which the soundbar needs to rotate.

(2) The electronic device determines the target time and a reverse direction of the preset direction as the indication information.

In the soundbar, the fine-tuning angle θ in the foregoing formula may be obtained from information exchanged with the electronic device previously, and details are not described herein again. The rotation speed may be preset. The target time and the rotation direction (the reverse direction of the preset direction) may be obtained from the indication information. Therefore, the soundbar may calculate, based on the information, the angle β through which the soundbar needs to rotate.

(3) The electronic device determines the target time, a reverse direction of the preset direction, and the fine-tuning angle as the indication information.

In the soundbar, the fine-tuning angle θ and the target time in the foregoing formula, and the rotation direction (the reverse direction of the preset direction) may be all obtained from the indication information. The rotation speed may be preset. Therefore, the soundbar may calculate, based on the information, the angle β through which the soundbar needs to rotate.

(4) The electronic device determines a reverse direction of the preset direction and a target rotation angle as the indication information.

In the soundbar, the rotation direction (the reverse direction of the preset direction) may be obtained from the indication information. In this case, the soundbar does not need to calculate, according to the foregoing formula, the angle β through which the soundbar needs to rotate, and the angle may also be obtained from the indication information.

It should be noted that duration T of the positioning audio, a target time t, a fine-tuning angle θ, and a rotation speed v are mutually constrained, that is, an angle value B corresponding to the target position is obtained by using a fine tuning result, and the angle value B corresponding to the target position needs to fall within an angle range [A−θ, A+θ]. Therefore, −θ≤vt≤θ, and t≤T.

Therefore, the indication information determined by the electronic device may include the angle value B corresponding to the target position, or may include the target time t, and both of the two values may enable the soundbar to determine the target position of the soundbar.

S405. The electronic device sends the indication information to the soundbar.

S406. The soundbar rotates to a target position based on the indication information.

The indication information further has a function of indicating the soundbar to rotate from the second position to the target position. Therefore, after receiving the indication information, the soundbar first determines the target position, and then rotates from the current position to the target position.

For example, in a process of fine tuning, the soundbar rotates from the position corresponding to A−θ to the position corresponding to A+θ. After receiving the indication information, the soundbar rotates reversely through an angle (2θ−vt) from the position corresponding to A+θ to the position corresponding to B.

In another example, in a process of fine tuning, the soundbar rotates from the position corresponding to A+θ to the position corresponding to A−θ. After receiving the indication information, the soundbar rotates reversely through an angle (2θ−vt) from the position corresponding to A−θ to the position corresponding to B.

In this application, the soundbar and the electronic device cooperate with each other. The soundbar rotates from the first position to the second position at a uniform speed while playing positioning audio. The electronic device finds a position of the soundbar corresponding to a case in which a loudness is largest based on the received positioning audio, and controls the soundbar to rotate to the position. In this way, for a position of a user, more accurate crosstalk cancellation can be implemented, impact of different rooms can be eliminated, sound image effect can be enhanced, and original sound effect can be truly restored.

Figure 5:
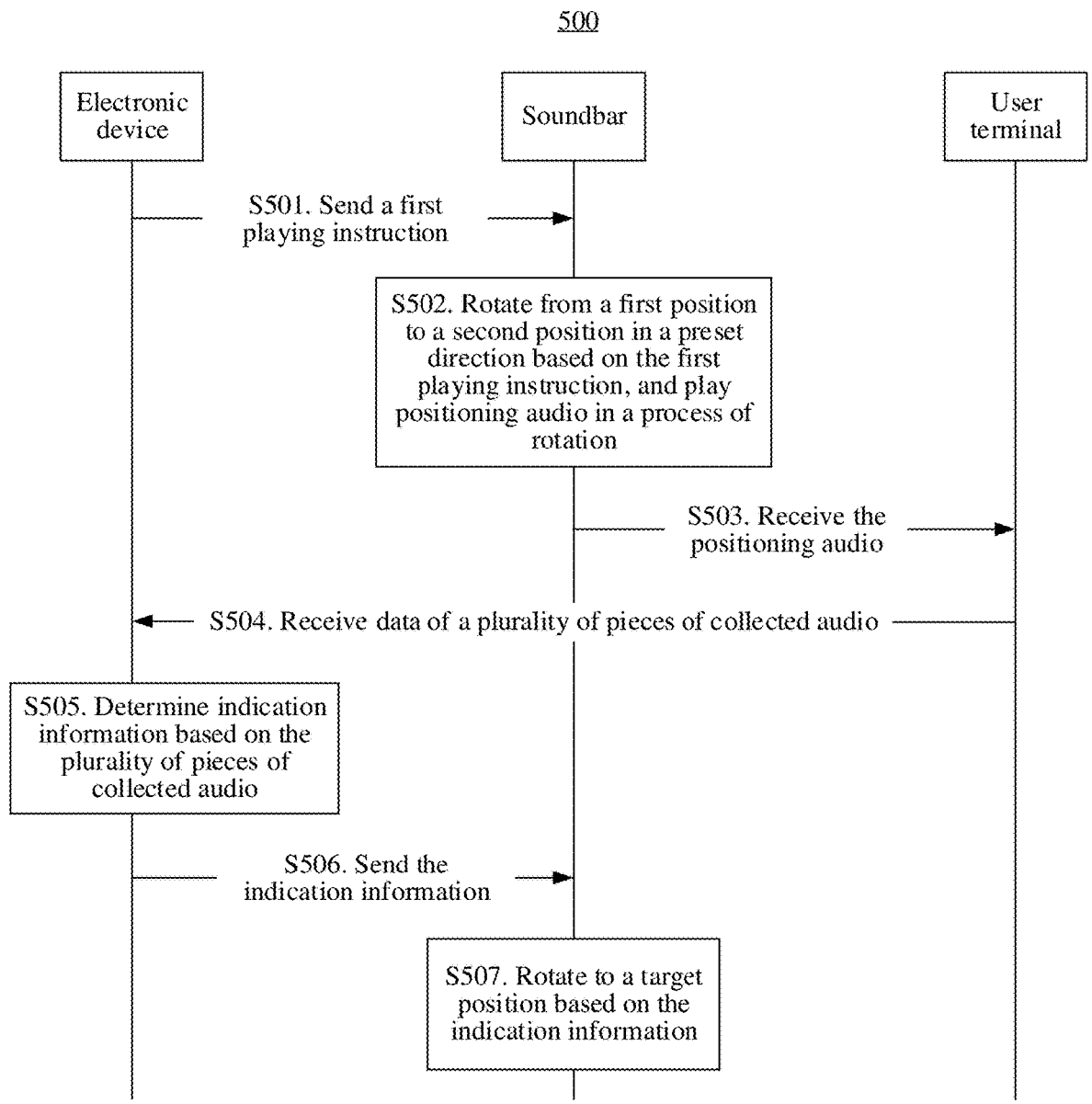
FIG. 5 is a flowchart of an example of a process 500 of a sound box position adjustment method according to an embodiment.

FIG. 5 is a flowchart of an example of a process 500 of a sound box position adjustment method according to an embodiment. The process 500 may be performed by the electronic device shown in FIG. 3 and a soundbar together. The process 500 is described as a series of steps or operations. It should be understood that the steps or operations of the process 500 may be performed in various sequences and/or simultaneously, not limited to an execution sequence shown in FIG. 5. The process 500 may include:

S501. An electronic device sends a first playing instruction to a soundbar.

For S501, refer to S401 in the embodiment shown in FIG. 4. Details are not described herein again.

S502. The soundbar rotates from a first position to a second position in a preset direction based on the first playing instruction, and plays positioning audio in a process of rotation.

For S501 and S502, refer to S401 and S402 in the embodiment shown in FIG. 4. Details are not described herein again. A difference lies in that, in calculation of a position of a user, the position of the user is changed to the central position of a plurality of users.

S503. A user terminal receives the positioning audio.

A difference between this embodiment and the embodiment shown in FIG. 4 lies in that a quantity of users in a room changes from one to a plurality. In this case, microphones of a plurality of user terminals in the room respectively receive positioning audio. Because positions of the user terminals are different, positions of the soundbars corresponding to the largest loudness of the received positioning audio are also different. In this case, a target position of the soundbar is found with reference to a sum of loudnesses of the soundbar received by the user terminals at sampling moments.

S504. The electronic device receives data of a plurality of pieces of collected audio.

The user terminal stores the received positioning audio, and sends the positioning audio to the electronic device in a form of audio data after receiving the positioning audio, and the electronic device performs calculation.

S505. The electronic device determines indication information based on the plurality of pieces of collected audio.

For S505, refer to S404 in the embodiment shown in FIG. 4. A difference lies in that the target time is determined based on a moment corresponding to a sum of largest loudnesses instead of a moment corresponding to a largest loudness.

S506. The electronic device sends the indication information to the soundbar.

S507. The soundbar rotates to a target position based on the indication information.

For S506 and S507, refer to S405 and S406 in the embodiment shown in FIG. 4. Details are not described herein again.

In this application, the soundbar and the electronic device cooperate with each other. The soundbar rotates from the first position to the second position at a uniform speed while playing positioning audio. The electronic device finds, based on the received plurality of pieces of sampled audio, a position of the soundbar corresponding to a case in which a sum of loudnesses is largest, and controls the soundbar to rotate to the position. In this way, for positions of a plurality of users, more accurate crosstalk cancellation can be implemented, impact of different rooms can be eliminated, sound image effect can be enhanced, and original sound effect can be truly restored.

Figure 6:
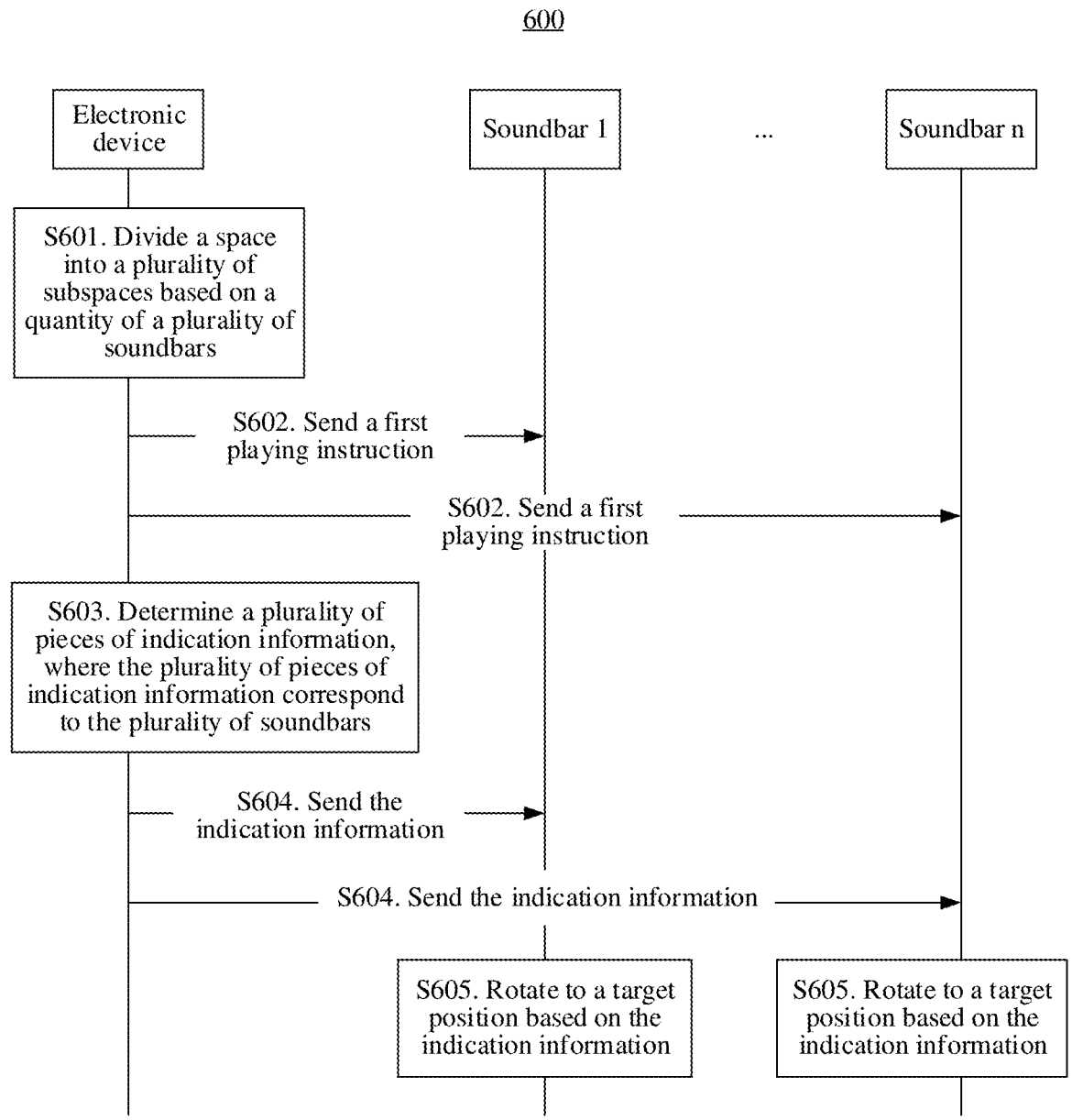
FIG. 6 is a flowchart of an example of a process 600 of a sound box position adjustment method according to an embodiment.

FIG. 6 is a flowchart of an example of a process 600 of a sound box position adjustment method according to an embodiment. The process 600 may be performed by the electronic device shown in FIG. 3 and a soundbar together. The process 600 is described as a series of steps or operations. It should be understood that the process 600 may be performed in various sequences and/or simultaneously, not limited to an execution sequence shown in FIG. 6. The process 600 may include:

S601. An electronic device divides a space into a plurality of subspaces based on a quantity of a plurality of soundbars.

Figure 15:
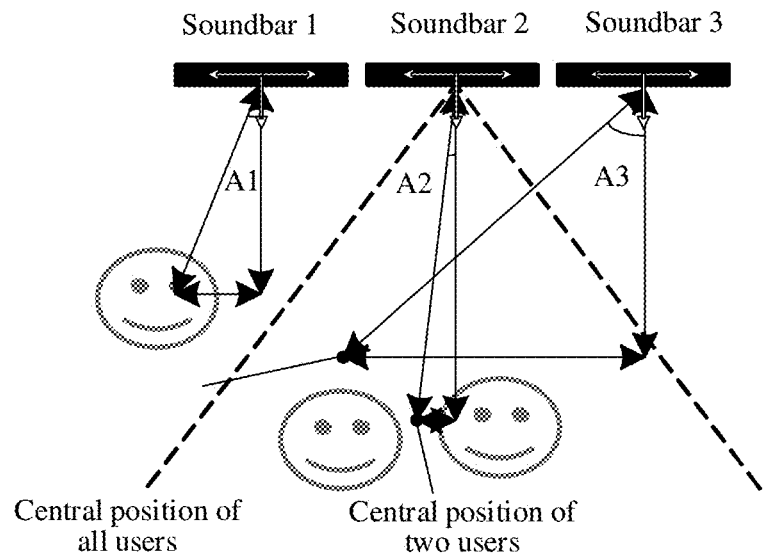
FIG. 15 is a schematic diagram of still another example of an initial horizontal angle according to an embodiment.

The electronic device first divides the space in the room based on the quantity of soundbars, where each soundbar corresponds to a subspace. For example, as shown in FIG. 15, there are three soundbars, and the center of a middle soundbar is used as a vertex. A space in a horizontal direction in front of the soundbar may be divided into three subspaces in a manner of evenly dividing an angle of 180° in the horizontal direction. A left subspace corresponds to a soundbar 1 and has one user, a middle subspace corresponds to a soundbar 2 and has two users, and a right subspace corresponds to a soundbar 3 and has no user. That is, in a scenario shown in FIG. 15, the three soundbars respectively correspond to the three subspaces, and based on quantities of users in the subspaces, relationships between the three soundbars and the quantities of users are respectively a one-to-one relationship, a one-to-many relationship, and a one-to-null relationship.

S602. The electronic device sends a first playing instruction to each of the plurality of soundbars.

S603. The electronic device determines a plurality of pieces of indication information, where the plurality of pieces of indication information correspond to the plurality of soundbars.

The electronic device determines a target position of each soundbar based on a space division result and the quantities of users in the subspaces.

For example, in the left subspace in FIG. 15, the target position of the soundbar 1 may be determined with reference to S402 to S404 in the embodiment shown in FIG. 4, and then the indication information of the soundbar may be determined. In the middle subspace in FIG. 15, the target position of the soundbar 2 may be determined with reference to A502 to S505 in the embodiment shown in FIG. 5, and then the indication information of the soundbar may be determined. A difference lies in that a plurality of users are limited to only two users in the middle subspace. In the right subspace in FIG. 15, the target position of the soundbar 2 may also be determined with reference to S502 to S505 in the embodiment shown in FIG. 5, and then the indication information of the soundbar may be determined. A difference lies in that the plurality of users include all users in the left subspace, the middle subspace, and the right subspace.

S604. The electronic device sends the plurality of pieces of indication information respectively to the corresponding soundbars.

S605. The soundbar rotates to a target position based on the indication information.

For S604 and S605, refer to S405 and S406 in the embodiment shown in FIG. 4. Details are not described herein again.

In this application, the plurality of soundbars and the electronic device cooperate with each other. The plurality of soundbars rotate from the first position to the second position at a uniform speed while playing positioning audio. For each soundbar, the electronic device finds a position of the soundbar corresponding to a case in which a loudness or a sum of loudnesses is largest in sampled audio received by a terminal of a user in a corresponding subspace, and controls the soundbar to rotate to the position. In this way, for positions of a plurality of users, more accurate crosstalk cancellation can be implemented, impact of different rooms can be eliminated, sound image effect can be enhanced, and original sound effect can be truly restored.

Figure 7:
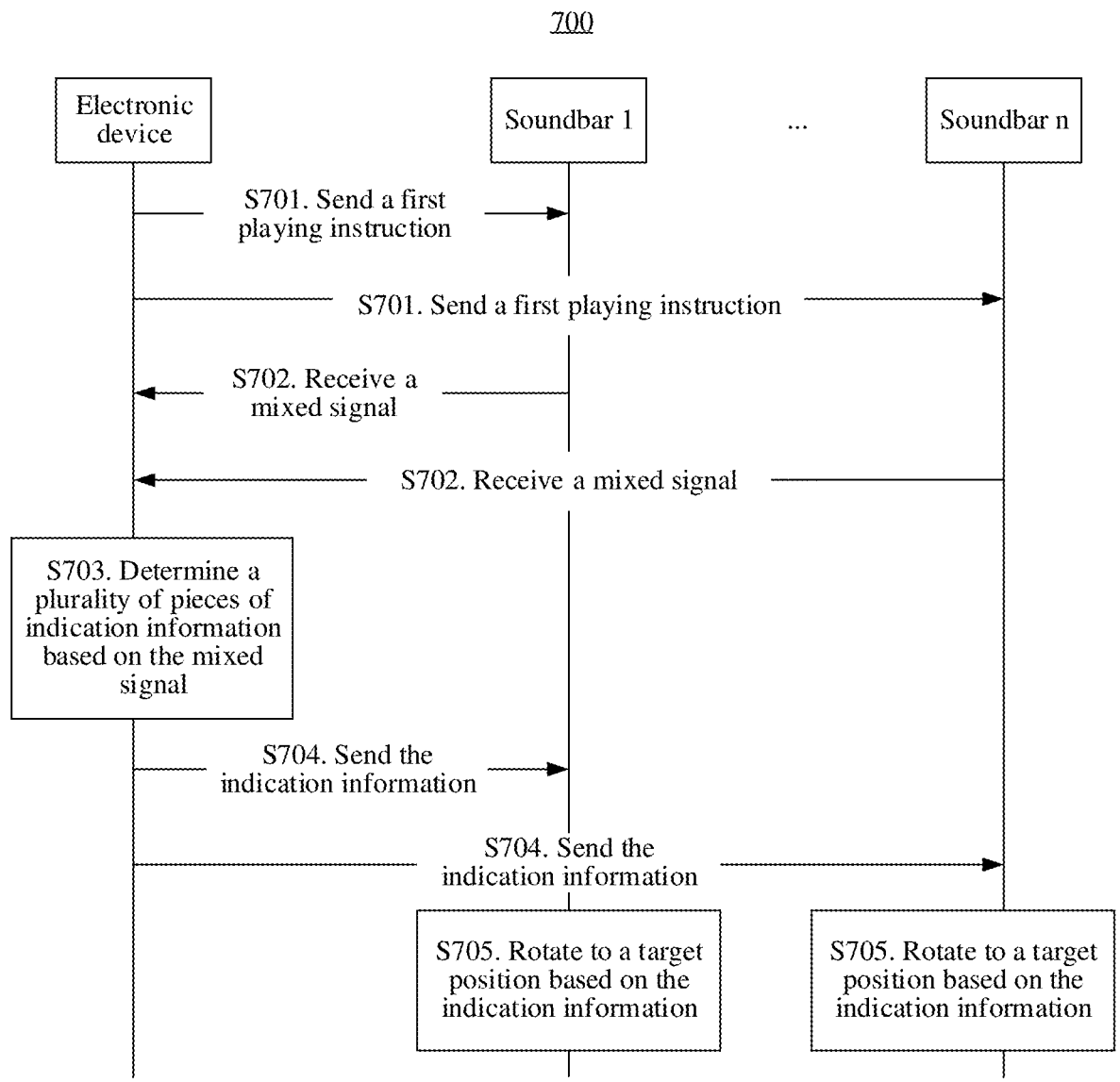
FIG. 7 is a flowchart of an example of a process 700 of a sound box position adjustment method according to an embodiment.

FIG. 7 is a flowchart of an example of a process 700 of a sound box position adjustment method according to an embodiment. The process 700 may be performed by the electronic device shown in FIG. 3 and a soundbar together. The process 700 is described as a series of steps or operations. It should be understood that the steps or operations of the process 700 may be performed in various sequences and/or simultaneously, not limited to an execution sequence shown in FIG. 7. The process 700 may include:

S701. An electronic device sends a first playing instruction to each of the plurality of soundbars.

In an embodiment, the plurality of soundbars are arranged in a row, and loudspeaker surfaces of the plurality of soundbars face a user.

S702. The electronic device receives a mixed signal.

In this embodiment, there are a plurality of soundbars, and there is only one user.

Therefore, the electronic device receives a mixed signal obtained by mixing positioning audio played by the plurality of soundbars.

S703. The electronic device determines a plurality of pieces of indication information based on the mixed signal.

For S703, refer to S404 in the embodiment shown in FIG. 4, and a difference lies in that the electronic device determines indication information of each of the plurality of soundbars, and positions in each calculation include an initial position of the center of a single soundbar and a position of the user.

S704. The electronic device sends the plurality of pieces of indication information respectively to the corresponding soundbars.

S705. The soundbar rotates to a target position based on the indication information.

For S704 and S705, refer to S405 and S406 in the embodiment shown in FIG. 4. Details are not described herein again.

In this application, the plurality of soundbars and the electronic device cooperate with each other. The plurality of soundbars rotate from the first position to the second position at a uniform speed while playing positioning audio. The electronic device finds, based on the mixed signal of the received positioning audio, positions of the soundbars corresponding to a largest loudness, and controls the soundbars to rotate to the respective corresponding positions. In this way, for a position of a user, more accurate crosstalk cancellation can be implemented, impact of different rooms can be eliminated, sound image effect can be enhanced, and original sound effect can be truly restored.

Figure 8:
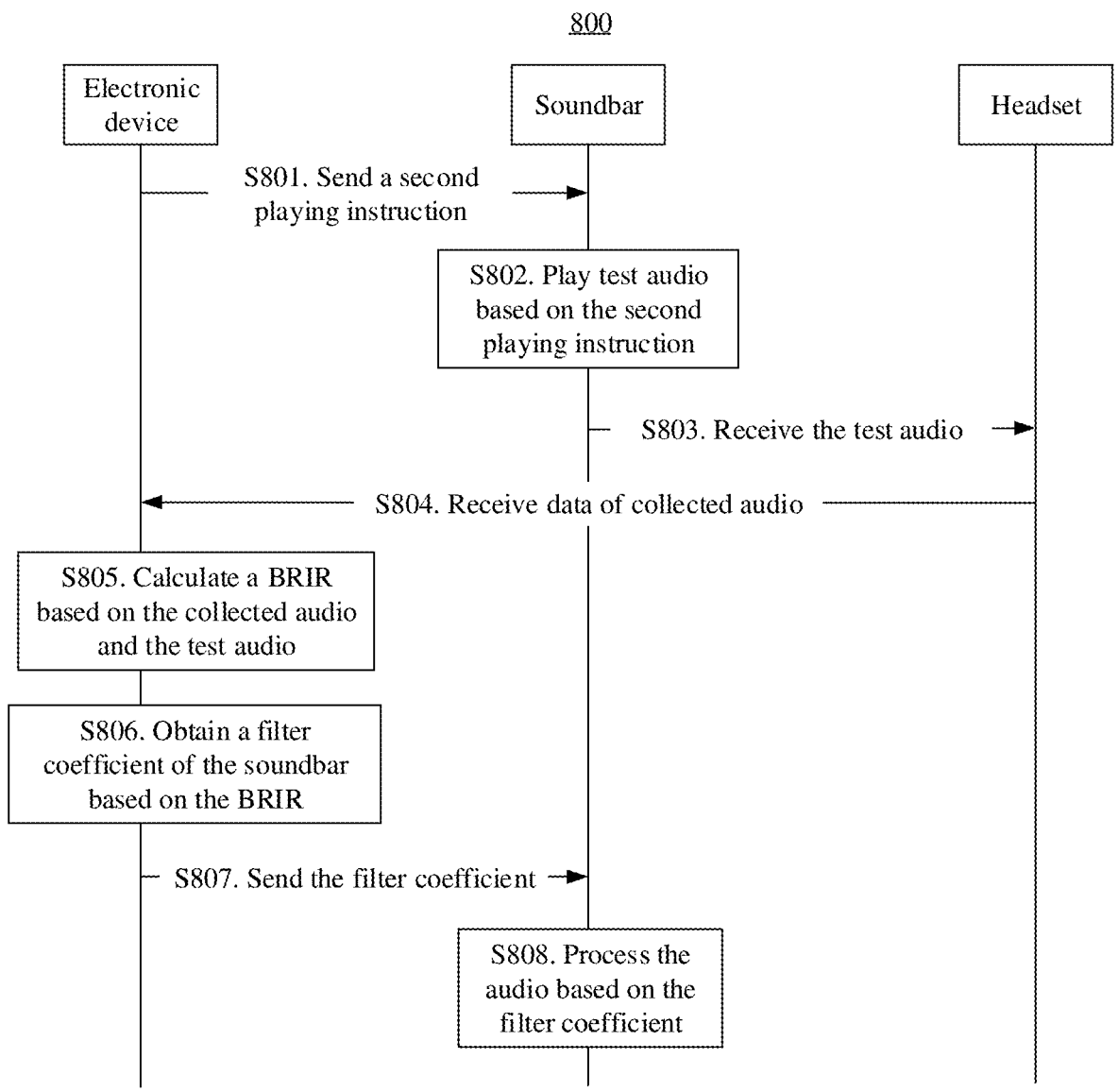
FIG. 8 is a flowchart of an example of a process 800 of a rendering method according to an embodiment.

FIG. 8 is a flowchart of an example of a process 800 of a rendering method according to an embodiment. The process 800 may be performed by the electronic device shown in FIG. 3 and a soundbar together. The process 800 is described as a series of steps or operations. It should be understood that the steps or operations of the process 800 may be performed in various sequences and/or simultaneously, not limited to an execution sequence shown in FIG. 8. The process 800 may include:

S801. An electronic device sends a second playing instruction to a soundbar.

Test audio is full-band audio that satisfies a specified condition. For example, the test audio may be full-band audio whose sound pressure level is not less than 65 dB and signal-to-noise ratio is not less than 20 dB, including white noise, pink noise, or a sweep signal.

S802. The soundbar plays test audio based on the second playing instruction.

S803. A microphone of a headset worn by a user receives the test audio.

In this embodiment, the test audio played by the soundbar is received by the microphone of the headset worn by the user. After receiving the test audio, the headset stores the test audio and sends the test audio to the electronic device in a form of audio data.

S804. The electronic device receives data of collected audio.

S805. The electronic device calculates a BRIR based on the collected audio and the test audio.

The electronic device may calculate the BRIR according to formula (7):

$$H_{2p+i,k}(f) = \frac{Y_{i,p,k}(f)}{T(f)} \qquad (7)$$

where $0 \leq p \leq P$, and P represents a quantity of users; $0 \leq k \leq K$, and K represents a quantity of speaker units; a case that i is 0 corresponds to a left ear, and a case that i is 1 corresponds to a right ear; f represents a frequency; $H_{2p+i,k}(f)$ represents a BRIR of a $p^{th}$ user corresponding to a $k^{th}$ speaker unit; $Y_{i,p,k}(f)$ represents recorded audio of a headset of the $p^{th}$ user corresponding to the $k^{th}$ speaker unit; T(f) represents the test audio.

S806. The electronic device obtains a filter coefficient of the soundbar based on the BRIR.

The electronic device calculates the filter coefficient according to formula (8):

$$C(f)=(H(f)^H H(f)+\beta I_k(f))^{-1} H(f)^H D(f) \qquad (8)$$

where $H(f) \in C^{K \times K}$, H(f) represents a matrix constituted by using the BRIR calculated according to formula (7) as an element, and the matrix covers room transfer functions of all users respectively corresponding to all speaker units; $*^H$ represents a conjugate matrix; $I_k(f) \in C^{K \times K}$, and $I_k(f)$ represents an identity matrix; and $D(f) \in R^{2P \times R}$ D(f) represents an ideal transfer function, and R represents a quantity of sound channels, where if the audio is stereo, R=2 and $$D(f) = \begin{bmatrix} D_0(f) \\ \vdots \\ D_{P-1}(f) \end{bmatrix} = \begin{bmatrix} 1 & 0 \\ 0 & 1 \\ \vdots & \vdots \\ 1 & 0 \\ 0 & 1 \end{bmatrix}.$$

S807. The electronic device sends the filter coefficient to the soundbar.

S808. The soundbar processes the audio based on the filter coefficient.

The soundbar processes, based on an updated filter coefficient and according to formula (9), the audio played by the soundbar:

$$X(f)=C(f)S(f) \qquad (9)$$

where X(f) represents processed audio, S(f) represents the audio played by the soundbar, and C(f) represents the filter coefficient.

The filter coefficient is obtained after precise sweet spot positioning. Therefore, for a position of a user, more accurate crosstalk cancellation can be implemented, impact of different rooms can be eliminated, sound image effect can be enhanced, and original sound effect can be truly restored.

In an embodiment, the electronic device may receive a virtual space instruction, where the virtual space instruction includes a listening space selected by a user in a virtual space mode interface, obtain a transfer function of the listening space, and then obtain a filter coefficient of a soundbar based on a BRIR.

For example, the listening space is a "golden hall". The electronic device calculates the filter coefficient according to formula (10):

$$\hat{C}(f)=(H(f)^H H(f)+\beta I_k(f))^{-1} H(f)^H \hat{D}(f) \qquad (10)$$

where $H(f) \in C^{K \times K}$, H(f) represents a matrix constituted by using the BRIR calculated according to formula (7) as an element, and the matrix covers room transfer functions of all users respectively corresponding to all soundbars; $*^H$ represents a conjugate matrix; $I_k(f) \in C^{K \times K}$ and $I_k(f)$ represents an identity matrix; and $\hat{D}(f) \in C^{2P \times R}$, $\hat{D}(f)$ represents a transfer function of a listening space (for example, a golden hall), and R represents a quantity of sound channels, where if the audio is stereo, R=2, $$\hat{D}(f) = \begin{bmatrix} \hat{D}_0(f) \\ \vdots \\ \hat{D}_{P-1}(f) \end{bmatrix},$$

and $\hat{D}_p(f)$ represents a listening space selected by a $p^{th}$ user.

The soundbar processes, based on an updated filter coefficient and according to formula (11), the audio played by the soundbar:

$$\hat{X}(f)=\hat{C}(f)S(f) \qquad (11)$$

where $\hat{X}(f)$ represents processed audio, S(f) represents the audio played by the soundbar, and $\hat{C}(f)$ represents the filter coefficient.

The foregoing filter coefficient is obtained after exclusive private customization. Therefore, for a position of a user, more accurate crosstalk cancellation can be implemented, impact of different rooms can be eliminated, sound image effect can be enhanced, and original sound effect can be truly restored. In addition, a sound field can be rendered in the position of the user, thereby providing an immersive experience for the user.

The following describes a sound box position adjustment method and an audio rendering method provided in this application by using specific embodiments.

There are one or more users in a real room, and the room is, for example, a living room, a bedroom, a conference room, a cinema, or a theater. Each user holds an electronic device, and the electronic device may be, for example, a mobile phone or a tablet computer. In addition, there is an administrator. The administrator may be one of the plurality of users, and then the administrator also holds the foregoing electronic device. The administrator may alternatively be another person, and then the administrator holds a control apparatus. The control apparatus may be the foregoing electronic device, may be a computer, or may be a video playing device, and the video playing device includes a soundbar.

1. Login

Figure 9:
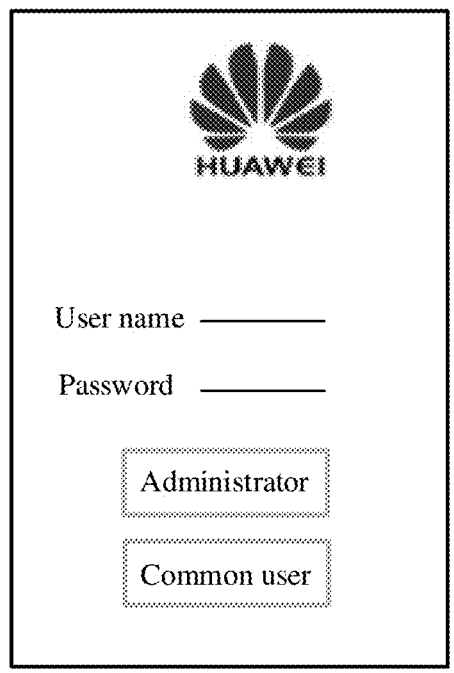
FIG. 9 is a schematic diagram of an example of a login interface according to an embodiment.

An application (APP) (such as Huawei Vision) is installed on each of devices held by all persons (including one or more users and the administrator). The APP has two modes: "Common user" and "Administrator". All the persons can select to-be-entered modes by using a control on a login interface. FIG. 9 is a schematic diagram of an example of a login interface according to an embodiment. As shown in FIG. 9, in addition to a user name input area and a password input area, the login interface further includes a "Common user" control and an "Administrator" control. If there is only one user in a real room, the user is an administrator, and the "Administrator" control is clicked. If there are a plurality of users in the real room, and one of the plurality of users is an administrator, the "Administrator" control is clicked, and other users click the "Common user" control; or if the plurality of users are all common users, the "Common user" control is clicked, and additionally an administrator (the administrator may be in a different room) clicks the "Administrator" control.

2. Function Selection

Figure 10:
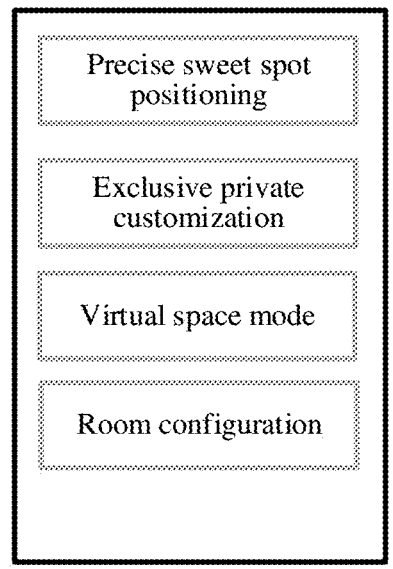
FIG. 10 is a schematic diagram of an example of a function selection interface according to an embodiment.

After each of all the persons logs in to the APP using a registered user name/password, the APP enters a function selection interface. The APP provides four functions, including room configuration, precise sweet spot positioning, exclusive private customization, and virtual space mode. FIG. 10 is a schematic diagram of an example of a function selection interface according to an embodiment. As shown in FIG. 10, four controls "Room configuration", "Precise sweet spot positioning", "Exclusive private customization", and "Virtual space mode" are displayed on the function selection interface.

3. Room Configuration

Figure 11:
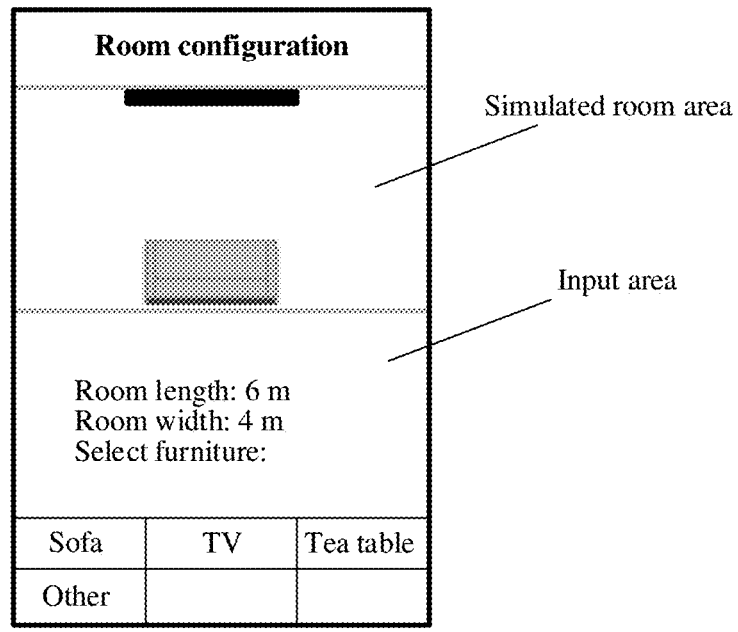
FIG. 11 is a schematic diagram of an example of a room configuration interface according to an embodiment.

A "Room configuration" control on a function selection interface is clicked. The APP displays a room configuration interface. FIG. 11 is a schematic diagram of an example of a room configuration interface according to an embodiment. As shown in FIG. 11, the room configuration interface includes a simulated room area and an input area.

In an embodiment, the room configuration interface shown in FIG. 11 may be displayed in the APP in only the "Administrator" mode. The APP in only the administrator mode allows the administrator to arrange the simulated room area and enter a length and a width of a room. In this case, after the administrator completes setting, the APP in the "Administrator" mode may send, to an APP in the "Common user" mode, input information obtained by using the room configuration interface, so that the APP in the "Common user" mode may also display the simulated room area and the arrangement in the simulated room area. The APP in the "Administrator" mode and the APP in the "Common user" mode are both located in a same local area network.

In an embodiment, the room configuration interface shown in FIG. 11 may be displayed in the APP in the "Administrator" mode, and may also be displayed in the APP in the "Common user" mode. In this way, any person who uses the APP may arrange a simulated room area, and input a length and a width of a room. In this case, after completing setting, the APP may send input information obtained by using the room configuration interface to the APP in the "Administrator" mode, so that the APP in the "Administrator" mode integrates the input information, and determines a position of a same home appliance (for example, a soundbar), to eliminate an input error of different persons.

The input area in the room configuration interface is used to enter a length (for example, 6 m) and a width (for example, 4 m) of a real room. The simulated room area is used by the administrator or the user to simulate the arrangement of the real room in the area. For example, in a living room, a television with a soundbar is placed next to a television wall, and a sofa is placed directly opposite to the television. Based on this arrangement, the administrator or the user may use an icon to identify the television (also identify the soundbar) near an upper side of the simulated room area. The icon may be a 2D or 3D model of the television, a schematic diagram, or a point (the point corresponds to the center of the soundbar). An icon is used to identify the sofa in a position that is near a lower side of the simulated room area and that directly faces the television. The icon may similarly be a 2D or 3D model of the sofa, a bar-shaped schematic diagram, or a point (the point corresponds to the center of the sofa). For example, the user clicks the television, the APP displays a schematic diagram of the television in the simulated room area, and the user drags the schematic diagram of the television to a position in the simulated room area corresponding to an actual position of the television; and the user clicks the sofa, the APP displays a schematic diagram of the sofa in the simulated room area, and the user drags the schematic diagram of the sofa to a position in the simulated room area corresponding to an actual position of the sofa.

It should be noted that a manner of identifying real furniture in the simulated room area is not specifically limited in this application. In addition, in the simulated room area, except that the quantity and positions of icons of the soundbars need to be consistent with the quantity and positions of the soundbars in the real room, whether an icon of each other furniture is displayed in the simulated room area depends on an operation of the user. For example, the user may place an icon identifying the sofa in the simulated room area, or may not place an icon identifying the sofa.

4. Precise Sweet Spot Positioning

A "Precise sweet spot positioning" control on a function selection interface is clicked. The APP displays a precise sweet spot positioning interface. FIG. 12a to FIG. 12m are schematic diagrams of several examples of a precise sweet spot positioning interface according to an embodiment. The precise sweet spot positioning interface includes a simulated room area, and an icon displayed in the area is set by a user in a room configuration interface.

Scenario 1: There are one soundbar and one user in a room.

The foregoing user is an administrator, and the administrator holds a control apparatus. The control apparatus is, for example, a mobile phone, and an APP installed on the mobile phone enters an "Administrator" mode.

Figure 12A:
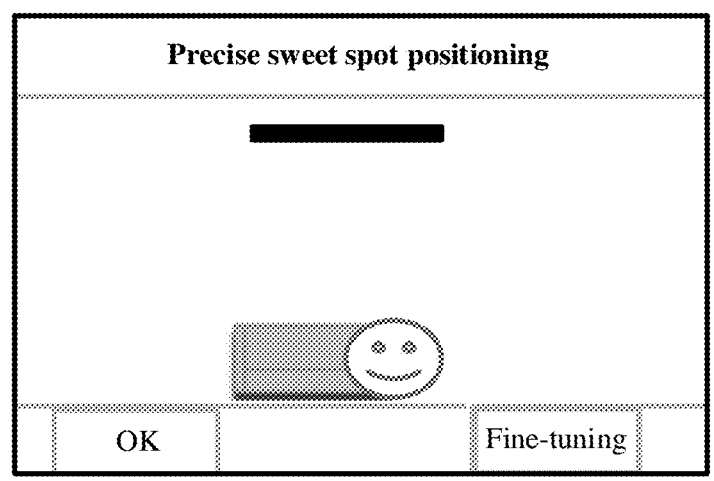
FIG. 12a to FIG. 12m are schematic diagrams of several examples of a precise sweet spot positioning interface according to an embodiment.

As shown in FIG. 12a, the user clicks a corresponding position in the simulated room area based on a position of the user in the room, and the APP displays an identifier (for example, a smiling face) in the corresponding position, indicating that the user is here.

A coordinate system of a real room is a first coordinate system, and a coordinate system of a simulated room is a second coordinate system. A ratio of the two coordinate systems is 100:1. Each origin (0, 0) is a left end point of a wall (television wall) near the soundbar. A direction from the origin to the right is an x-axis forward direction, and a direction from the origin to the bottom is a y-axis forward direction.

For example, the actual length and width of the room are 6 m and 4 m respectively, and the length and width of the simulated room are 0.06 m and 0.04 m respectively. If the center of the soundbar is in the middle of the upper side, that is, in the second coordinate system, coordinates of the center of the soundbar are (0.03, 0), coordinates of the center of the soundbar in the first coordinate system may be calculated as (3, 0). If the center of a sofa is in the middle of the lower side, that is, in the second coordinate system, coordinates of the center of the sofa are (0.03, 0.04), coordinates of the center of the sofa in the first coordinate system may be calculated as (3, 4).

Therefore, based on the positions of the center of the soundbar and the user in the simulated room area, and based on a proportion relationship between side lengths of the simulated room area and the actual length and width of the room, the APP may obtain the coordinates $(x_c, y_c)$ of the position of the user and the coordinates $(x_{s0}, y_{s0})$ of the center of the soundbar in the first coordinate system.

The APP calculates an initial horizontal angle A based on the coordinates $(x_c, y_c)$ of the position of the user and the coordinates $(x_{s0}, y_{s0})$ of the center of the soundbar, where a vertex of an included angle corresponding to the initial horizontal angle A is the center of the soundbar, one side of the included angle is perpendicular to the soundbar, and the other side of the included angle is a connection line between the position of the user and the center of the soundbar. It should be noted that when the connection line between the position of the user and the center of the soundbar is located on the right of the side perpendicular to the soundbar, the value of the initial horizontal angle A is positive; and when the connection line between the position of the user and the center of the soundbar is located on the left of the side perpendicular to the soundbar, the value of the initial horizontal angle A is negative.

For example, as shown in FIG. 13, the initial horizontal angle A may be calculated based on the following method:

A straight-line distance d between the position of the user and the center of the soundbar is calculated according to formula (1):

$$d = \sqrt{(x_c - x_{s0})^2 + (y_c - y_{s0})^2} \quad (1)$$

Then, a vertical distance h between the position of the user and the center of the soundbar is calculated according to formula (2):

$$h = |y_c - y_{s0}| \quad (2)$$

Then, the initial horizontal angle A is calculated based on the straight-line distance d and the vertical distance h according to formula (3):

$$A = -\arccos\left(\frac{h}{d}\right) \quad (3)$$

One side of an included angle corresponding to the fine-tuning angle θ is a connection line between the position of the user and the center of the soundbar. For example, as shown in FIG. 13, the fine-tuning angle θ may be calculated based on the straight-line distance d and the vertical distance h according to formula (4):

$$\theta = -\arctan\left(\frac{2w + \sqrt{d^2 - h^2}}{h}\right) - A \quad (4)$$

where w represents a double binaural distance, and w may be a preset fixed value, or may be preset by the user.

The user clicks an "OK" control on the precise sweet spot positioning interface, and the APP sends the calculated initial horizontal angle A and fine-tuning angle θ to the soundbar in a form of an instruction.

After receiving the instruction, the soundbar may rotate to an angle A−θ or A+θ.

Figure 12B:
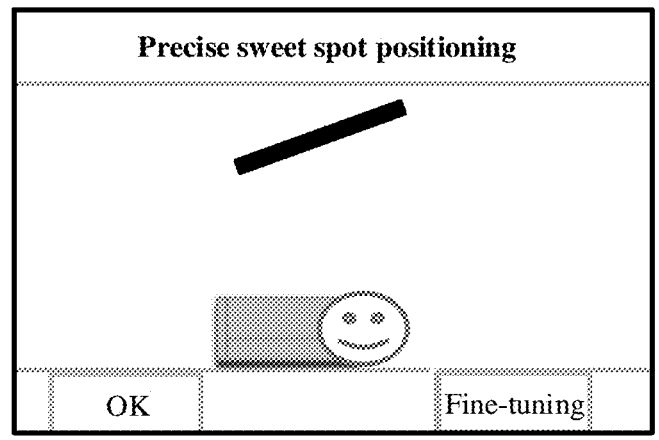

As shown in FIG. 12b, a user holds a mobile phone and is stationary in the foregoing position (a position corresponding to the smiling face in FIG. 12a) in the room, and clicks a "Fine tuning" control on the precise sweet spot positioning interface. The APP sends, to the soundbar, a playing instruction instructing fine tuning to start. In an embodiment, the APP may display, in the simulated room area, the soundbar rotating through A−θ or A+θ.

After receiving the playing instruction, the soundbar starts to play positioning audio (for example, a rain sound) that is obtained in advance and stored locally, and in a process of playing the positioning audio, rotates at a uniform speed v from a first angle to a second angle. The first angle and the second angle are respectively A−θ and A+θ or A+θ and A−θ. To be specific, the first angle is A−θ, and the second angle is A+θ; or the first angle is A+θ, and the second angle is A−θ.

A microphone of the mobile phone of the user receives recorded audio.

In an embodiment, the APP may detect, at intervals of a specified time from a start moment of the recorded audio, the recorded audio received within the specified time, to obtain a loudness. When an end moment of the recorded audio arrives, the APP determines a difference between an end moment of the specified time corresponding to a largest loudness of a plurality of obtained loudnesses and the receiving start moment as a target time. For example, the APP records a start moment of the recorded audio as 0 ms, and records an initial largest loudness as 0; records a moment after an interval of a specified time (for example, 1 ms) as 1 ms, detects the recorded audio received within the 1 ms to obtain a loudness corresponding to the moment 1 ms (for example, performs sampling detection on the recorded audio received within the 1 ms to obtain a plurality of loudness values, and then averages the plurality of loudness values), and records the largest loudness as a loudness at a moment 1 ms; and records a moment after an interval of 1 ms as 2 ms, detects the recorded audio received within the 1 ms to obtain a loudness corresponding to the moment 2 ms, compares the loudness at the moment 2 ms with the current largest loudness, and selects a larger loudness as the largest loudness. By analogy, when an end moment (for example, a moment 10 ms) of the recorded audio arrives, the APP obtains a moment (for example, a moment 3 ms) corresponding to the largest loudness, calculates a difference between the moment 3 ms and the receiving start moment 0 ms, and determines the difference as the target time.

In an embodiment, the APP detects the recorded audio to obtain a largest loudness, and determines a difference between a moment corresponding to the largest loudness and a start moment of the recorded audio as the target time. For example, the APP receives a total of 10 ms recorded audio, and performs sampling detection on the recorded audio to obtain loudnesses at a plurality of moments, for example, a loudness at 1 ms, a loudness at 2 ms, . . . , and a loudness at 10 ms, compares the loudnesses to obtain a largest loudness, and then determines a difference between a moment (for example, 3 ms) corresponding to the largest loudness and a receiving start moment 0 ms as the target time.

The APP may calculate a target horizontal angle B based on the target time, the initial horizontal angle A, and the fine-tuning angle θ. The formula used for the calculation is related to the rotation direction of the soundbar:

When the first angle is A−θ, and the second angle is A+θ, the target horizontal angle B is calculated according to formula (5):

$$B=(A-\theta)+vt \qquad (5)$$

When the first angle is A+θ, and the second angle is A−θ, the target horizontal angle B is calculated according to formula (6):

$$B=(A+\theta)-vt \qquad (6)$$

where v represents a rotation speed, and t represents a target time.

It should be noted that duration T of the recorded audio, a target time t, a fine-tuning angle θ, and a rotation speed v are mutually constrained, that is, an objective of fine tuning is to obtain the target horizontal angle B, and the target horizontal angle B needs to fall within an angle range [A−θ, A+θ]. Therefore, −θ≤vt≤θ, and t≤T.

Figure 12C:
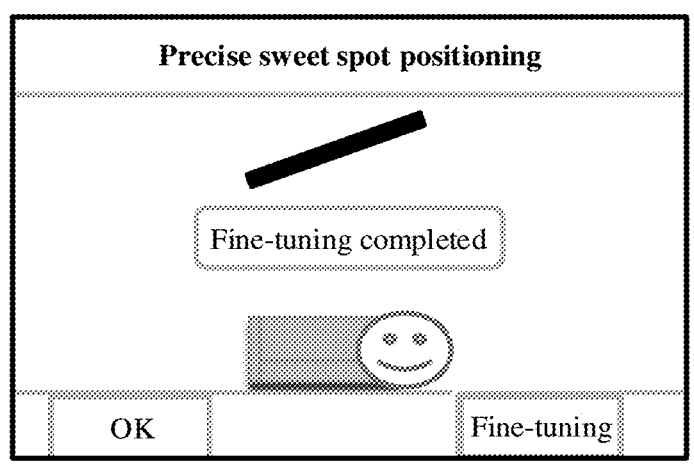

As shown in FIG. 12c, after obtaining the target horizontal angle B, the APP sends the target horizontal angle B to the soundbar. In an embodiment, the APP may display, in the simulated room area, the soundbar rotating through the target horizontal angle B, and display a pop-up window on the precise sweet spot positioning interface, where a text "Fine tuning completed" is displayed in the pop-up window.

After receiving the target horizontal angle B, the soundbar rotates to reach the target horizontal angle B. In this case, the sweet spot of the soundbar is just the position of the user. To achieve this objective, the soundbar may determine the rotation direction and the rotation angle based on the angle before the rotation. For example, if the soundbar rotates from A−θ to A+θ during the fine tuning, the soundbar rotates reversely from A+θ, and the rotation angle is (A+θ)−B=2θ−vt; and if the soundbar rotates from A+θ to A−θ during the fine tuning, the soundbar rotates reversely from A−θ, and the rotation angle is B−(A−θ)=2θ−vt.

So far, the precise sweet spot positioning function is completed. Afterwards, as long as the user does not move, a stereo sound (for example, a sound of a television or a movie) played by the soundbar forms the optimal listening effect in the position of the user.

Scenario 2: There are a soundbar and a plurality of users in a room.

One of the foregoing plurality of users is an administrator, and the administrator holds a control apparatus. The control apparatus is, for example, a mobile phone. An APP installed on the mobile phone of the administrator enters an "Administrator" mode. Another user other than the administrator holds an electronic device, and the electronic device is, for example, a mobile phone as well. An APP installed on the mobile phone of the another user enters a "Common user" mode.

As shown in FIG. 12a, a user (any one of the plurality of users) clicks a corresponding position in the simulated room area based on a position of the user in the room, and the APP of the user displays an identifier (for example, a smiling face) in the corresponding position, indicating that the user is here. The user clicks an "OK" control on the precise sweet spot positioning interface, and the APP sends coordinates of the position of the identifier of the user in the second coordinate system to the APP of the administrator.

All the foregoing plurality of users may perform the foregoing operations. Therefore, the APPs of the plurality of users all display an identifier (for example, a smile face) in the simulated room area, to indicate a position of a corresponding user, and APPs of all other users different from the administrator send coordinates of positions of respective identifiers in the second coordinate system to the APP of the administrator.

Figure 12D:
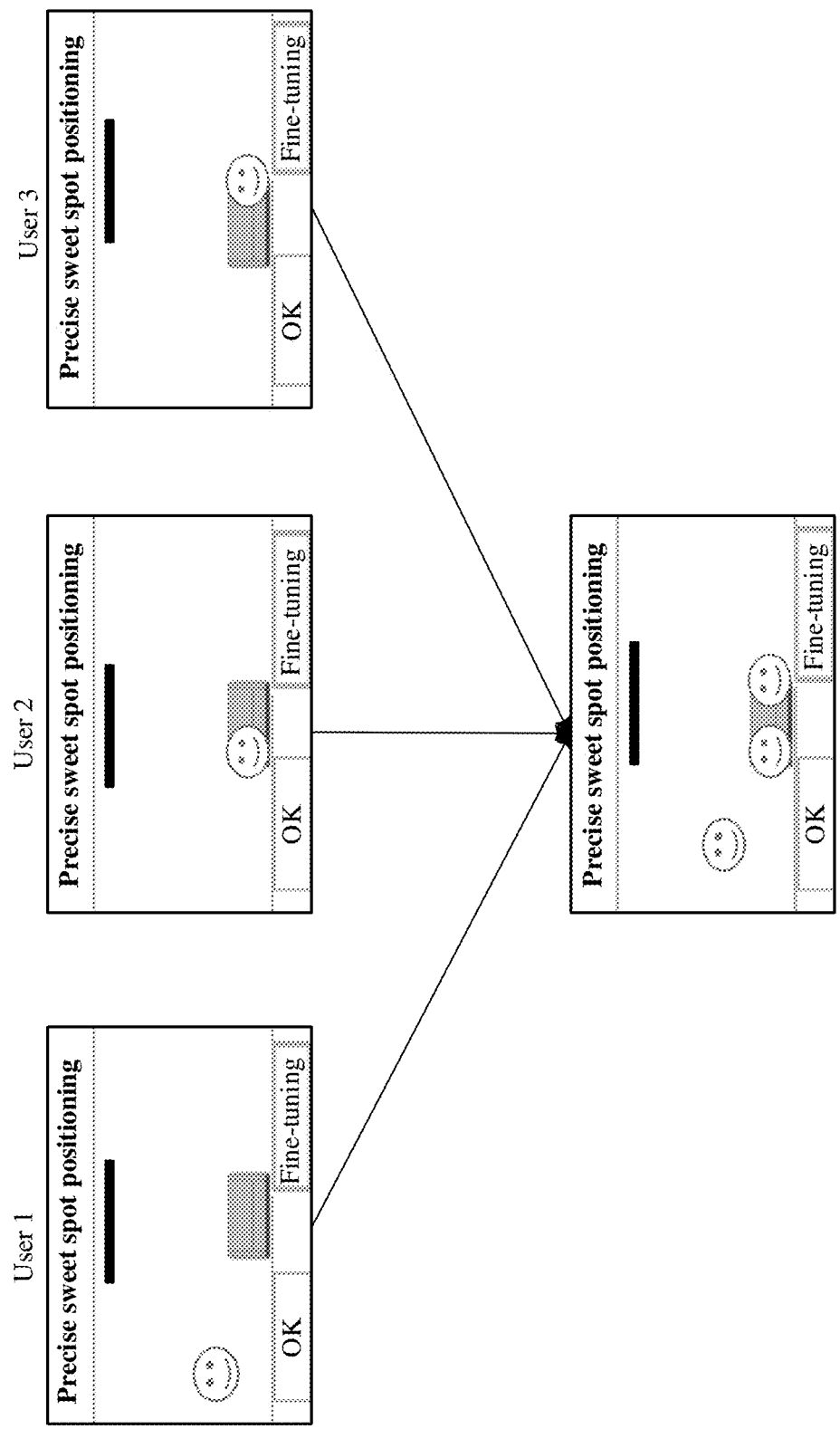

As shown in FIG. 12d, in addition to displaying the identifier of the administrator, the APP of the administrator further displays identifiers of all other users (for example, a user 1 to a user 3). That is, after receiving coordinates sent by the APPs of all the other users, the APP of the administrator displays an identifier (for example, a smile face) in a position corresponding to the foregoing coordinates in the simulated room area.

The APP of the administrator may obtain the initial horizontal angle A and the fine-tuning angle θ according to formulas (1) to (4) in the scenario 1. A difference lies in that coordinates $(x_c, y_c)$ in the formulas (1) and (2) represent the central position of a plurality of users. In this case, $$(x_c, y_c) = \left(\frac{\sum x_i}{P}, \frac{\sum y_i}{P}\right),$$

where P represents a quantity of the plurality of users, $(x_i, y_i)$ are coordinates of a position of an $i^{th}$ user of the plurality of users, and 1≤i≤P.

Figure 14:
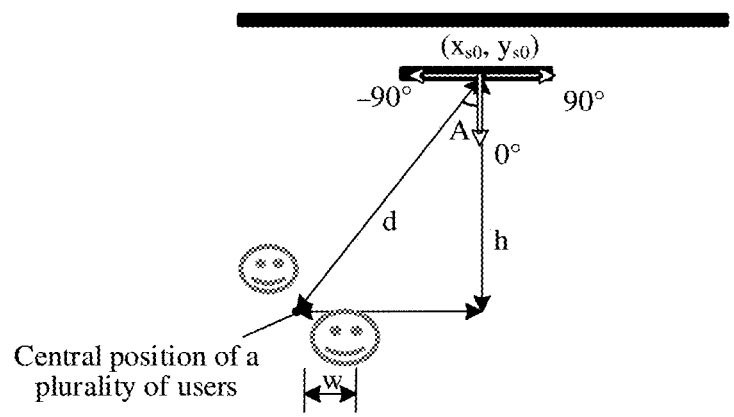
FIG. 14 is a schematic diagram of another example of an initial horizontal angle according to an embodiment.

It can be learned that, in the scenario 2, a vertex of an included angle corresponding to the initial horizontal angle A is the center of the soundbar, one side of the included angle is perpendicular to the soundbar, and the other side of the included angle is a connection line between the central position of the plurality of users and the center of the soundbar, as shown in FIG. 14.

The administrator clicks an "OK" control on the precise sweet spot positioning interface, and the APP of the administrator sends the calculated initial horizontal angle A and fine-tuning angle θ to the soundbar in a form of an instruction.

After receiving the instruction, the soundbar may rotate to an angle A−θ or A+θ.

A plurality of users hold mobile phones and are stationary in selected positions (positions corresponding to smiling faces in FIG. 12a) in the room. As shown in FIG. 12b, the administrator clicks a "Fine tuning" control on the precise sweet spot positioning interface, and the APP of the administrator sends, to the soundbar, a playing instruction instructing fine tuning to start. In an embodiment, the APPs of the plurality of users may each display, in the simulated room area, the soundbar rotating through A−θ or A+θ.

After receiving the playing instruction, the soundbar starts to play positioning audio (for example, a rain sound) that is obtained in advance and stored locally, and in a process of playing the positioning audio, rotates at a uniform speed v from a first angle to a second angle. The first angle and the second angle are respectively A−θ and A+θ or A+θ and A−θ. To be specific, the first angle is A−θ, and the second angle is A+θ; or the first angle is A+θ, and the second angle is A−θ.

The microphones of the mobile phones of the plurality of users all receive the recorded audio. In an embodiment, the APPs of all the other users different from the administrator send the respectively obtained collected audio to the APP of the administrator. The APP of the administrator detects the recorded audio from the APPs of all the other users and the recorded audio received by the microphone of the mobile phone of the administrator, obtains a loudness of each recorded audio at each sampling moment, calculates a sum of loudnesses at each sampling moment, and then determines a sampling moment corresponding to a sum of largest loudnesses, to obtain the target time. The APP of the administrator may detect and obtain the loudness of the recorded audio with reference to the description in the scenario 1. In an embodiment, the APPs of the plurality of users separately detect the received recorded audio, to obtain a loudness at each sampling moment. Then, APPs of all other users different from the administrator send loudnesses at sampling moments obtained respectively by the APPs to the APP of the administrator. The APP of the administrator calculates a sum of loudnesses at each sampling moment, and then determines a sampling moment corresponding to a sum of largest loudnesses, to obtain the target time. APPs of a plurality of users may also detect and obtain the loudness of the recorded audio with reference to the description in the scenario 1.

The APP of the administrator may calculate the target horizontal angle B according to formulas (5) to (6) in the scenario 1.

As shown in FIG. 12c, after obtaining the target horizontal angle B, the APP of the administrator sends the target horizontal angle B to the soundbar. In an embodiment, the APP of the administrator may display, in the simulated room area, the soundbar rotating through the target horizontal angle B, and display a pop-up window on the precise sweet spot positioning interface, where a text "Fine tuning completed" is displayed in the pop-up window.

In an embodiment, the APP of the administrator may also send the target horizontal angle B to APPs of all other users. In this way, the APPs of the plurality of users may each display, in the simulated room area, the soundbar rotating through the target horizontal angle B, and display a pop-up window on the precise sweet spot positioning interface, where a text "Fine tuning completed" is displayed in the pop-up window.

After receiving the target horizontal angle B, the soundbar rotates to reach the target horizontal angle B. In this case, the sweet spot of the soundbar is the central position of the plurality of users.

So far, the precise sweet spot positioning function is completed. Afterwards, as long as the plurality of users do not move, the stereo (for example, the sound of a television or a movie) played by the soundbar forms the optimal listening effect in the central position of the plurality of users.

Scenario 3: There are a plurality of soundbars and a plurality of users in a room.

The foregoing plurality of users hold electronic devices. The electronic devices are, for example, mobile phones. APPs installed on the mobile phones of the plurality of users enter a "Common user" mode. In addition, there is an administrator, and the administrator holds a control apparatus. The control apparatus is, for example, a tablet computer. An APP installed on the tablet computer of the administrator enters an "Administrator" mode.

Figure 12E:
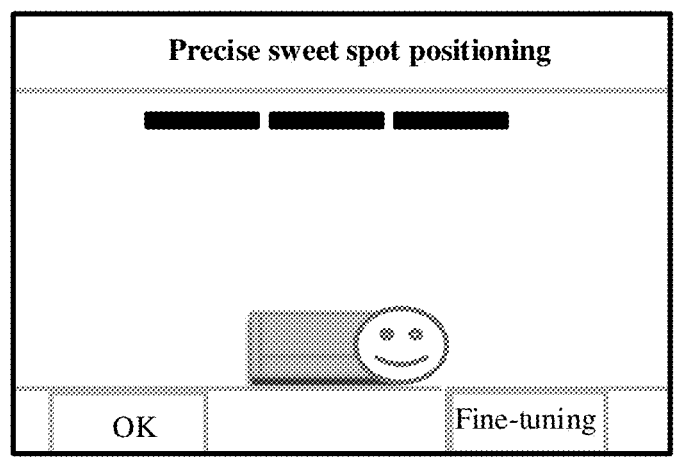

As shown in FIG. 12e, a user (any one of the plurality of users) clicks a corresponding position in the simulated room area based on a position of the user in the room, and the APP of the user displays an identifier (for example, a smiling face) in the corresponding position, indicating that the user is here. The user clicks an "OK" control on the precise sweet spot positioning interface, and the APP sends coordinates of the position of the identifier of the user in the second coordinate system to the APP of the administrator.

All the foregoing plurality of users may perform the foregoing operations. Therefore, the APPs of the plurality of users all display an identifier (for example, a smile face) in the simulated room area, to indicate a position of a corresponding user, and the APPs of the plurality of users send coordinates of positions of respective identifiers in the second coordinate system to the APP of the administrator.

Figure 12F:
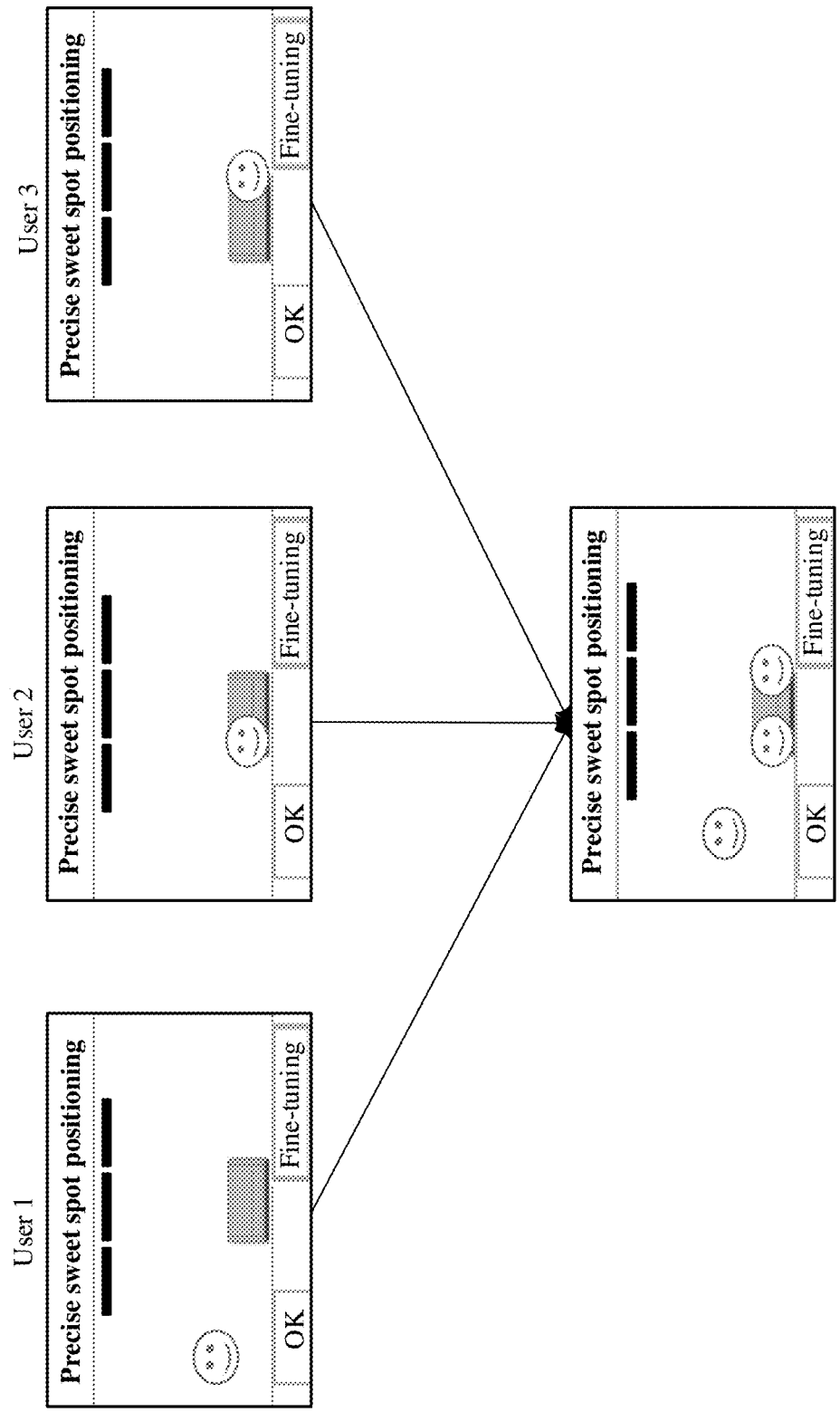

As shown in FIG. 12f, the APP of the administrator displays identifiers of a plurality of users (for example, a user 1 to a user 3) in the simulated room area. That is, after receiving coordinates sent by APPs of the plurality of users, the APP of the administrator displays an identifier (for example, a smile face) in a position corresponding to the foregoing coordinates in the simulated room area.

The APP of the administrator first divides the space in the room based on the quantity of soundbars, where each soundbar corresponds to a subspace. For example, as shown in FIG. 15, there are three soundbars, and the center of a middle soundbar is used as a vertex. A space in a horizontal direction in front of the soundbar may be divided into three subspaces in a manner of evenly dividing an angle of 180° in the horizontal direction. A left subspace corresponds to a soundbar 1 and has one user, a middle subspace corresponds to a soundbar 2 and has two users, and a right subspace corresponds to a soundbar 3 and has no user. That is, in a scenario shown in FIG. 15, the three soundbars respectively correspond to the three subspaces, and based on quantities of users in the subspaces, relationships between the three soundbars and the quantities of users are respectively a one-to-one relationship, a one-to-many relationship, and a one-to-null relationship. The APP of the administrator determines sweet spots of the three soundbars in sequence.

The APP of the administrator may obtain an initial horizontal angle A1 and a fine-tuning angle θ1 of the soundbar 1 according to formulas (1) to (4) in the scenario 1. A difference lies in that coordinates $(x_{s0}, y_{s0})$ in the formulas (1) and (2) represent the center of the soundbar 1. The APP of the administrator may obtain an initial horizontal angle A2 and a fine-tuning angle θ2 of the soundbar 2 by using the method described in the scenario 2. A difference lies in that coordinates $(x_{s0}, y_{s0})$ in the formulas (1) and (2) represent the center of the soundbar 2, and coordinates $(x_c, y_c)$ represent the central position of two users in the middle subspace corresponding to the soundbar 2. In this case, $$(x_c, y_c) = \left(\frac{\sum x_i}{P}, \frac{\sum y_i}{P}\right),$$

where P is 2, and $(x_i, y_i)$ are coordinates of a position of an $i^{th}$ user of the two users in the middle subspace corresponding to the soundbar 2, and $1 \le i \le P$. The APP of the administrator may also obtain an initial horizontal angle A3 and a fine-tuning angle θ3 of the soundbar 3 by using the method described in the scenario 2. A difference lies in that coordinates $(x_{s0}, y_{s0})$ in the formulas (1) and (2) represent the center of the soundbar 3, and coordinates $(x_c, y_c)$ represent the central position of all the users in the room. In this case, $$(x_c, y_c) = \left(\frac{\sum x_i}{P}, \frac{\sum y_i}{P}\right),$$

where P represents a quantity of all the users (P=3), $(x_i, y_i)$ are coordinates of the position of the $i^{th}$ user of all the users, and $1 \le i \le P$.

The administrator clicks an "OK" control on the precise sweet spot positioning interface, and the APP of the administrator sends the calculated initial horizontal angle A1 and fine-tuning angle θ1 of the soundbar 1 to the soundbar 1 in a form of an instruction, sends the calculated initial horizontal angle A2 and fine-tuning angle θ2 of the soundbar 2 to the soundbar 2 in a form of an instruction, and sends the calculated initial horizontal angle A3 and fine-tuning angle θ3 of the soundbar 3 to the soundbar 3 in a form of an instruction.

After receiving the instruction, the soundbar 1 may rotate to an angle A1−θ1 or A1+θ1.

After receiving the instruction, the soundbar 2 may rotate to an angle A2−θ2 or A2+θ2.

After receiving the instruction, the soundbar 3 may rotate to an angle A3−θ3 or A3+θ3.

Figure 12G:
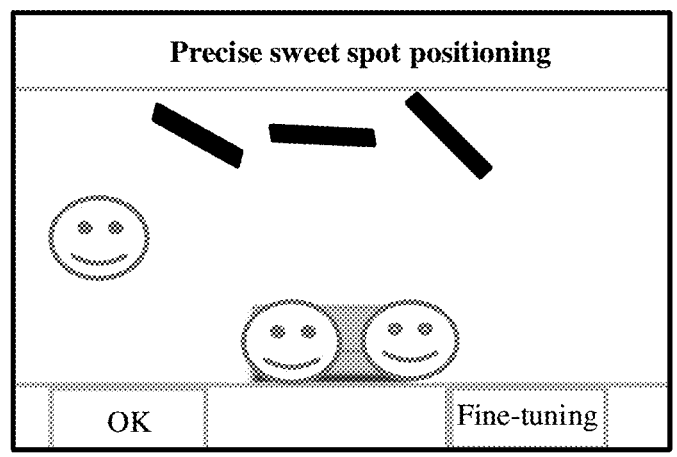
Figure 12H:
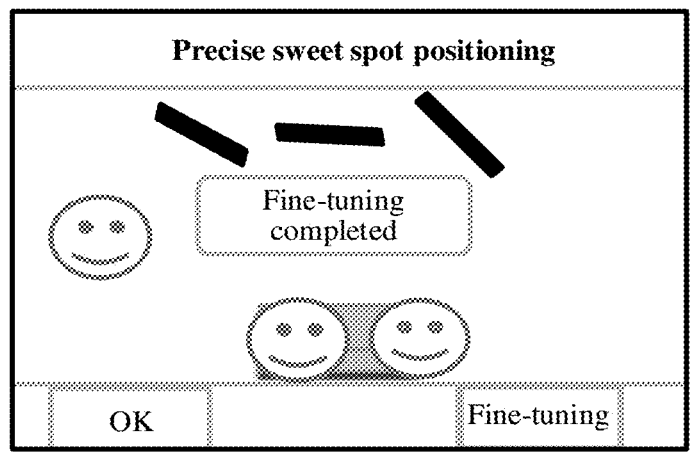

A plurality of users hold mobile phones and are stationary in selected positions (positions corresponding to smiling faces in FIG. 12*e*) in the room. As shown in FIG. 12*g*, the administrator clicks a "Fine tuning" control on the precise sweet spot positioning interface, and the APP of the administrator sends, to the soundbars 1 to 3, a playing instruction instructing fine tuning to start. In an embodiment, the APPs of the plurality of users may each display, in the simulated room area, the soundbar 1 rotating through A1−θ1 or A1+θ1, the soundbar 2 rotating through A2−θ2 or A2+θ2, and the soundbar 3 rotating through A3−θ3 or A3+θ3.

After receiving the playing instruction, the soundbar 1 starts to play positioning audio (for example, a rain sound) that is obtained in advance and stored locally, and in a process of playing the positioning audio, rotates at a uniform speed v from a first angle to a second angle. The first angle and the second angle are respectively A1−θ1 and A1+θ1 or A1+θ1 and A1−θ1. To be specific, the first angle is A1−θ1, and the second angle is A1+θ1; or the first angle is A1+θ1, and the second angle is A1−θ1.

The microphone of the mobile phone of the user in the left subspace receives recorded audio, and sends the recorded audio to the APP of the administrator. The APP of the administrator may obtain a target horizontal angle B1 of the soundbar 1 with reference to the description of the scenario 2.

After receiving the playing instruction, the soundbar 2 starts to play positioning audio (for example, a rain sound) that is obtained in advance and stored locally, and in a process of playing the positioning audio, rotates at a uniform speed v from a first angle to a second angle. The first angle and the second angle are respectively A2−θ2 and A2+θ2 or A2+θ2 and A2−θ2. To be specific, the first angle is A2−θ2, and the second angle is A2+θ2; or the first angle is A2+θ2, and the second angle is A2−θ2.

The microphone of the mobile phone of the user in the middle subspace receives recorded audio, and sends the recorded audio to the APP of the administrator. The APP of the administrator may obtain a target horizontal angle B2 of the soundbar 2 with reference to the description of the scenario 2.

After receiving the playing instruction, the soundbar 3 starts to play positioning audio (for example, a rain sound) that is obtained in advance and stored locally, and in a process of playing the positioning audio, rotates at a uniform speed v from a first angle to a second angle. The first angle and the second angle are respectively A3−θ3 and A3+θ3 or A3+θ3 and A3−θ3. To be specific, the first angle is A3−θ3, and the second angle is A3+θ3; or the first angle is A3+θ3, and the second angle is A3−θ3.

The microphones of the mobile phones of all the users in the room receive recorded audio, and send the recorded audio to the APP of the administrator. The APP of the administrator may obtain a target horizontal angle B3 of the soundbar 3 with reference to the description of the scenario 2.

As shown in FIG. 12*g*, after obtaining the target horizontal angles B1 to B3, the APP of the administrator sends the target horizontal angle B1 to the soundbar 1, sends the target horizontal angle B2 to the soundbar 2, and sends the target horizontal angle B3 to the soundbar 3. In an embodiment, the APP of the administrator may display, in the simulated room area, the soundbar 1 rotating through the target horizontal angle B1, the soundbar 2 rotating through the target horizontal angle B2, and the soundbar 3 rotating through the target horizontal angle B3, and display a pop-up window on the precise sweet spot positioning interface, where a text "Fine tuning completed" is displayed in the pop-up window.

After receiving the target horizontal angle B1, the soundbar 1 rotates to reach the target horizontal angle B1. In this case, the sweet spot of the soundbar 1 is the position of the user in the left subspace.

After receiving the target horizontal angle B2, the soundbar 2 rotates to reach the target horizontal angle B2. In this case, the sweet spot of the soundbar 2 is the central position of the two users in the middle subspace.

After receiving the target horizontal angle B3, the soundbar 3 rotates to reach the target horizontal angle B3. In this case, the sweet spot of the soundbar 3 is the central position of all the users in the room.

So far, the precise sweet spot positioning function is completed. Afterwards, as long as the plurality of users do not move, stereo sounds (for example, sounds of a television or a movie) played by the plurality of soundbars respectively form optimal listening effects in positions associated with the users in respective corresponding subspaces.

Scenario 4: There are a plurality of soundbars and one user in a room.

The foregoing user is an administrator, and the administrator holds a control apparatus. The control apparatus is, for example, a mobile phone, and an APP installed on the mobile phone enters an "Administrator" mode.

As shown in FIG. 12*e*, the user clicks a corresponding position in the simulated room area based on a position of the user in the room, and the APP displays an identifier (for example, a smiling face) in the corresponding position, indicating that the user is here.

Figure 16:
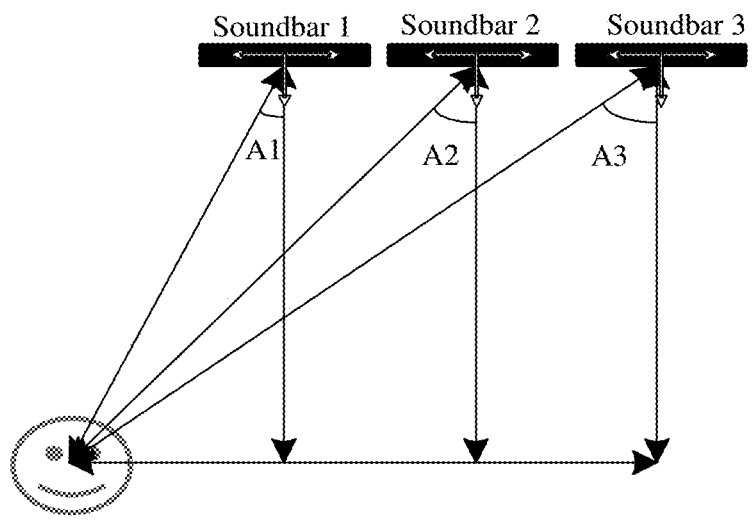
FIG. 16 is a schematic diagram of yet another example of an initial horizontal angle according to an embodiment.

As shown in FIG. 16, the APP of the user may separately obtain an initial horizontal angle A1 and a fine-tuning angle θ1 of the soundbar 1, an initial horizontal angle A2 and a fine-tuning angle θ2 of the soundbar 2, and an initial horizontal angle A3 and a fine-tuning angle θ3 of the soundbar 3 according to formulas (1) to (4) in the scenario 1. A difference lies in that for the soundbar 1, coordinates $(x_{s0}, y_{s0})$ in the formulas (1) and (2) represent the center of the soundbar 1; for the soundbar 2, coordinates $(x_{s0}, y_{s0})$ in the formulas (1) and (2) represent the center of the soundbar 2; and for the soundbar 3, coordinates $(x_{s0}, y_{s0})$ in the formulas (1) and (2) represent the center of the soundbar 3.

The user clicks an "OK" control on the precise sweet spot positioning interface, and the APP of the user sends the calculated initial horizontal angle A1 and fine-tuning angle θ1 of the soundbar 1 to the soundbar 1 in a form of an instruction, sends the calculated initial horizontal angle A2 and fine-tuning angle θ2 of the soundbar 2 to the soundbar 2 in a form of an instruction, and sends the calculated initial horizontal angle A3 and fine-tuning angle θ3 of the soundbar 3 to the soundbar 3 in a form of an instruction.

After receiving the instruction, the soundbar 1 may rotate to an angle A1−θ1 or A1+θ1.

After receiving the instruction, the soundbar 2 may rotate to an angle A2−θ2 or A2+θ2.

After receiving the instruction, the soundbar 3 may rotate to an angle A3−θ3 or A3+θ3.

Figure 12I:
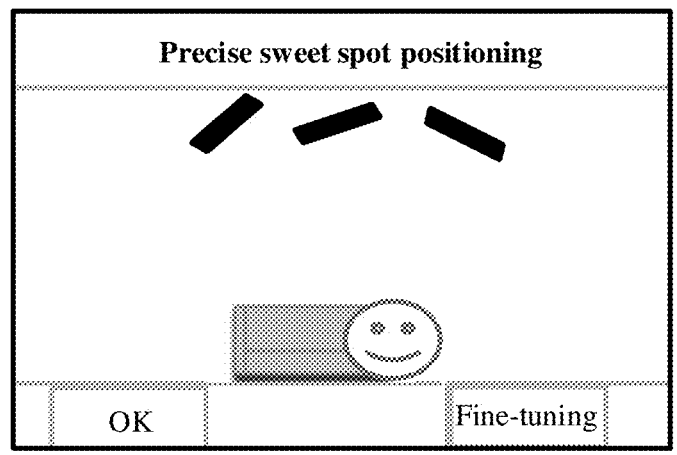

The user holds a mobile phone and is stationary in a selected position (position corresponding to a smiling face in FIG. 12e) in the room. As shown in FIG. 12i, the user clicks a "Fine tuning" control on the precise sweet spot positioning interface, and the APP of the user sends, to the soundbars 1 to 3, a playing instruction instructing fine tuning to start. In an embodiment, the APP of the user may display, in the simulated room area, the soundbar 1 rotating through A1−θ1 or A1+θ1, the soundbar 2 rotating through A2−θ2 or A2+θ2, and the soundbar 3 rotating through A3−θ3 or A3+θ3.

After receiving the playing instruction, the soundbar 1 starts to play positioning audio (for example, a rain sound) that is obtained in advance and stored locally, and in a process of playing the positioning audio, rotates at a uniform speed v from a first angle to a second angle. The first angle and the second angle are respectively A1−θ1 and A1+θ1 or A1+θ1 and A1−θ1. To be specific, the first angle is A1−θ1, and the second angle is A1+θ1; or the first angle is A1+θ1, and the second angle is A1−θ1.

After receiving the playing instruction, the soundbar 2 starts to play positioning audio (for example, a rain sound) that is obtained in advance and stored locally, and in a process of playing the positioning audio, rotates at a uniform speed v from a first angle to a second angle. The first angle and the second angle are respectively A2−θ2 and A2+θ2 or A2+θ2 and A2−θ2. To be specific, the first angle is A2−θ2, and the second angle is A2+θ2; or the first angle is A2+θ2, and the second angle is A2−θ2.

After receiving the playing instruction, the soundbar 3 starts to play positioning audio (for example, a rain sound) that is obtained in advance and stored locally, and in a process of playing the positioning audio, rotates at a uniform speed v from a first angle to a second angle. The first angle and the second angle are respectively A3−θ3 and A3+θ3 or A3+θ3 and A3−θ3. To be specific, the first angle is A3−θ3, and the second angle is A3+θ3; or the first angle is A3+θ3, and the second angle is A3−θ3.

The foregoing three soundbars play the positioning audio simultaneously, and start to rotate simultaneously.

A microphone of the mobile phone of the user receives recorded audio. The APP of the user may obtain and detect, with reference to the description in the scenario 1, the loudness of the recorded audio, determine a moment corresponding to the largest loudness, determine a difference between the moment and the start moment of the recorded audio as the target time, and then separately calculate the target horizontal angles B1 to B3 of the three soundbars by using the formula (5) or (6) in the scenario 1.

Figure 12J:
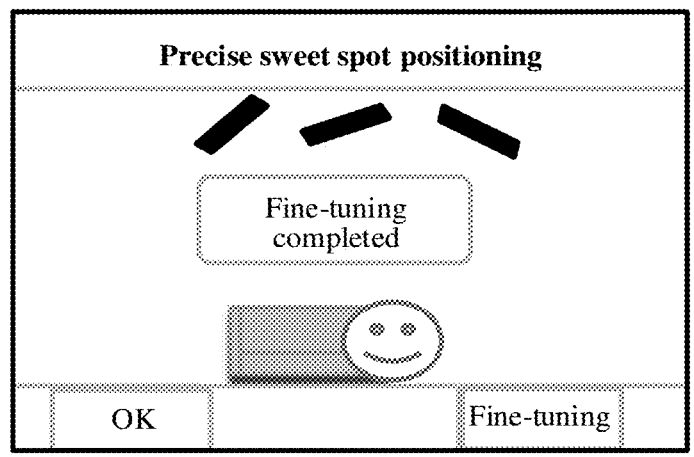
Figure 12K:
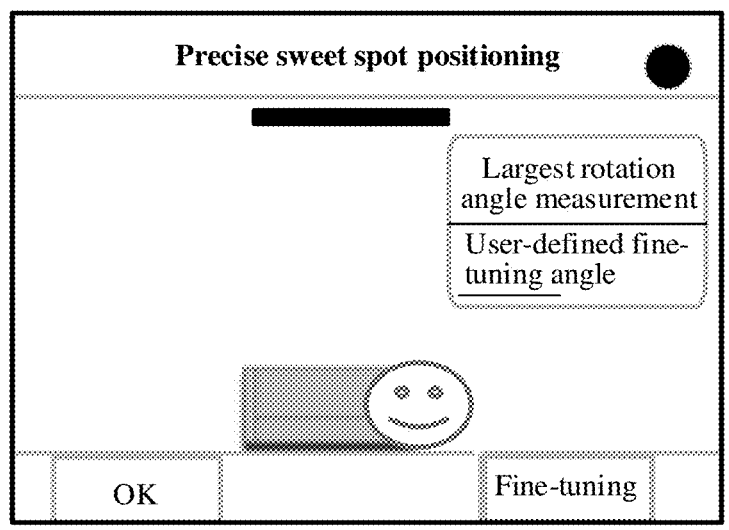
Figure 12L:
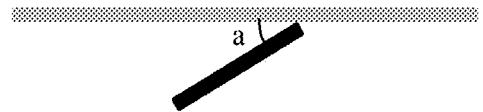
Figure 12M:
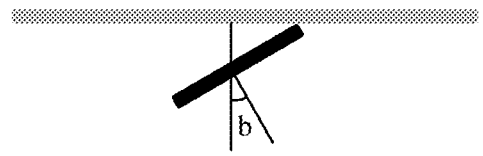

As shown in FIG. 12j, after obtaining the target horizontal angles B1 to B3, the APP of the user sends the target horizontal angle B1 to the soundbar 1, sends the target horizontal angle B2 to the soundbar 2, and sends the target horizontal angle B3 to the soundbar 3. In an embodiment, the APP of the user may display, in the simulated room area, the soundbar 1 rotating through the target horizontal angle B1, the soundbar 2 rotating through the target horizontal angle B2, and the soundbar 3 rotating through the target horizontal angle B3, and display a pop-up window on the precise sweet spot positioning interface, where a text "Fine tuning completed" is displayed in the pop-up window.

After receiving the target horizontal angle B1, the soundbar 1 rotates to reach the target horizontal angle B1; after receiving the target horizontal angle B2, the soundbar 2 rotates to reach the target horizontal angle B2; and after receiving the target horizontal angle B3, the soundbar 3 rotates to reach the target horizontal angle B3. In this case, each of respective sweet spots of the soundbar 1, the soundbar 2, and the soundbar 3 is the position of the user.

So far, the precise sweet spot positioning function is completed. Afterwards, as long as the user does not move, stereo sounds (for example, sounds of a television or a movie) played by the plurality of soundbars form the optimal listening effect in the position of the user.

In an embodiment, there is a "setting" control in the upper right of the precise sweet spot positioning interface. As shown in FIG. 12k, the user clicks the "setting" control. After receiving an instruction generated by the operation, the APP displays a drop-down menu on the precise sweet spot positioning interface. The drop-down menu has two items: "Largest rotation angle measurement" and "User-defined fine-tuning angle".

The user clicks the item of "Largest rotation angle measurement". After receiving an instruction generated by the operation, the APP sends a largest rotation angle measurement instruction to the soundbar. The soundbar starts to rotate horizontally based on the largest rotation angle measurement instruction, stops rotating when touching the wall, and records an angle M corresponding to the stopping of the rotation as a largest rotation angle. The soundbar sends the largest rotation angle M to the APP. The APP restricts the initial horizontal angle A based on the largest rotation angle M. To be specific, if the initial horizontal angle A calculated is greater than the largest rotation angle M, the initial horizontal angle A is modified to the largest rotation angle M; or if the initial horizontal angle A calculated is less than or equal to the largest rotation angle M, the initial horizontal angle A remains unchanged. Further, the APP restricts the fine-tuning angle θ based on the largest rotation angle M. To be specific, if the fine-tuning angle θ calculated is greater than M−A, the fine-tuning angle θ is modified to M−A; or if the fine-tuning angle 9 calculated is less than or equal to M−A, the fine-tuning angle θ remains unchanged.

It should be noted that the APP may further actively execute a process of obtaining the largest rotation angle M once after each time the user performs room configuration.

The user clicks the item of "user-defined fine-tuning angle" and enters, in the item, a value of the fine-tuning angle θ that is specified by the user. After receiving an instruction generated by the operation, the APP determines the value entered by the user as the fine-tuning angle 9. To be specific, the fine-tuning angle θ in this application may be calculated according to formula (4), or may be obtained by entering by the user in the item of "user-defined fine-tuning angle".

5. Exclusive Private Customization

An "Exclusive private customization" control on a function selection interface is clicked. An APP displays an exclusive private customization interface. FIG. 17a to FIG. 17d are schematic diagrams of several examples of an exclusive private customization interface according to this application. The exclusive private customization interface includes a simulated room area, and a furniture model displayed in the area is set by a user in a room configuration interface.

In an embodiment, an exclusive private customization function is enabled. The APP may first execute a process in precise sweet spot positioning to obtain a target horizontal angle B, and rotate an angle of the soundbar in the simulated room area to the target horizontal angle B. The APP sends the target horizontal angle B to the soundbar, so that the soundbar also rotates to the target horizontal angle B.

Figure 17A:
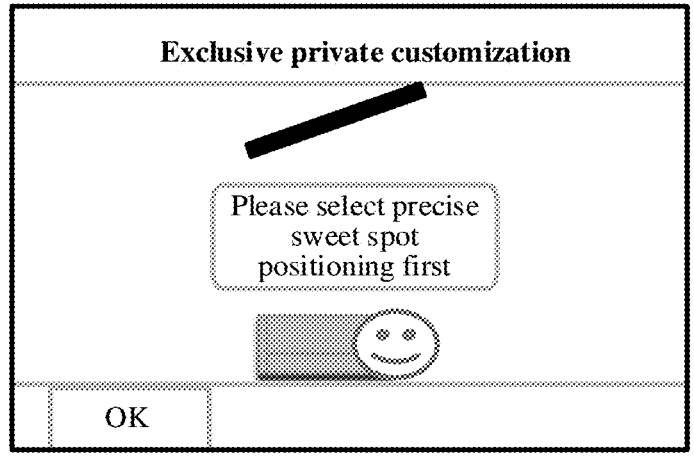
FIG. 17a to FIG. 17d are schematic diagrams of several examples of an exclusive private customization interface according to an embodiment.

In an embodiment, before enabling the exclusive private customization function, the APP needs to first complete the precise sweet spot positioning function. For example, if the user clicks the "Exclusive private customization" control on the function selection interface, the APP first determines whether the user has clicked the "Precise sweet spot positioning" control on the function selection interface before clicking the "Exclusive private customization" control on the function selection interface. If the user has not clicked the "Precise sweet spot positioning" control, the APP displays a pop-up window on the exclusive private customization interface, and the pop-up window displays a text "Please select precise sweet spot positioning first", as shown in FIG. 17a, to remind the user to first click the "Precise sweet spot positioning" control, and then click the "Exclusive private customization" control when a pop-up window is displayed on the precise sweet spot positioning interface and a text "Fine tuning completed" is displayed in the pop-up window. Similarly, after the user performs the foregoing operation, on the exclusive private customization interface, the APP rotates the angle of the soundbar in the simulated room area to the target horizontal angle B. When the precise sweet spot positioning function is disabled, the soundbar has rotated to an angle that reaches the target horizontal angle B.

Figure 17B:
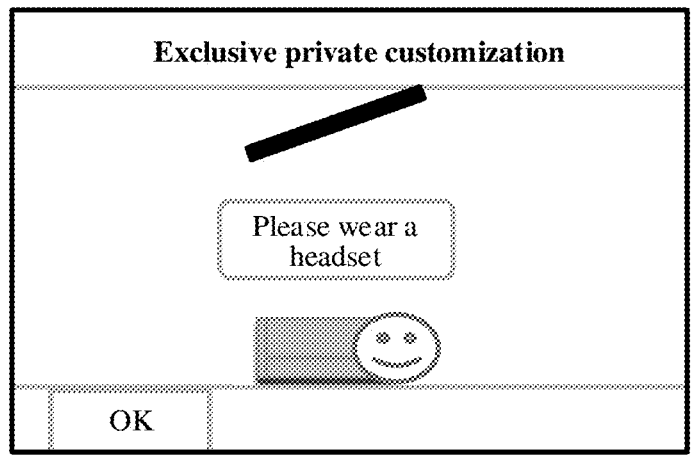

As shown in FIG. 17b, the APP further displays a pop-up window on the exclusive private customization interface, and the pop-up window displays a text "Please wear a headset", to remind the user to wear a headset. After wearing the headset, the user clicks the "OK" control on the exclusive private customization interface, and the APP sends the second playing instruction to the soundbar.

Figure 17C:
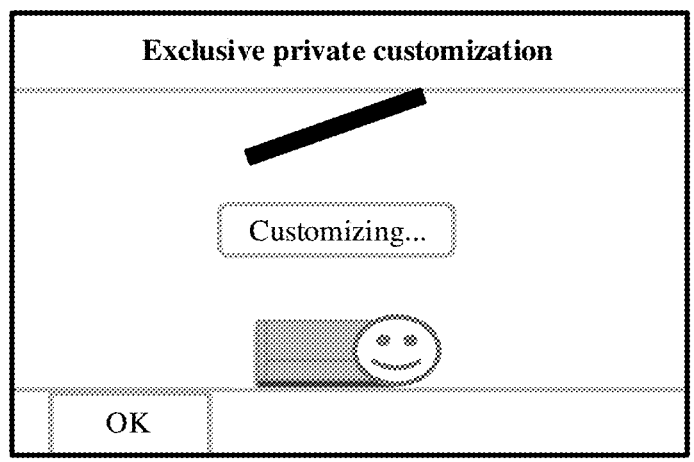

As shown in FIG. 17c, after the APP sends the second playing instruction, the APP displays a pop-up window on the exclusive private customization interface, and the pop-up window displays a text "Customizing . . . ".

After receiving the second playing instruction, the soundbar starts to play test audio that is obtained in advance and stored locally.

The headset receives the test audio, and then sends recorded audio corresponding to the test audio to a mobile phone.

The mobile phone calculates a binaural room impulse response (binaural room impulse response, BRIR) based on the test audio from the soundbar and the recorded audio from the headset.

It should be noted that the exclusive private customization function may also be, similar to the precise sweet spot positioning function, applicable to a plurality of scenarios, that is, one soundbar and one user, one soundbar and a plurality of users, a plurality of soundbars and a plurality of users, and a plurality of soundbars and one user.

For example, the BRIR may be calculated according to formula (7):

$$H_{2p+i,k}(f) = \frac{Y_{i,p,k}(f)}{T(f)} \tag{7}$$

where $0 \leq p < P$, and P represents a quantity of users; $0 \leq k < K$, and K represents a quantity of speaker units; a case that i is 0 corresponds to a left ear, and a case that i is 1 corresponds to a right ear; f represents a frequency; $H_{2p+i,k}(f)$ represents a BRIR of a $p^{th}$ user corresponding to a $k^{th}$ speaker unit; $Y_{i,p,k}(f)$ represents recorded audio of a headset of the $p^{th}$ user corresponding to the $k^{th}$ speaker unit; T(f) represents the test audio.

Then, a filter coefficient is calculated according to formula (8):

$$C(f) = (H(f)^H H(f) + \beta I_k(f))^{-1} H(f)^H D(f) \tag{8}$$

where $H(f) \in C^{K \times K}$ H(f) represents a matrix constituted by using the BRIR calculated according to formula (7) as an element, and the matrix covers room transfer functions of all users respectively corresponding to all speaker units; $*^H$ represents a conjugate matrix; $I_k(f) \in C^{K \times K}$, and $I_k(f)$ represents an identity matrix; and $D(f) \in R^{2P \times R}$, D(f) represents an ideal transfer function, and R represents a quantity of sound channels, where if the audio is stereo, R=2 and $$D(f) = \begin{bmatrix} D_0(f) \\ \vdots \\ D_{P-1}(f) \end{bmatrix} = \begin{bmatrix} 1 & 0 \\ 0 & 1 \\ \vdots & \vdots \\ 1 & 0 \\ 0 & 1 \end{bmatrix}.$$

The APP processes, based on an updated filter coefficient and according to formula (9), the audio played by the soundbar:

$$X(f) = C(f) S(f) \tag{9}$$

where X(f) represents processed audio, S(f) represents the audio played by the soundbar, and C(f) represents the filter coefficient.

The filter coefficient is obtained after precise sweet spot positioning. Therefore, for a position of a user, more accurate crosstalk cancellation can be implemented, impact of different rooms can be eliminated, sound image effect can be enhanced, and original sound effect can be truly restored.

Figure 17D:
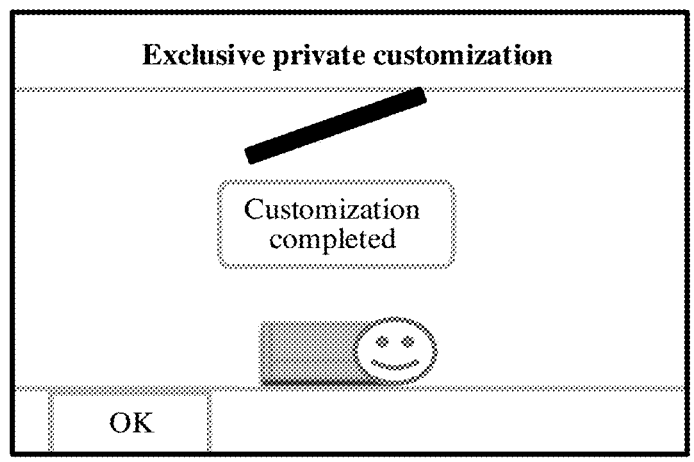

As shown in FIG. 17d, the APP displays a pop-up window on the exclusive private customization interface, and the pop-up window displays a text "Customization completed". So far, the exclusive private customization function is completed. Afterwards, as long as the user does not move, a stereo sound (for example, a sound of a television or a movie) played by the soundbar forms the optimal listening effect in the position of the user, and the original sound effect is highly restored.

6. Virtual Space Mode

Figure 18A:
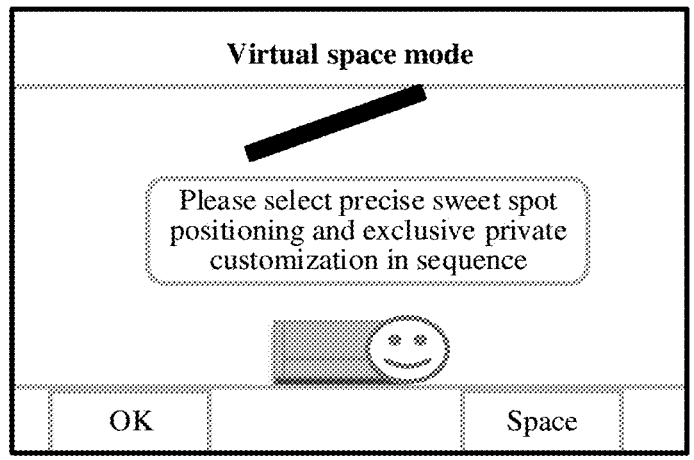
FIG. 18a to FIG. 18c are schematic diagrams of several examples of a virtual space mode interface according to an embodiment.
Figure 18B:
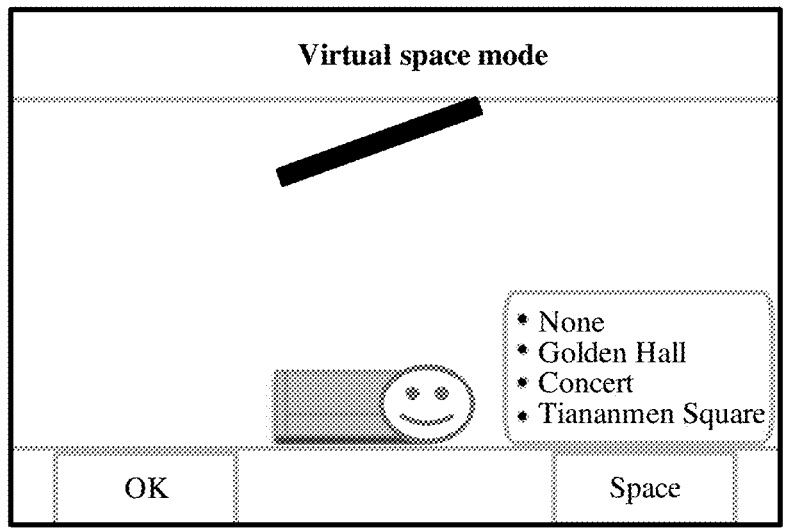
Figure 18C:
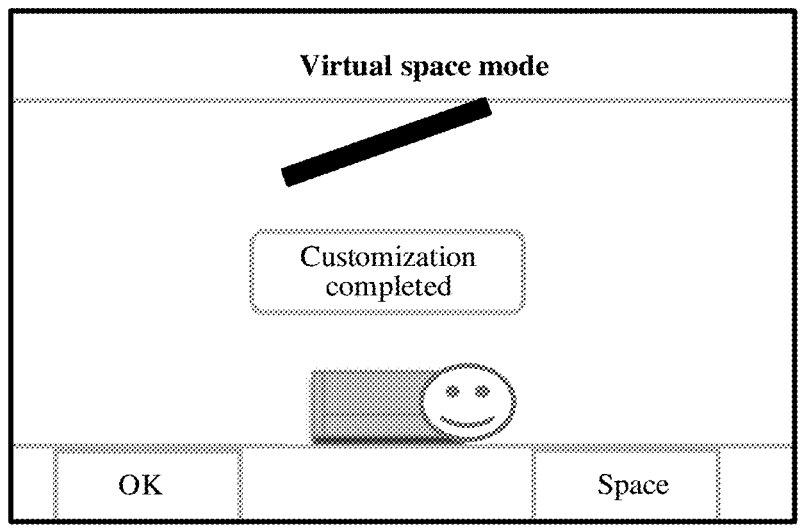

A "Virtual space mode" control on a function selection interface is clicked. The APP displays a virtual space mode interface. FIG. 18a to FIG. 18c are schematic diagrams of several examples of a virtual space mode interface according to an embodiment. The virtual space mode interface includes a simulated room area, and a furniture model displayed in the area is set by a user in a room configuration interface.

In an embodiment, a virtual space mode function is enabled. The APP may first execute a process in precise sweet spot positioning to obtain a target horizontal angle B, rotate an angle of the soundbar in the simulated room area to the target horizontal angle B, and then execute a process in exclusive private customization to obtain a BRIR. The APP sends the target horizontal angle B to the soundbar, so that the soundbar also rotates to an angle that reaches the target horizontal angle B.

In an embodiment, before enabling the virtual space mode function, the APP needs to first complete a precise sweet spot positioning function and an exclusive private customization function. For example, if the user clicks the "Virtual space mode" control on the function selection interface, the APP first determines whether the user has clicked the "Virtual space mode" control on the function selection interface before clicking the "Precise sweet spot positioning" control and the "Exclusive private customization" control on the function selection interface. If the user has not clicked the "Precise sweet spot positioning" control and/or the "Exclusive private customization" control, the APP displays a pop-up window on the virtual space mode interface, and the pop-up window displays a text "Please select precise sweet spot positioning and exclusive private customization in sequence", as shown in FIG. 18a, to remind the user to first click the "Precise sweet spot positioning" control, then click the "Exclusive private customization" control when a pop-up window is displayed on the precise sweet spot positioning interface and a text "Fine tuning completed" is displayed in the pop-up window, and then click the "Virtual space mode" control when a pop-up window is displayed on the exclusive private customization interface and the pop-up window displays a text "Customization completed". Similarly, after the user performs the foregoing operation, on the virtual space interface, the APP rotates the angle of the soundbar in the simulated room area to the target horizontal angle B. When the precise sweet spot positioning function is disabled, the soundbar has rotated to an angle that reaches the target horizontal angle B.

As shown in FIG. 18b, the user clicks a "Space" control on the virtual space mode interface, and the APP displays a pull-up menu on the virtual space mode interface. The pull-up menu includes four items: "None", "Golden Hall", "Concert", and "Tiananmen Square".

The user clicks the item of "Golden Hall" and clicks an "OK" control on the virtual space mode interface.

The APP obtains a room transfer function corresponding to the "Golden Hall", and calculates a filter coefficient based on the BRIR and the room transfer function corresponding to the "Golden Hall" according to formula (10):

$$\hat{C}(f) = (H(f)^H H(f) + \beta I_k(f))^{-1} H(f)^H \hat{D}(f) \quad (10)$$

where $H(f) \in C^{K \times K}$, $H(f)$ represents a matrix constituted by using the BRIR calculated according to formula (7) as an element, and the matrix covers room transfer functions of all users respectively corresponding to all soundbars; $*^H$ represents a conjugate matrix; $I_k(f) \in C^{K \times K}$, and $I_k(f)$ represents an identity matrix; and $\hat{D}(f) \in C^{2P \times R}$, $\hat{D}(f)$ represents a transfer function of a listening space (for example, a golden hall), and R represents a quantity of sound channels, where if the audio is stereo, R=2, $$\hat{D}(f) = \begin{bmatrix} \hat{D}_0(f) \\ \vdots \\ \hat{D}_{P-1}(f) \end{bmatrix},$$

and $\hat{D}_p(f)$ represents a listening space selected by a $p^{th}$ user.

The APP processes, based on an updated filter coefficient and according to formula (11), the audio played by the soundbar:

$$\hat{X}(f) = \hat{C}(f) S(f) \quad (11)$$

where $\hat{X}(f)$ represents processed audio, $S(f)$ represents the audio played by the soundbar, and $\hat{C}(f)$ represents the filter coefficient.

The foregoing filter coefficient is obtained after exclusive private customization. Therefore, for a position of a user, more accurate crosstalk cancellation can be implemented, impact of different rooms can be eliminated, sound image effect can be enhanced, and original sound effect can be truly restored. In addition, a sound field can be rendered in the position of the user, thereby providing an immersive experience for the user.

As shown in FIG. 18c, the APP displays a pop-up window on the virtual space mode interface, and the pop-up window displays a text "Customization completed". So far, the virtual space mode function is completed. Afterwards, as long as the user does not move, a stereo sound (for example, a sound of a television or a movie) played by the soundbar forms the optimal listening effect in the position of the user, and the original sound effect is highly restored, thereby providing an immersive experience for the user.

Referring to the control apparatus shown in FIG. 2, when a room includes one soundbar and one user, a sending module is configured to send a first playing instruction to a sound box, where the first playing instruction is used to instruct the sound box to rotate from a first position to a second position in a preset direction and play positioning audio in a process of rotation, and a loudness of the positioning audio is stable and unchanged when the positioning audio is being played; a receiving module is configured to receive the positioning audio; and a processing module is configured to determine indication information based on the positioning audio, where the indication information is used to determine a target position of the sound box, the target position is a position of the sound box corresponding to a case in which a loudness of the received audio is largest in a process of receiving the positioning audio by the electronic device, and the target position is a position in a process of rotating from the first position to the second position by the sound box; and the sending module is further configured to send the indication information to the sound box.

In an embodiment, an angle difference between the first position and the second position is related to a binaural distance of a user; or an angle difference between the first position and the second position is related to a preset fine-tuning range.

In an embodiment, the indication information further indicates the sound box to rotate from the second position to the target position.

In an embodiment, the preset direction includes a horizontal clockwise direction or a horizontal counterclockwise direction.

In an embodiment, the rotating in a preset direction includes rotating at a uniform speed in the preset direction.

In an embodiment, a shape of the sound box includes a bar shape, a square shape, or a ring shape.

In an embodiment, the processing module is further configured to: obtain an initial position of the center of the sound box and a position of the user; calculate a theoretical sweet spot of the sound box relative to the user based on the initial position and the position of the user, where when the sound box is located at the theoretical sweet spot, a connection line between the position of the user and the center of the sound box is perpendicular to a loudspeaker surface of the sound box; obtain a fine-tuning angle; and obtain the first position and the second position based on the theoretical sweet spot and the fine-tuning angle.

In an embodiment, the first position is a position in which the sound box rotates through the fine-tuning angle from the theoretical sweet spot to the horizontal clockwise direction;

and the second position is a position in which the sound box rotates through the fine-tuning angle from the theoretical sweet spot to the horizontal counterclockwise direction.

In an embodiment, the processing module is specifically configured to: display a room configuration interface, where the room configuration interface is used to simulate a space in which the user and the sound box are located; receive a first virtual position entered by the user on the room configuration interface, where the first virtual position is used to simulate the initial position; calculate the initial position based on the first virtual position; receive a second virtual position entered by the user on the room configuration interface, where the second virtual position is used to simulate the position of the user; and calculate the position of the user based on the second virtual position.

In an embodiment, the processing module is specifically configured to calculate the fine-tuning angle based on the initial position, the position of the user, and the binaural distance of the user.

In an embodiment, the processing module is specifically configured to: display a precise sweet spot positioning interface, where the precise sweet spot positioning interface includes a pop-up window for setting the fine-tuning angle; receive a preset empirical value entered by the user on the pop-up window; and set a value of the fine-tuning angle to the preset empirical value.

In an embodiment, the processing module is specifically configured to: detect the received positioning audio at a specified frequency from a receiving start moment of the positioning audio to obtain a loudness; when a receiving end moment of the positioning audio arrives, determine a difference between a moment corresponding to a largest loudness of a plurality of obtained loudnesses and the receiving start moment as a target time; and determine the target time as the indication information; determine the target time and a reverse direction of the preset direction as the indication information; determine the target time, a reverse direction of the preset direction, and the fine-tuning angle as the indication information; or determine a reverse direction of the preset direction and a target rotation angle as the indication information, where the target rotation angle indicates the sound box to rotate from the second position to the target position.

In an embodiment, the processing module is specifically configured to: detect the positioning audio to obtain a largest loudness; determine a difference between a moment corresponding to the largest loudness and a receiving start moment of the positioning audio as a target time; and determine the target time as the indication information; determine the target time and a reverse direction of the preset direction as the indication information; determine the target time, a reverse direction of the preset direction, and the fine-tuning angle as the indication information; or determine a reverse direction of the preset direction and a target rotation angle as the indication information, where the target rotation angle indicates the sound box to rotate from the second position to the target position.

In an embodiment, the sending module is further configured to send a second playing instruction to the sound box, where the second playing instruction is used to instruct the sound box to play test audio; the receiving module is further configured to receive collected audio, where the collected audio is audio received by a microphone of a headset worn by the user in a process of playing the test audio; and the processing module is further configured to: calculate a binaural room impulse response BRIR based on the collected audio and the test audio; and obtain a filter coefficient of the sound box based on the BRIR.

In an embodiment, the processing module is further configured to: receive a virtual space instruction, where the virtual space instruction includes a listening space; obtain a transfer function of the listening space; and calculate the filter coefficient of the sound box based on the BRIR and the transfer function of the listening space.

According to a fourth aspect, this application provides an audio playing apparatus, including: a receiving module, configured to receive a first playing instruction from an electronic device; and a processing module, configured to rotate from a first position to a second position in a preset direction based on the first playing instruction, and play positioning audio in a process of rotation, where a loudness of the positioning audio is stable and unchanged when the positioning audio is being played; the receiving module is further configured to receive indication information from the electronic device, where the indication information is used to determine a target position, the target position is a position of a sound box corresponding to a case in which a loudness of the received audio is largest in a process of receiving the positioning audio by the electronic device, and the target position is a position in a process of rotating from the first position to the second position by the sound box; and the processing module is further configured to rotate to the target position based on the indication information.

In an embodiment, an angle difference between the first position and the second position is related to a binaural distance of a user; or an angle difference between the first position and the second position is related to a preset fine-tuning range.

In an embodiment, the preset direction includes a horizontal clockwise direction or a horizontal counterclockwise direction.

In an embodiment, the rotating in a preset direction includes rotating at a uniform speed in the preset direction.

In an embodiment, a shape of the sound box includes a bar shape, a square shape, or a ring shape.

In an embodiment, the receiving module is further configured to receive a theoretical sweet spot and a fine-tuning angle from the electronic device, where when the sound box is located at the theoretical sweet spot, a connection line between a position of the user and a center of the sound box is perpendicular to a loudspeaker surface of the sound box; and the processing module is further configured to: determine the first position and the second position based on the theoretical sweet spot and the fine-tuning angle; and rotate to the first position.

In an embodiment, the first position is a position in which the sound box rotates through the fine-tuning angle from the theoretical sweet spot to the horizontal clockwise direction; and the second position is a position in which the sound box rotates through the fine-tuning angle from the theoretical sweet spot to the horizontal counterclockwise direction.

When a room includes a plurality of soundbars and one user, a sending module, configured to send a first playing instruction to an $i^{th}$ sound box, where the first playing instruction is used to instruct the $i^{th}$ sound box to rotate from a first position to a second position at a uniform speed in a preset direction and play positioning audio in a process of rotation, where a loudness of the positioning audio is stable and unchanged when the positioning audio is being played, the $i^{th}$ sound box is one of N sound boxes, 1≤i≤N, and N is a positive integer greater than 1; a receiving module, configured to receive a mixed signal, where the mixed signal is an audio signal obtained by mixing positioning audio played by the N sound boxes; and a processing module, configured to determine an $i^{th}$ piece of indication information based on the mixed signal, where the $i^{th}$ piece of indication information is used to determine a target position of the $i^{th}$ sound box, and the target position of the $i^{th}$ sound box is a corresponding position of the $i^{th}$ sound box corresponding to a case in which a loudness of received audio is largest in a process of receiving the mixed signal by the electronic device; and the sending module is further configured to send the $i^{th}$ piece of indication information to the $i^{th}$ sound box.

In an embodiment, the preset direction includes a horizontal clockwise direction or a horizontal counterclockwise direction.

In an embodiment, the processing module is further configured to: obtain an initial position of the center of the $i^{th}$ sound box and a position of the user; calculate a theoretical sweet spot of the $i^{th}$ sound box relative to the position of the user based on the initial position and the position of the user, where when the $i^{th}$ sound box is located at the theoretical sweet spot, a connection line between the position of the user and the center of the $i^{th}$ sound box is perpendicular to a loudspeaker surface of the $i^{th}$ sound box; obtain a fine-tuning angle; and obtain the first position and the second position of the $i^{th}$ sound box based on the theoretical sweet spot and the fine-tuning angle.

In an embodiment, the first position is a position in which the $i^{th}$ sound box rotates through the fine-tuning angle from the theoretical sweet spot to the preset direction; and the second position is a position in which the $i^{th}$ sound box rotates through the fine-tuning angle from the theoretical sweet spot to a reverse direction of the preset direction.

When a room includes one soundbar and a plurality of users, the sending module is further configured to send a first playing instruction to a sound box, where the first playing instruction is used to instruct the sound box to rotate from a first position to a second position in a preset direction and play positioning audio in a process of rotation, and a loudness of the positioning audio is stable and unchanged when the positioning audio is being played; the receiving module is further configured to receive a plurality of pieces of collected audio, where the plurality of pieces of collected audio are audio respectively received by microphones of terminals of a plurality of users in a process of playing the positioning audio; the processing module is further configured to determine indication information based on the plurality of pieces of collected audio, where the indication information is used to determine a target position of the sound box, the target position is a position of the sound box corresponding to a case in which a sum of loudnesses of the received audio is largest in a process of receiving the positioning audio by terminals of the plurality of users, and the target position is a position in a process of rotating from the first position to the second position; and the sending module is further configured to send the indication information to the sound box.

In an embodiment, the processing module is further configured to: obtain an initial position of the center of the sound box and positions of the plurality of users; determine the central position of the plurality of users based on the positions of the plurality of users; calculate a theoretical sweet spot of the sound box relative to the central position of the plurality of users based on the initial position and the central position of the plurality of users, where when the sound box is located at the theoretical sweet spot, a connection line between the central position of the plurality of users and the center of the sound box is perpendicular to a loudspeaker surface of the sound box; obtain a fine-tuning angle; and obtain the first position and the second position based on the theoretical sweet spot and the fine-tuning angle.

When a room includes a plurality of soundbars and a plurality of users, in an embodiment, the processing module is further configured to divide a space into a plurality of subspaces based on a quantity of N sound boxes, where each subspace corresponds to one of the sound boxes, and N is a positive integer greater than 1; the sending module is further configured to send a first playing instruction to each of the N sound boxes, where the first playing instruction is used to instruct the corresponding sound boxes to rotate from a first position to a second position in a preset direction and play positioning audio in a process of rotation, and a loudness of the positioning audio is stable and unchanged when the positioning audio is being played; the processing module is further configured to determine N pieces of indication information, where the N pieces of indication information correspond to the N sound boxes, and the indication information is used to determine target positions of the corresponding sound boxes; and the sending module is further configured to send the N pieces of indication information to the corresponding sound boxes respectively.

In an embodiment, the processing module is specifically configured to receive first positioning audio played by an $i^{th}$ sound box, where the $i^{th}$ soundbar is one of the N soundbars, $1 \leq i \leq N$, and only one first user is in a subspace corresponding to the first soundbar; and determine first indication information based on the first positioning audio, where the first indication information is used to determine a first target position of the $i^{th}$ sound box, and the first target position is a position of the $i^{th}$ sound box corresponding to a case in which a loudness of received audio is largest in a process of receiving the first positioning audio by the electronic device.

In an embodiment, the processing module is further configured to: obtain a first initial position of the center of the $i^{th}$ sound box and a position of the first user; calculate a first theoretical sweet spot of the $i^{th}$ sound box relative to the position of the user based on the first initial position and the position of the first user; obtain a first fine-tuning angle; and obtain the first position and the second position of the first soundbar based on the first theoretical sweet spot and the first fine-tuning angle.

In an embodiment, the receiving module is further configured to receive a plurality of pieces of collected audio, where the plurality of pieces of collected audio are audio respectively received by microphones of electronic devices of a plurality of second users in a process of playing second positioning audio by a $j^{th}$ soundbar, the $j^{th}$ soundbar is one of the N soundbars, $1 \leq j \leq N$, and the plurality of second users are located in a subspace corresponding to the $j^{th}$ soundbar; and the processing module is further configured to determine second indication information based on the plurality of pieces of collected audio, where the second indication information is used to determine a second target position of the $j^{th}$ soundbar, the second target position is a position of the $j^{th}$ soundbar when a sum of loudnesses of the received audio is largest in a process of receiving the second positioning audio by the electronic devices of the plurality of second users, and the second target position is a position in a process of rotating from the first position to the second position.

In an embodiment, the processing module is further configured to: obtain a second initial position of the center of the $j^{th}$ sound box and positions of the plurality of second users; determine the central position of the plurality of second users based on the positions of the plurality of second users; calculate a second theoretical sweet spot of the $i^{th}$ sound box relative to the central position of the plurality of users based on the second initial position and the central position of the plurality of second users; obtain a second fine-tuning angle; and obtain the first position and the second position of the $i^{th}$ soundbar based on the second theoretical sweet spot and the second fine-tuning angle.

In an embodiment, the receiving module is further configured to receive a plurality of pieces of collected audio, where the plurality of pieces of collected audio are audio respectively received by microphones of electronic devices of a plurality of third users in a process of playing third positioning audio by a $k^{th}$ soundbar, the $k^{th}$ soundbar is one of the N soundbars, $1 \leq k \leq N$, no user is in a subspace corresponding to the $k^{th}$ soundbar, and the plurality of third users are all users in the space; and the processing module is further configured to determine third indication information based on the plurality of pieces of collected audio, where the third indication information is used to determine a third target position of the $k^{th}$ soundbar, the third target position is a position of the $k^{th}$ soundbar when a sum of loudnesses of the received audio is largest in a process of receiving the third positioning audio by the electronic devices of the plurality of third users, and the third target position is a position in a process of rotating from the first position to the second position.

In an embodiment, the processing module is further configured to: obtain a third initial position of the $k^{th}$ soundbar and positions of the plurality of third users; determine the central position of the plurality of third users based on the positions of the plurality of third users; calculate a third theoretical sweet spot of the $k^{th}$ soundbar relative to the central position of the plurality of third users based on the third initial position and the central position of the plurality of third users; obtain a third fine-tuning angle; and obtain the first position and the second position of the $k^{th}$ soundbar based on the third theoretical sweet spot and the third fine-tuning angle.

The apparatus in this embodiment may be configured to execute the technical solutions of the method embodiments shown in FIG. 4 to FIG. 8. Implementation principles and technical effects of the apparatus are similar to those of the method embodiments, and details are not described herein again.

In an embodiment, operations in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field-programmable gate array (FPGA) or another programmable logic device, a discrete gate or transistor logic device, or a discrete hardware component. The general-purpose processor may be a microprocessor, or the processor may be any conventional processor or the like. The operations of the methods disclosed in embodiments of this application may be directly presented as being performed and completed by a hardware encoding processor, or performed and completed by a combination of hardware and a software module in an encoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the operations in the foregoing methods in combination with hardware of the processor.

The memory in the foregoing embodiments may be a volatile memory or a non-volatile memory, or may include both a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the systems and methods described in this specification includes but is not limited to these and any memory of another proper type.

A person of ordinary skill in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions in this application essentially, or the part contributing to the conventional technology, or a part of the technical solutions may be implemented in a form of a software product. The computer software product is stored in a storage medium and includes several instructions for instructing a computer device (a personal computer, a server, a network device, or the like) to perform all or a part of the operations of the methods in embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method of sound box position adjustment, comprising:
   sending, by an electronic device, a first playing instruction to a sound box, wherein the first playing instruction is used to instruct the sound box to rotate from a first position to a second position in a preset direction and play positioning audio in a process of rotation, and a loudness of the positioning audio is stable and unchanged when the positioning audio is being played;
   receiving, by the electronic device, the positioning audio;
   determining, by the electronic device, indication information based on the positioning audio, wherein the indication information is used to determine a target position of the sound box, the target position is a position of the sound box when a loudness of the received positioning audio is largest in a process of receiving the positioning audio by the electronic device, and the target position is a position in a process of rotating from the first position to the second position by the sound box;
   sending, by the electronic device, the indication information to the sound box;
   sending, by the electronic device, a second playing instruction to the sound box, wherein the second playing instruction is used to instruct the sound box to play test audio;
   receiving, by the electronic device, collected audio, wherein the collected audio is audio received by a microphone of a headset worn by a user in a process of playing the test audio;
   calculating, by the electronic device, a binaural room impulse response (BRIR) based on the collected audio and the test audio; and
   obtaining, by the electronic device, a filter coefficient of the sound box based on the BRIR.

2. The method according to claim 1, wherein an angle difference between the first position and the second position is related to a binaural distance of the user; or the angle difference between the first position and the second position is related to a preset fine-tuning range.

3. The method according to claim 1, wherein the sound box rotates from the second position to the target position based on the indication information.

4. The method according to claim 1, wherein the rotation comprises a rotation at a uniform speed around a rotation shaft of the sound box in a vertical direction.

5. The method according to claim 1, further comprising:
   before sending the first playing instruction to the sound box,
   obtaining, by the electronic device, an initial position of a center of the sound box and a position of the user;
   calculating, by the electronic device, a theoretical sweet spot of the sound box relative to the user based on the initial position and the position of the user, wherein when the sound box is located at the theoretical sweet spot, a connection line between the position of the user and the center of the sound box is perpendicular to a loudspeaker surface of the sound box, and the loudspeaker surface faces the user;
   obtaining, by the electronic device, a fine-tuning angle; and
   obtaining, by the electronic device, the first position and the second position based on the theoretical sweet spot and the fine-tuning angle.

6. The method according to claim 5, wherein obtaining the initial position of the center of the sound box and the position of the user comprises:
   displaying, by the electronic device, a room configuration interface used to simulate a space in which the user and the sound box are located;
   receiving, by the electronic device, a first virtual position entered by the user on the room configuration interface, wherein the first virtual position is used to simulate the initial position;
   calculating, by the electronic device, the initial position based on the first virtual position;
   receiving, by the electronic device, a second virtual position entered by the user on the room configuration interface, wherein the second virtual position is used to simulate the position of the user; and
   calculating, by the electronic device, the position of the user based on the second virtual position.

7. The method according to claim 5, wherein obtaining the fine-tuning angle comprises:
   calculating, by the electronic device, the fine-tuning angle based on the initial position, the position of the user, and a binaural distance of the user.

8. The method according to claim 5, wherein obtaining the fine-tuning angle comprises:
   displaying, by the electronic device, a precise sweet spot positioning interface that comprises a pop-up window for setting the fine-tuning angle;
   receiving, by the electronic device, a preset empirical value entered by the user on the pop-up window; and
   setting, by the electronic device, a value of the fine-tuning angle to the preset empirical value.

9. The method according to claim 1, wherein determining the indication information comprises:
   detecting, by the electronic device, the positioning audio to obtain a largest loudness;
   determining, by the electronic device, a difference between a moment corresponding to the largest loudness and a receiving start moment of the positioning audio as a target time; and
   determining, by the electronic device, the target time as the indication information; or
   determining, by the electronic device, the target time and a reverse direction of the preset direction as the indication information; or
   determining, by the electronic device, the target time, the reverse direction of the preset direction, and a fine-tuning angle as the indication information; or
   determining, by the electronic device, the reverse direction of the preset direction and a target rotation angle as the indication information, wherein the sound box rotates from the second position to the target position based on the target rotation angle.

10. The method according to claim 1, wherein
the method further comprises: before obtaining the filter coefficient of the sound box, receiving, by the electronic device, a virtual space instruction comprising a listening space; and
obtaining, by the electronic device, a transfer function of the listening space; and
obtaining the filter coefficient of the sound box comprises:
calculating, by the electronic device, the filter coefficient of the sound box based on the BRIR and the transfer function of the listening space.

11. A method of sound box position adjustment, comprising:
receiving, by a sound box, a first playing instruction from an electronic device;
rotating, by the sound box, from a first position to a second position in a preset direction based on the first playing instruction, and playing positioning audio in a process of rotation, wherein a loudness of the positioning audio is stable and unchanged when the positioning audio is being played;
receiving, by the sound box, indication information from the electronic device, wherein the indication information is used to determine a target position, the target position is a position of the sound box when a loudness of the received audio is largest in a process of receiving the positioning audio by the electronic device, and the target position is a position in a process of rotating from the first position to the second position by the sound box;
rotating, by the sound box, from the second position to the target position based on the indication information; and
receiving, by the sound box, a second playing instruction from the electronic device, wherein the second playing instruction is used to instruct the sound box to play test audio;
wherein the electronic device receives collected audio, calculates a binaural room impulse response (BRIR) based on the collected audio and the test audio, and obtains a filter coefficient of the sound box based on the BRIR, wherein the collected audio comprises the test audio played by the sound box that is received by a microphone of a headset worn by a user.

12. The method according to claim 11, further comprising: before receiving the first playing instruction from the electronic device,
receiving, by the sound box, a theoretical sweet spot and a fine-tuning angle from the electronic device, wherein when the sound box is located at the theoretical sweet spot, a connection line between a position of the user and a center of the sound box is perpendicular to a loudspeaker surface of the sound box, and the loudspeaker surface faces the user;
determining, by the sound box, the first position based on the theoretical sweet spot and the fine-tuning angle; and
rotating, by the sound box, to the first position.

13. The method according to claim 12, wherein the first position is a position in which the sound box rotates through the fine-tuning angle from the theoretical sweet spot to a horizontal clockwise direction; and the second position is a position in which the sound box rotates through the fine-tuning angle from the theoretical sweet spot to a horizontal counterclockwise direction.

14. A method of sound box position adjustment, comprising:
sending, by an electronic device, a first playing instruction to a sound box, wherein the first playing instruction is used to instruct the sound box to rotate from a first position to a second position in a preset direction and play positioning audio in a process of rotation, and a loudness of the positioning audio is stable and unchanged when the positioning audio is being played;
receiving, by the electronic device, a plurality of pieces of collected audio, wherein the plurality of pieces of collected audio are audio respectively received by microphones of terminals of a plurality of users in a process of playing the positioning audio;
determining, by the electronic device, indication information based on the plurality of pieces of collected audio, wherein the indication information is used to determine a target position of the sound box, the target position is a position of the sound box when a sum of loudnesses of the received audio is largest in a process of receiving the positioning audio by the terminals of the plurality of users, and the target position is a position in a process of rotating from the first position to the second position;
sending, by the electronic device, the indication information to the sound box;
sending, by the electronic device, a second playing instruction to the sound box, wherein the second playing instruction is used to instruct the sound box to play test audio;
receiving, by the electronic device, collected audio, wherein the collected audio is audio received by a microphone of a headset worn by a user in a process of playing the test audio;
calculating, by the electronic device, a binaural room impulse response (BRIR) based on the collected audio and the test audio; and
obtaining, by the electronic device, a filter coefficient of the sound box based on the BRIR.

15. The method according to claim 14, further comprising: before sending the first playing instruction to the sound box,
obtaining, by the electronic device, an initial position of a center of the sound box and positions of the plurality of users;
determining, by the electronic device, a central position of the plurality of users based on the positions of the plurality of users;
calculating, by the electronic device, a theoretical sweet spot of the sound box relative to the central position of the plurality of users based on the initial position and the central position of the plurality of users, wherein when the sound box is located at the theoretical sweet spot, a connection line between the central position of the plurality of users and the center of the sound box is perpendicular to a loudspeaker surface of the sound box, and the loudspeaker surface faces the users;
obtaining, by the electronic device, a fine-tuning angle; and
obtaining, by the electronic device, the first position and the second position based on the theoretical sweet spot and the fine-tuning angle.

16. A method of sound box position adjustment, comprising:
dividing, by an electronic device, a space into a plurality of subspaces based on a quantity of N sound boxes, wherein each subspace corresponds to one of the N sound boxes, and N is a positive integer greater than 1;

sending, by the electronic device, a first playing instruction to each of the N sound boxes, wherein the first playing instruction is used to instruct the corresponding sound boxes to rotate from a first position to a second position in a preset direction and play positioning audio in a process of rotation, and a loudness of the positioning audio is stable and unchanged when the positioning audio is being played;

determining, by the electronic device, N pieces of indication information, wherein the N pieces of indication information correspond to the N sound boxes, and the indication information is used to determine target positions of the corresponding sound boxes;

respectively sending, by the electronic device, the N pieces of indication information to the corresponding sound boxes;

sending, by the electronic device, a second playing instruction to each of the N sound boxes, wherein the second playing instruction is used to instruct the corresponding sound boxes to play test audio;

receiving, by the electronic device, collected audio, wherein the collected audio is audio received by a microphone of a headset worn by a user in a process of playing the test audio;

calculating, by the electronic device, a binaural room impulse response (BRIR) based on the collected audio and the test audio; and obtaining, by the electronic device, a filter coefficient of a corresponding sound box based on the BRIR.

17. The method according to claim 16, wherein determining the N pieces of indication information comprises:

receiving, by the electronic device, first positioning audio played by an $i^{th}$ sound box, wherein the $i^{th}$ sound box is one of the N sound boxes, $1 \leq i \leq N$, and only a first user is in a subspace corresponding to a first sound box; and determining, by the electronic device, first indication information based on the first positioning audio, wherein the first indication information is used to determine a first target position of the ith sound box, and the first target position is a position of the ith sound box when a loudness of received audio is largest in a process of receiving the first positioning audio by the electronic device.

18. The method according to claim 17, further comprising: before sending the first playing instruction to each of the N sound boxes, obtaining, by the electronic device, a first initial position of a center of the ith sound box and a position of the first user;

calculating, by the electronic device, a first theoretical sweet spot of the $i^{th}$ sound box relative to the position of the first user based on the first initial position and the position of the first user, wherein when the $i^{th}$ sound box is located at the first theoretical sweet spot, a connection line between the position of the first user and the center of the $i^{th}$ sound box is perpendicular to a loudspeaker surface of the $i^{th}$ sound box, and the loudspeaker surface faces the first user;

obtaining, by the electronic device, a first fine-tuning angle; and obtaining, by the electronic device, the first position and the second position of the first sound box based on the first theoretical sweet spot and the first fine-tuning angle.

19. The method according to claim 18, wherein determining the N pieces of indication information comprises:

receiving, by the electronic device, a plurality of pieces of collected audio, wherein the plurality of pieces of collected audio are audio respectively received by microphones of electronic devices of a plurality of second users in a process of playing second positioning audio by a $j^{th}$ sound box, the $j^{th}$ sound box is one of the N sound boxes, $1 \leq j \leq N$, and the plurality of second users are located in a subspace corresponding to the $j^{th}$ sound box; and determining, by the electronic device, second indication information based on the plurality of pieces of collected audio, wherein the second indication information is used to determine a second target position of the $j^{th}$ sound box, the second target position is a position of the $j^{th}$ sound box when a sum of loudnesses of the received audio is largest in a process of receiving the second positioning audio by the electronic devices of the plurality of second users, and the second target position is a position in a process of rotating from the first position to the second position.

* * * * *